(12) United States Patent
Tanaka et al.

(10) Patent No.: US 10,838,180 B2
(45) Date of Patent: *Nov. 17, 2020

(54) ZOOM LENS AND IMAGING APPARATUS

(71) Applicant: FUJIFILM Corporation, Tokyo (JP)

(72) Inventors: Takuya Tanaka, Saitama (JP); Motoari Ota, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 155 days.

This patent is subject to a terminal disclaimer.

(21) Appl. No.: 16/139,114

(22) Filed: Sep. 24, 2018

(65) Prior Publication Data
US 2019/0025556 A1 Jan. 24, 2019

Related U.S. Application Data

(63) Continuation of application No. PCT/JP2017/009142, filed on Mar. 8, 2017.

(30) Foreign Application Priority Data

Mar. 29, 2016 (JP) ................................ 2016-065232

(51) Int. Cl.
*G02B 13/18* (2006.01)
*G02B 13/02* (2006.01)
(Continued)

(52) U.S. Cl.
CPC .............. *G02B 13/18* (2013.01); *G02B 13/02* (2013.01); *G02B 15/1451* (2019.08);
(Continued)

(58) Field of Classification Search
CPC ........ G02B 13/02; G02B 13/18; G02B 15/16; G02B 15/20; G02B 15/177; G02B 15/145;
(Continued)

(56) References Cited

U.S. PATENT DOCUMENTS 5,724,192 A 3/1998 Lee
6,512,637 B1 * 1/2003 Tomita ................. G02B 15/173
359/684
(Continued)

FOREIGN PATENT DOCUMENTS

CN 1150252 A 5/1997
CN 1424613 A 6/2003
(Continued)

OTHER PUBLICATIONS

An Office Action mailed by the State Intellectual Property Office of the People's Republic of China dated Jan. 29, 2019, which corresponds to Chinese Patent Application No. 201780020520.0 and is related to U.S. Appl. No. 16/139,114; with English translation.
(Continued)

*Primary Examiner* — Marin Pichler
(74) *Attorney, Agent, or Firm* — Studebaker & Brackett PC

(57) ABSTRACT

A zoom lens consists of, in order from an object side, a positive first lens group, a negative second lens group, a positive third lens group, a positive fourth lens group, and a positive fifth lens group. During zooming, the first lens group is fixed, and distances between the respective lens groups change in predetermined manners. The first lens group consists of, in order from the object side, a negative lens group fixed during focusing, a positive lens group movable during focusing, and a positive lens group fixed during focusing. The lens group has on the most image side four lenses of, in order from the object side, a positive lens, a cemented lens in which a negative meniscus lens having a convex surface facing the object side and a positive lens are cemented, and a positive meniscus lens having a convex surface facing the object side.

18 Claims, 21 Drawing Sheets

(51) Int. Cl.
*G02B 15/16* (2006.01)
*G02B 15/14* (2006.01)
*G02B 15/20* (2006.01)

(52) U.S. Cl.
CPC ..... *G02B 15/145129* (2019.08); *G02B 15/16* (2013.01); *G02B 15/20* (2013.01)

(58) Field of Classification Search
CPC ........ G02B 15/1451; G02B 15/145113; G02B 15/145121; G02B 15/145123; G02B 15/145125; G02B 15/145129; G02B 15/1455; G02B 15/146; G02B 15/1461
USPC .................. 359/676–677, 682, 686–687
See application file for complete search history.

(56) References Cited

U.S. PATENT DOCUMENTS

| | | | |
|---|---|---|---|
| 9,979,892 B2 | 5/2018 | Wada | |
| 2003/0007256 A1* | 1/2003 | Usui | G02B 15/173 359/686 |
| 2003/0117717 A1 | 6/2003 | Ohtake et al. | |
| 2005/0068636 A1 | 3/2005 | Hayakawa | |
| 2007/0273980 A1 | 11/2007 | Horiuchi | |
| 2014/0029112 A1* | 1/2014 | Sanjo | G02B 15/17 359/687 |
| 2014/0049673 A1 | 2/2014 | Nakamura | |
| 2014/0300804 A1 | 10/2014 | Ryu | |
| 2015/0097995 A1 | 4/2015 | Wada | |
| 2015/0241673 A1* | 8/2015 | Nagatoshi | G02B 15/16 359/683 |

FOREIGN PATENT DOCUMENTS

| | | |
|---|---|---|
| CN | 1603881 A | 4/2005 |
| JP | 2007-316288 A | 12/2007 |
| JP | 2014-038238 A | 2/2014 |
| JP | 2015-075523 A | 4/2015 |
| JP | 2015-212724 A | 11/2015 |
| JP | 2017-078762 A | 4/2017 |
| JP | 2017-078770 A | 4/2017 |
| WO | 2017/169583 A1 | 10/2017 |

OTHER PUBLICATIONS

Written Opinion issued in PCT/JP2017/009142; dated Jul. 11, 2017.
International Search Report issued in PCT/JP2017/009142; dated Jul. 11, 2017.
An Office Action; "Notification of Reasons for Refusal," mailed by the Japanese Patent Office dated May 30, 2018, which corresponds to Japanese Patent Application No. 2018-508888.

* cited by examiner

FIG. 1
EXAMPLE 1
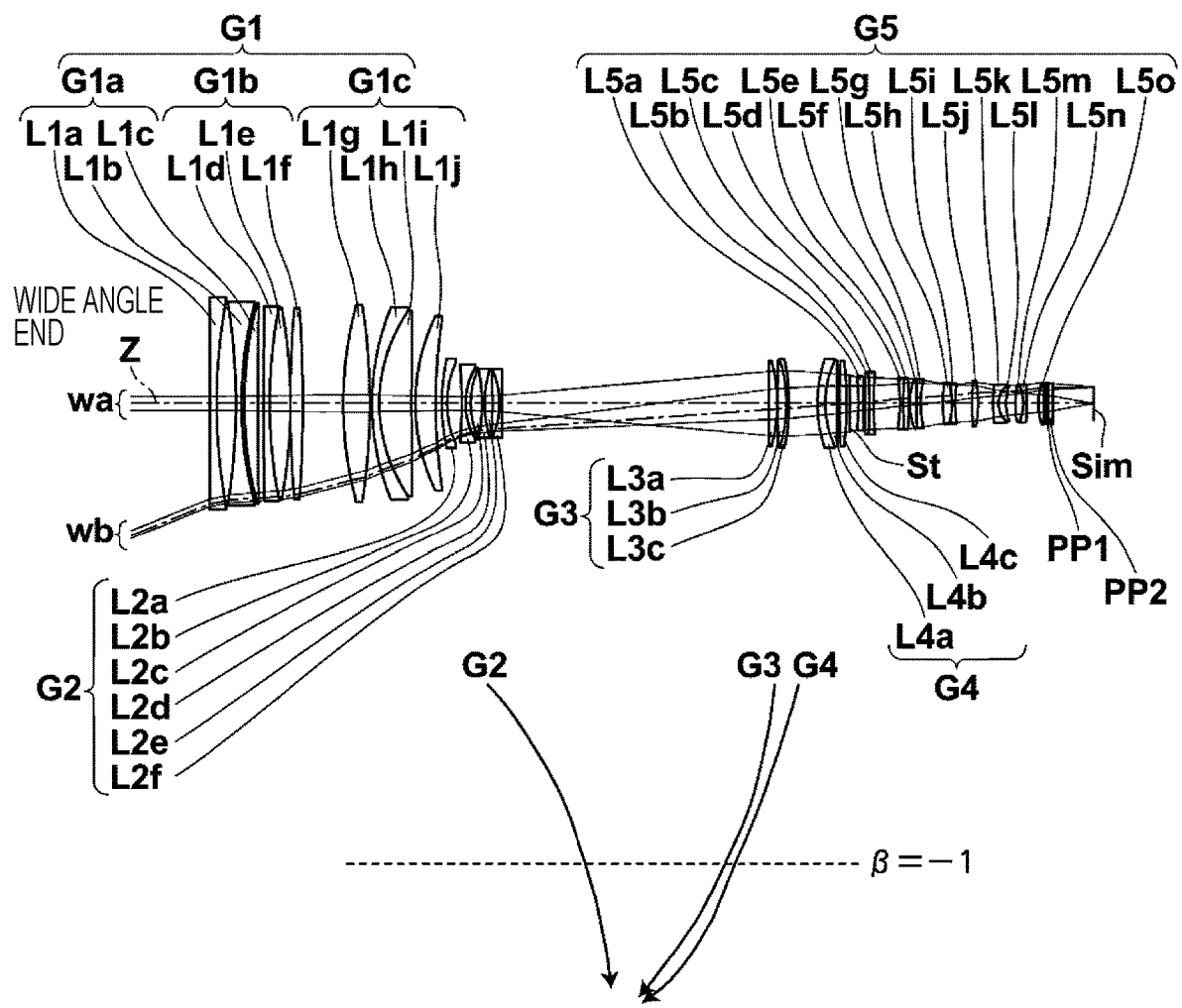
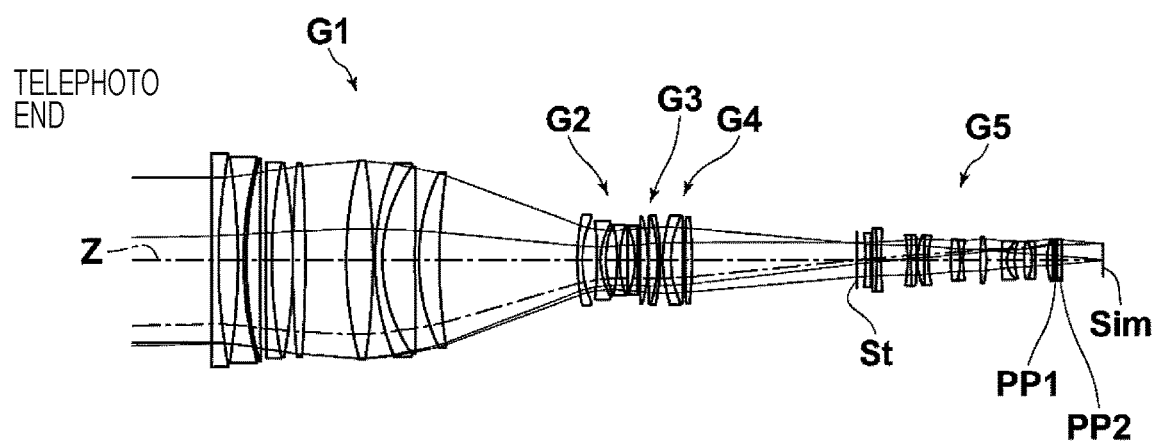

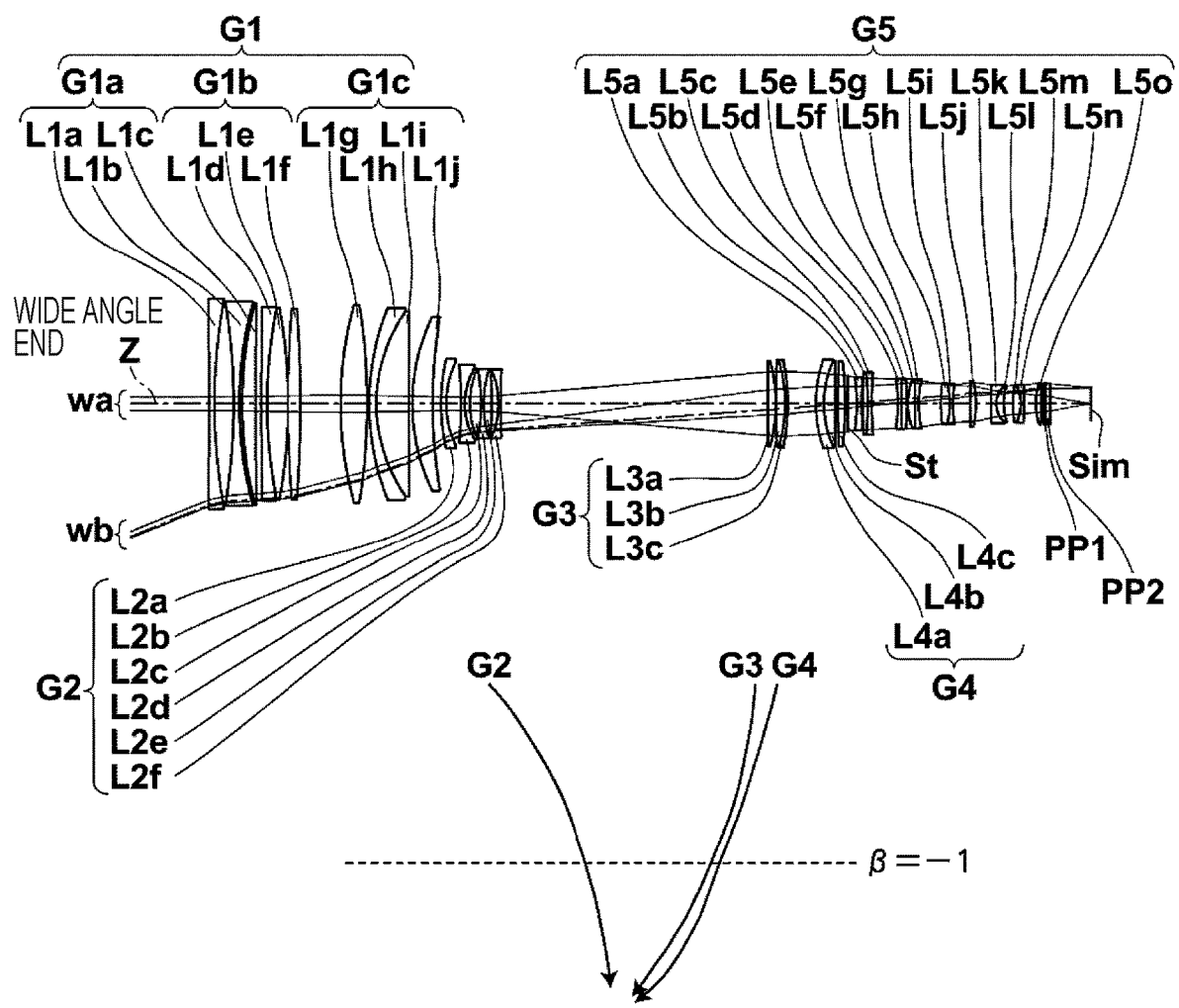
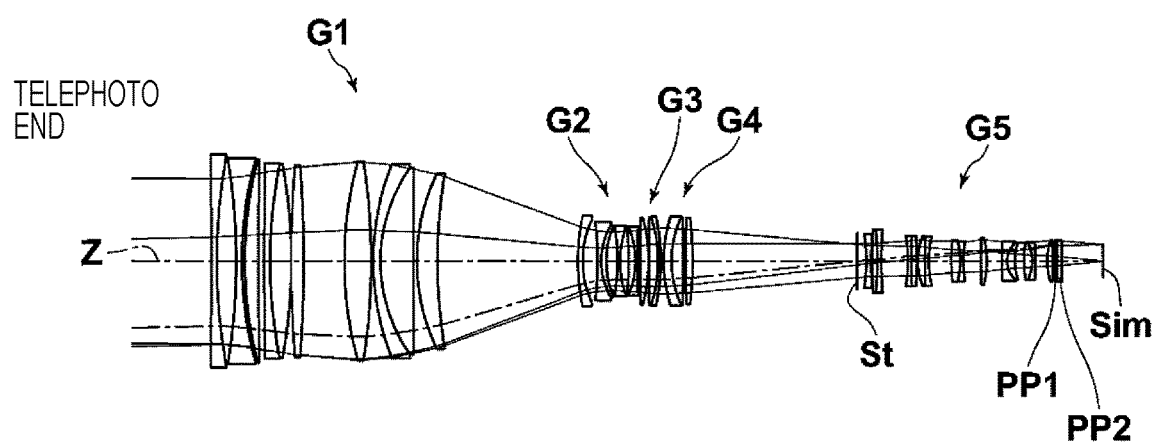

FIG. 3
EXAMPLE 3
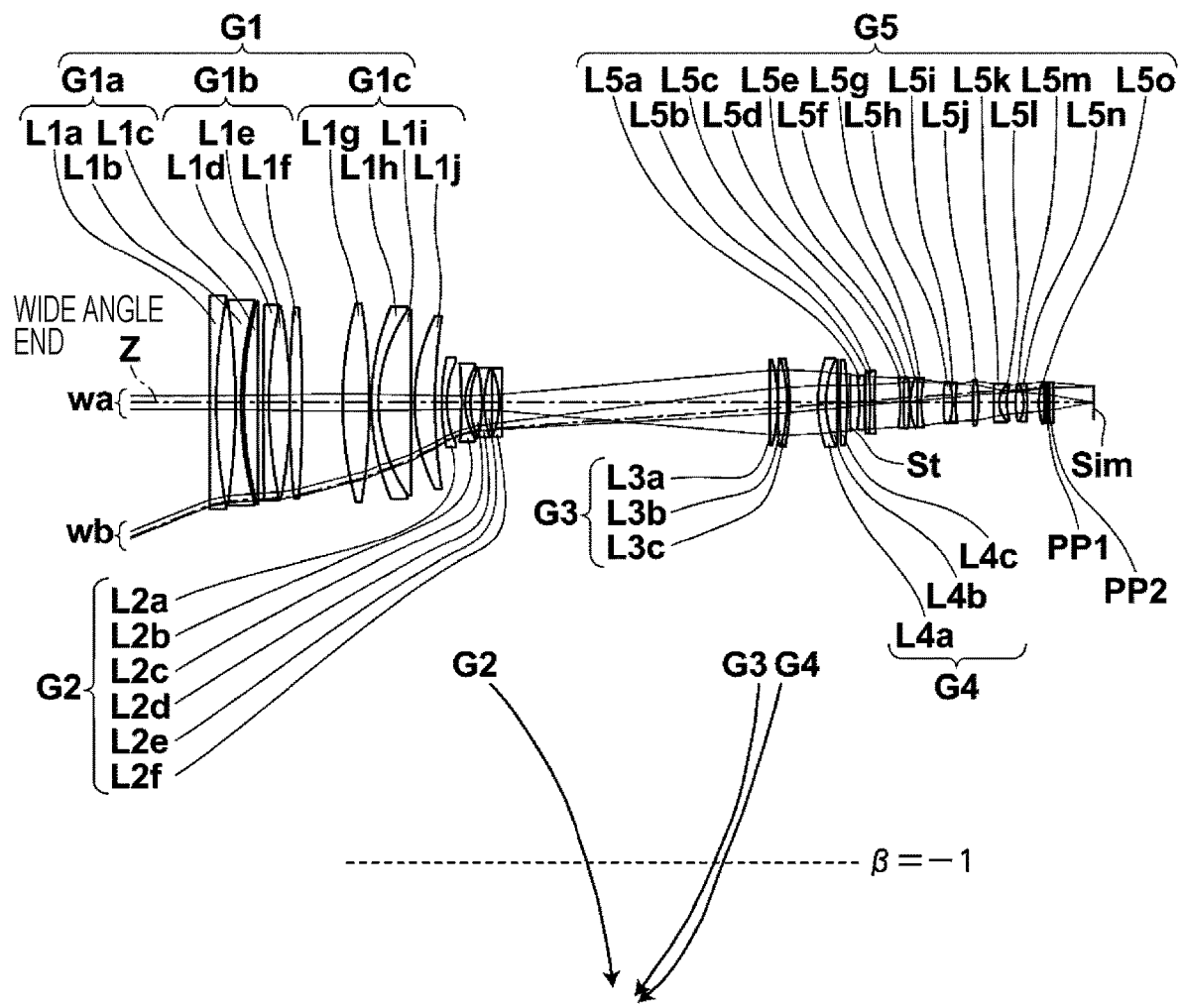
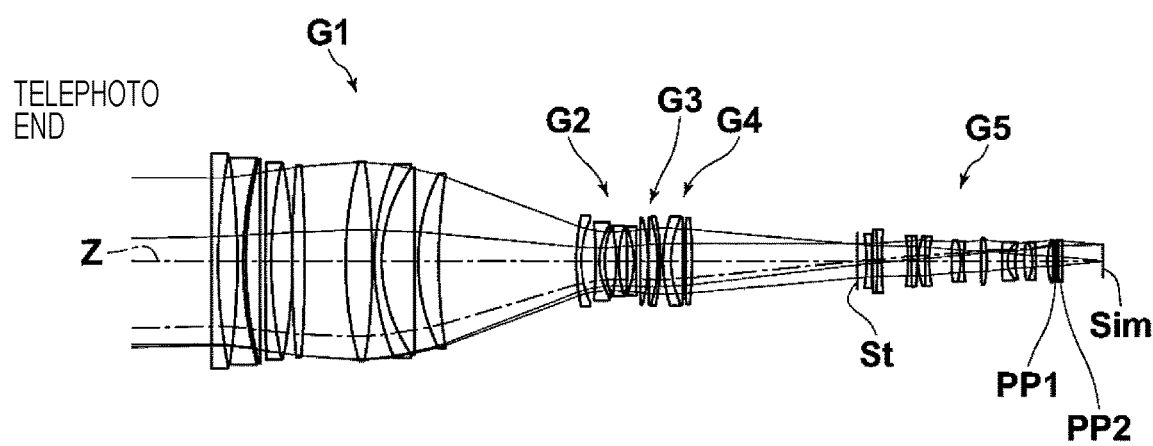

FIG. 4
EXAMPLE 4
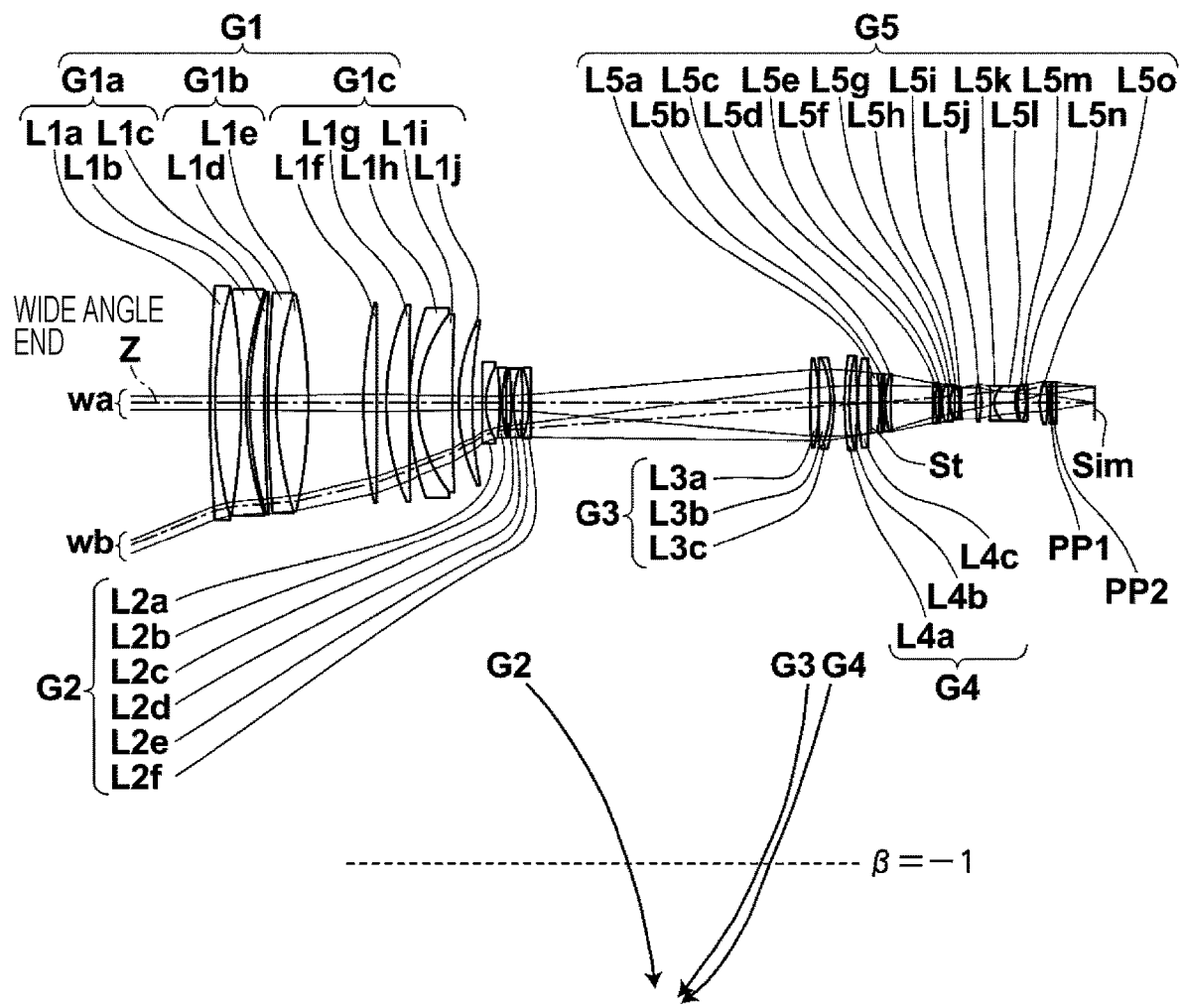
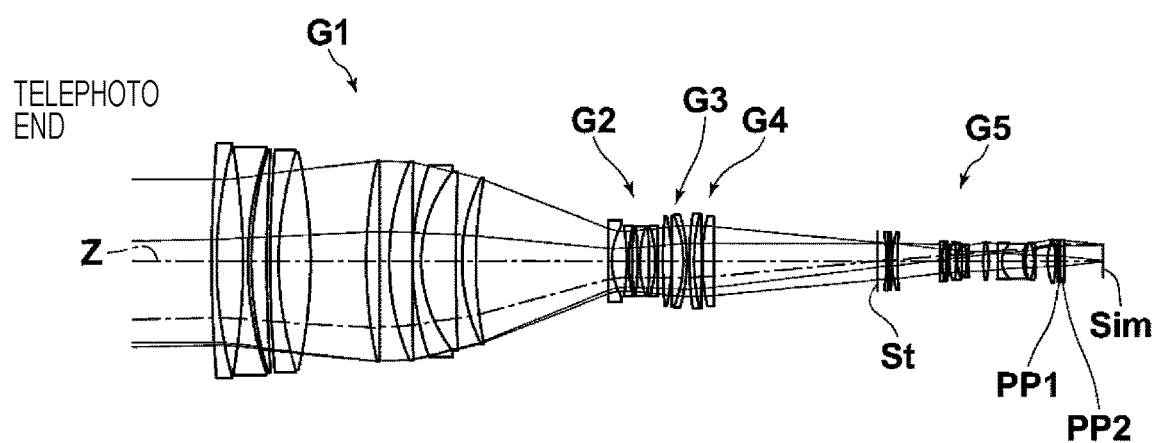

FIG. 5
EXAMPLE 5
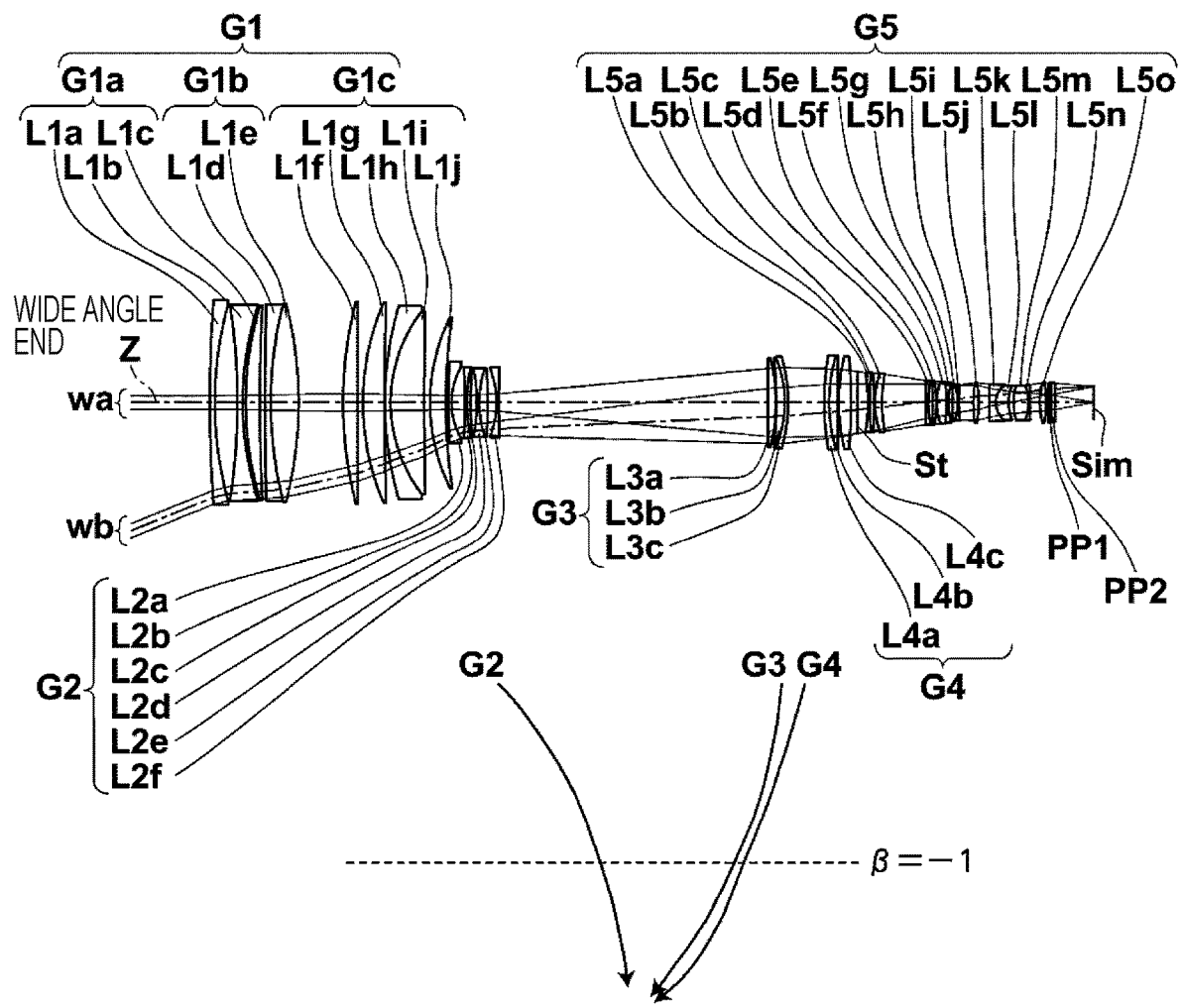
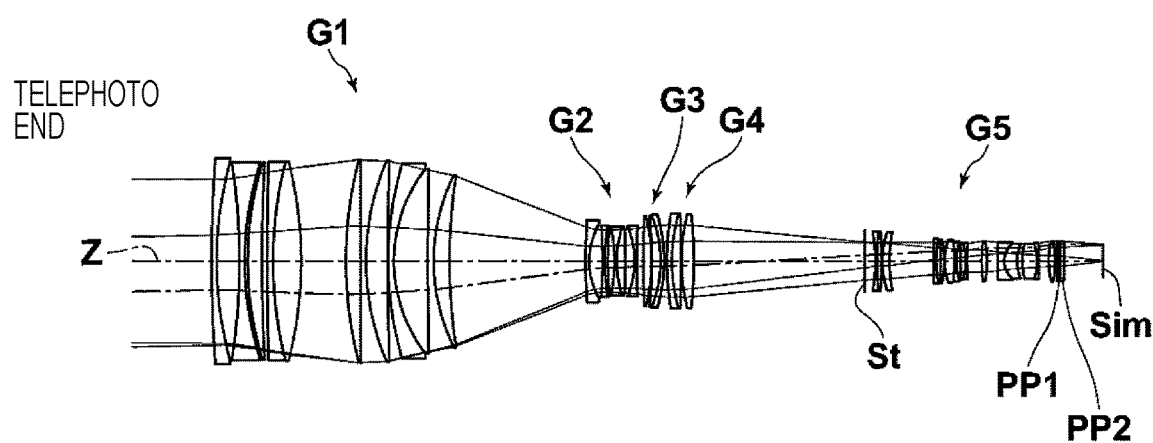

FIG. 6
EXAMPLE 6
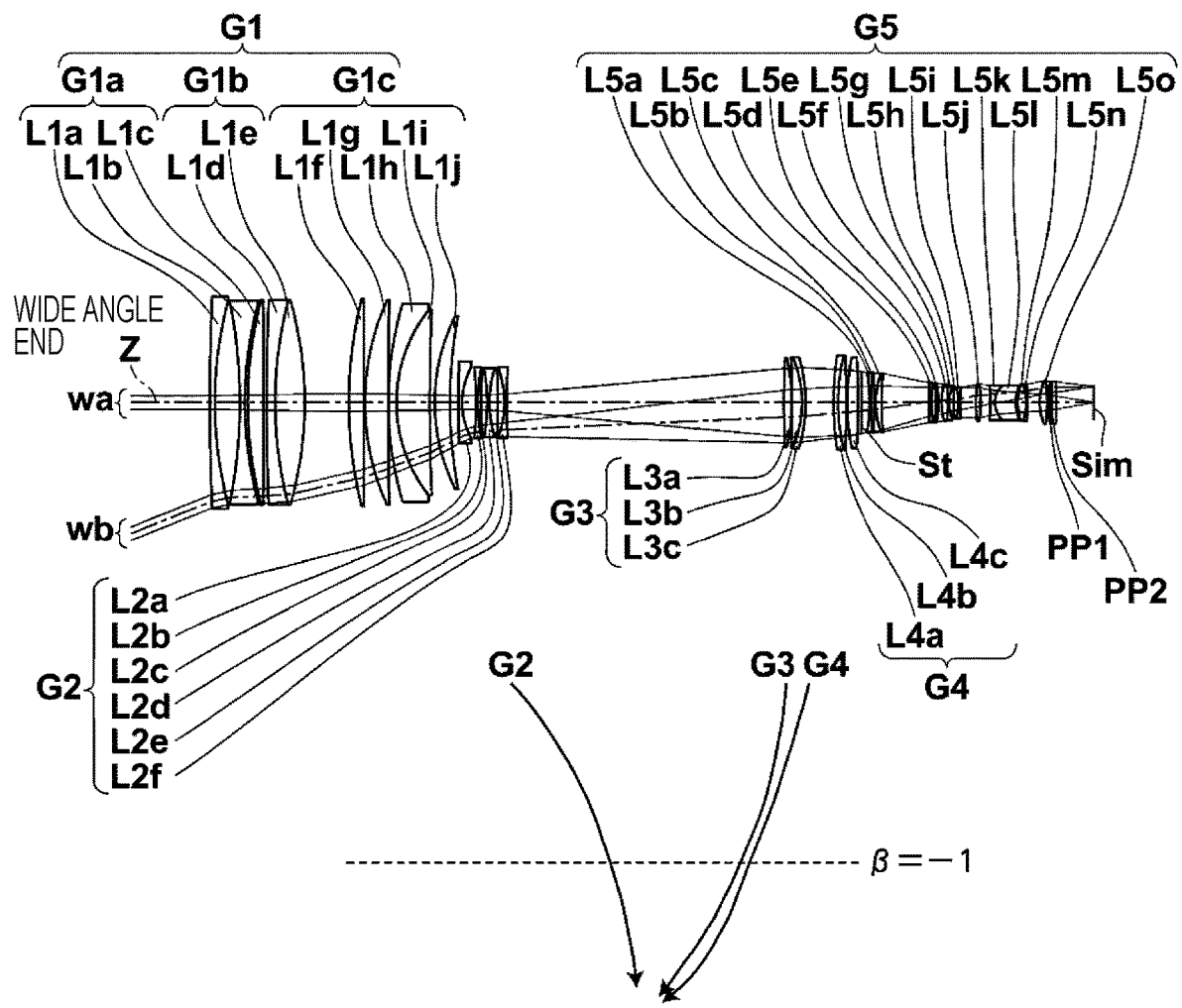
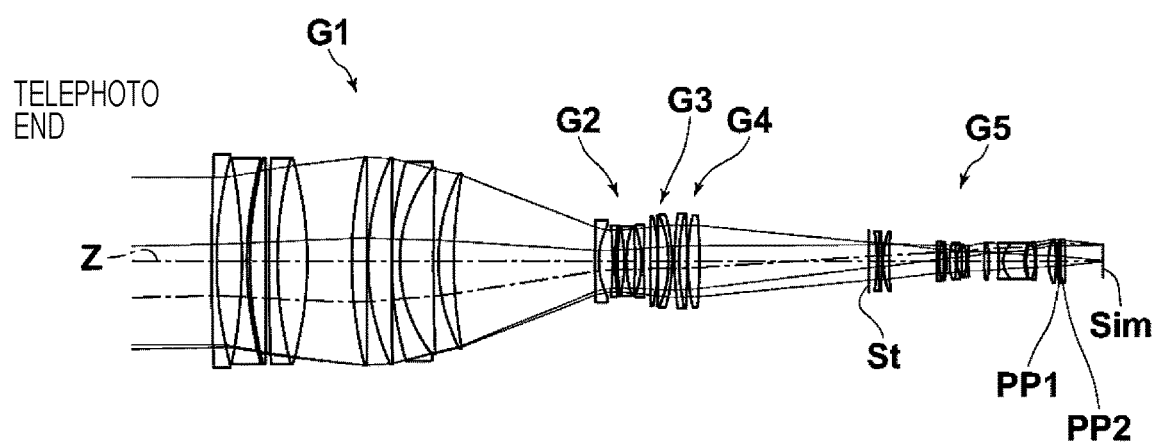

FIG. 7
EXAMPLE 7
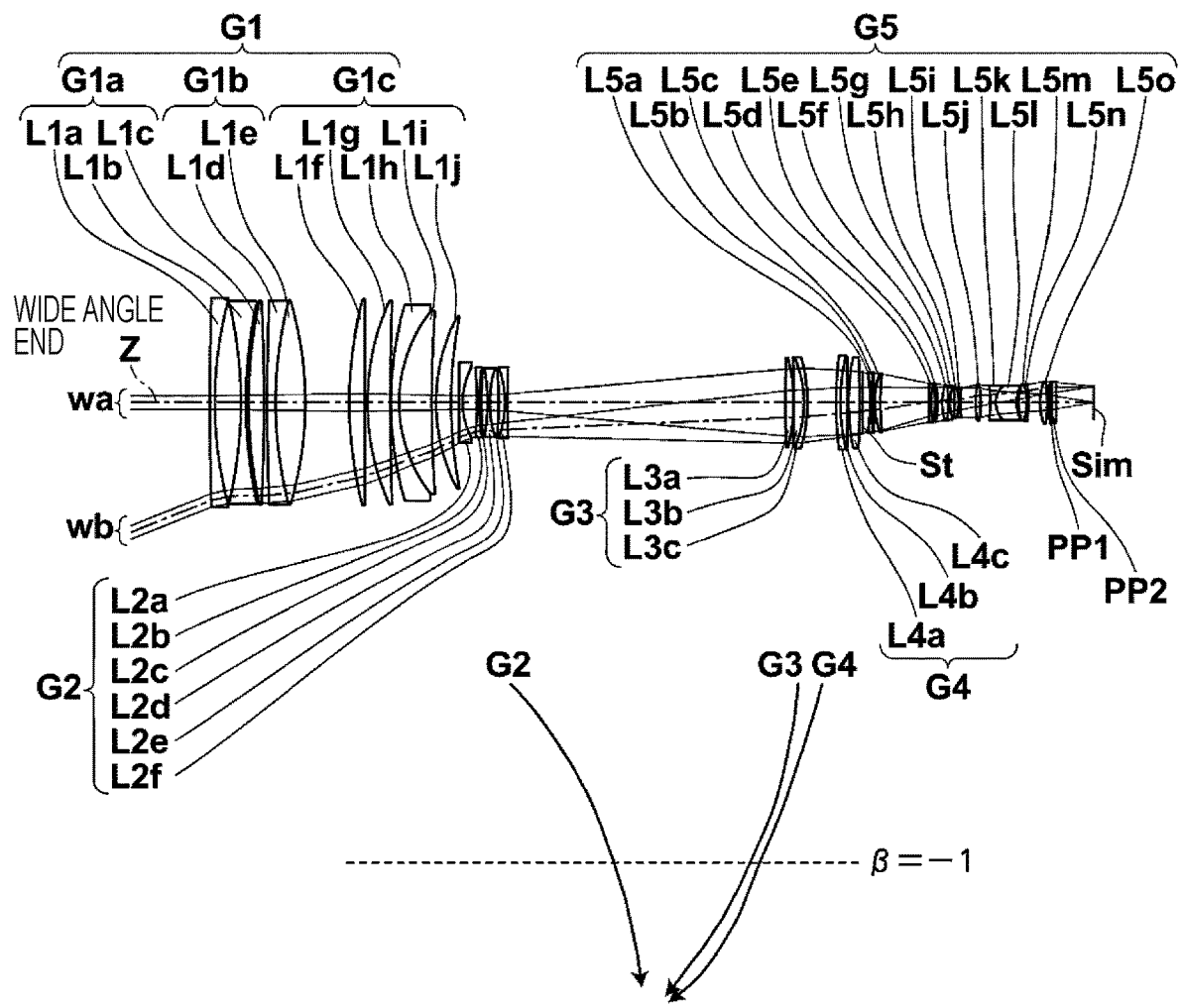
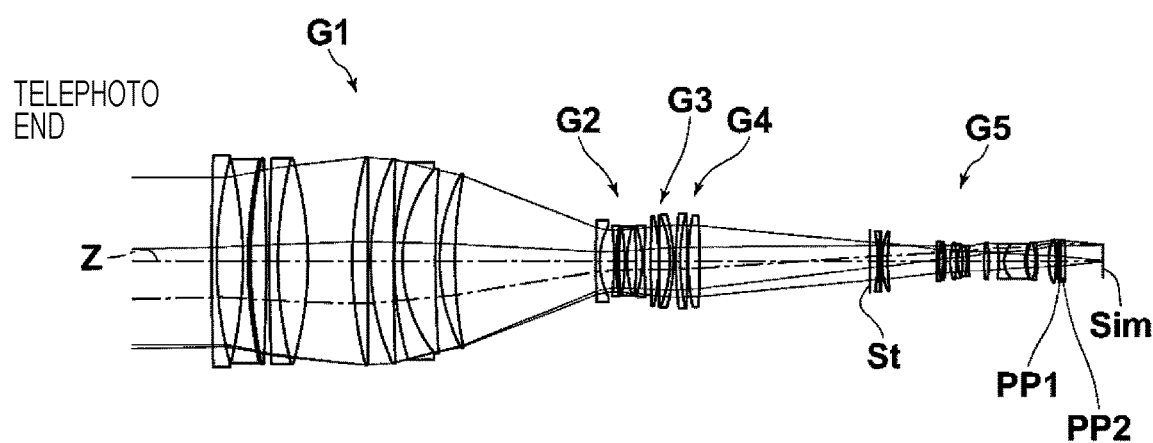

FIG. 8
EXAMPLE 8
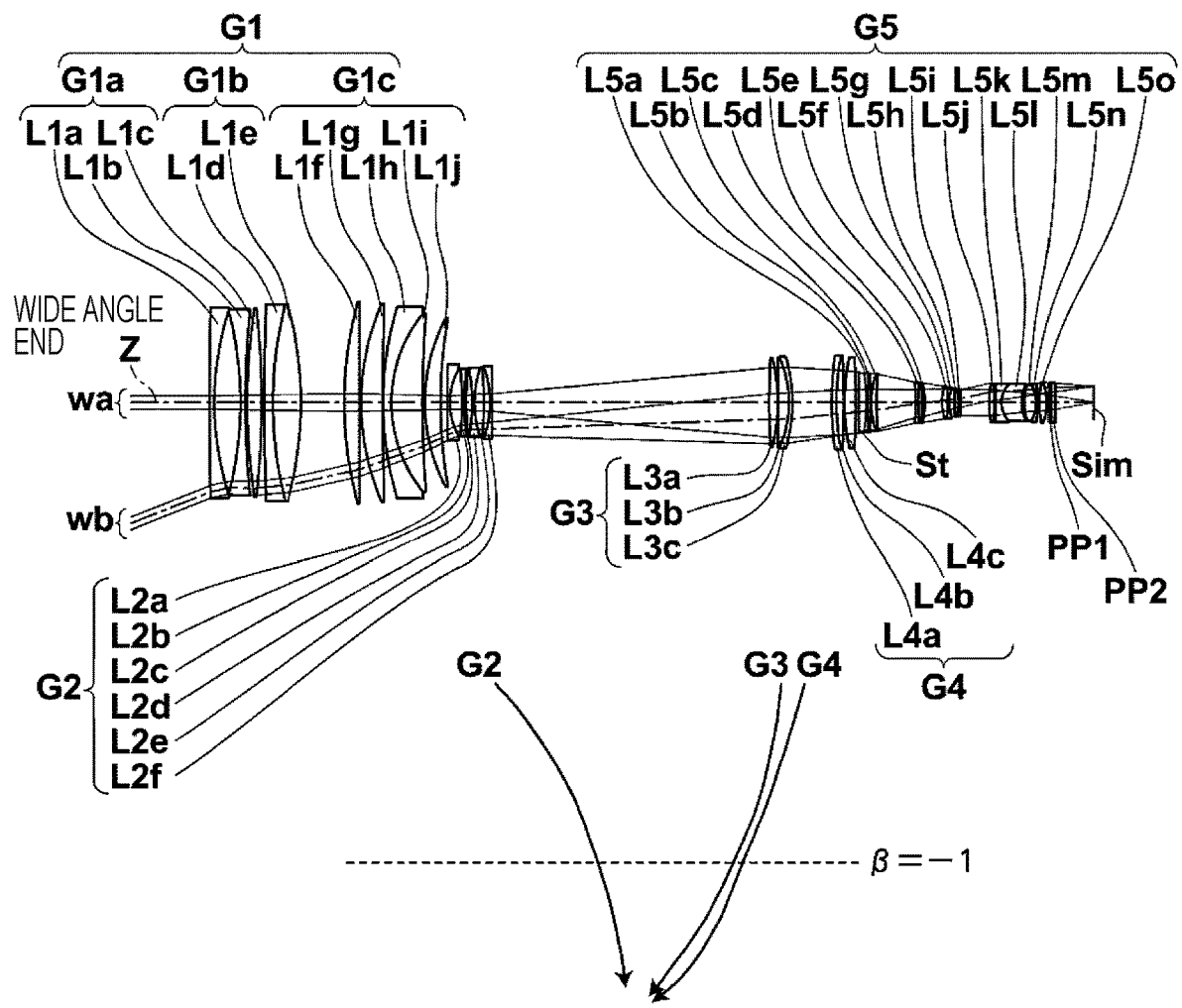
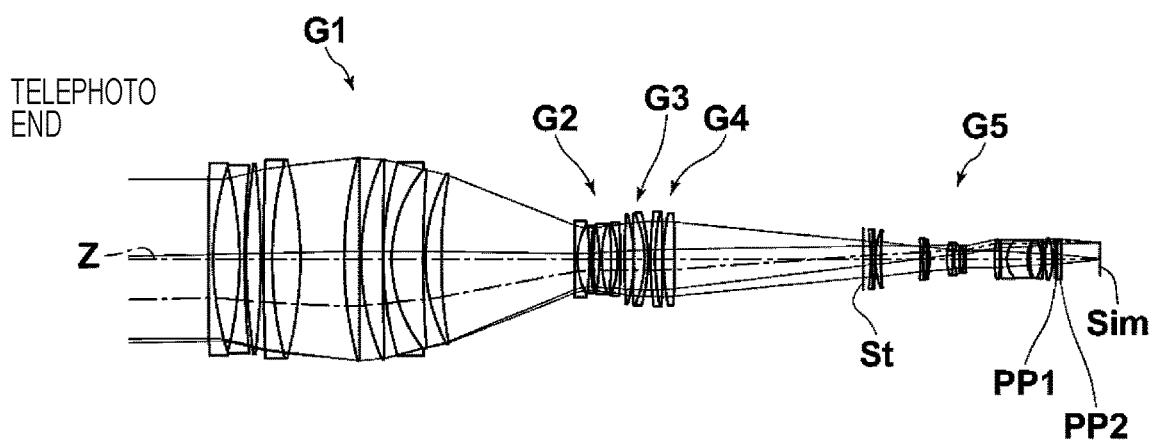

FIG. 9
EXAMPLE 9
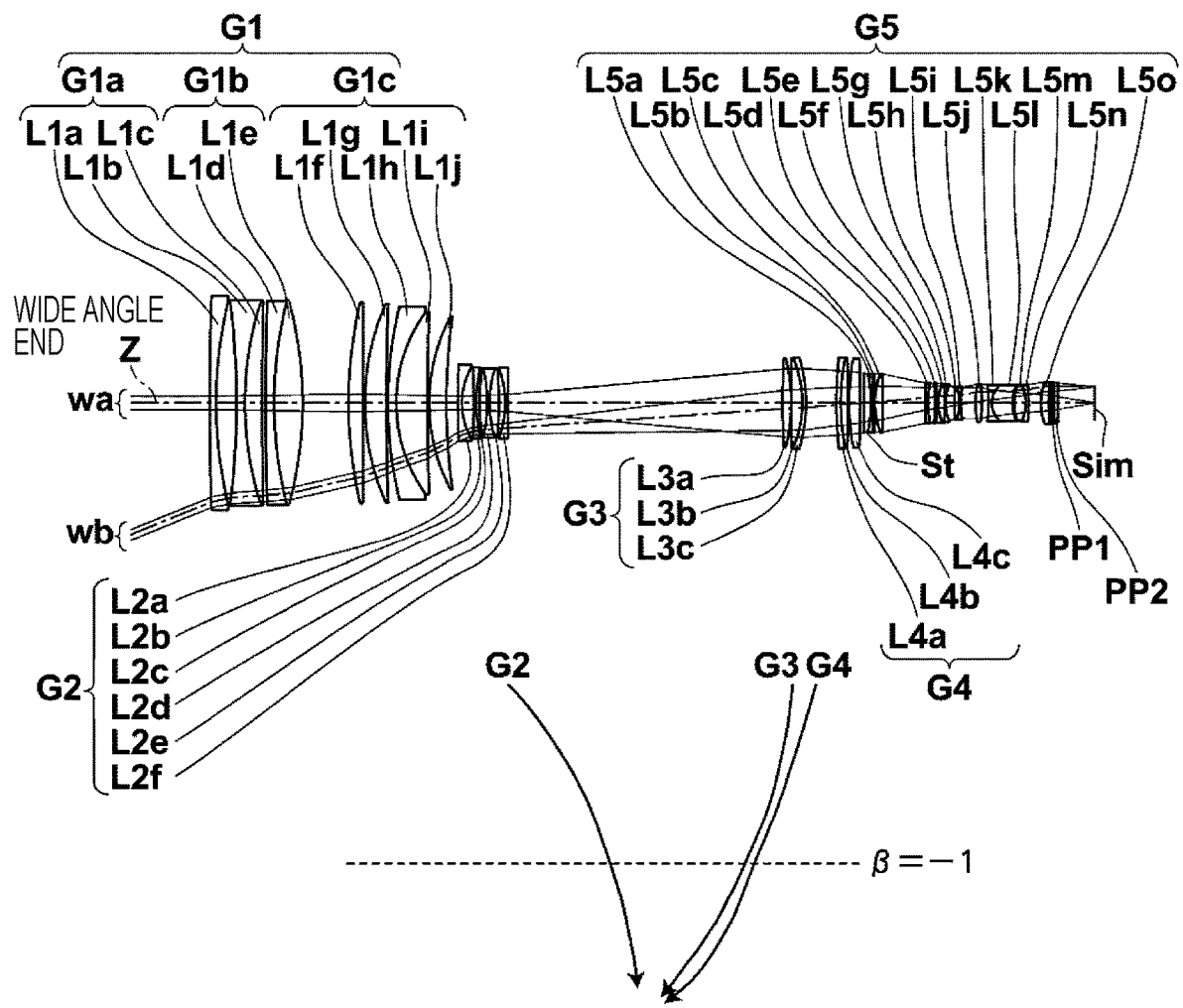
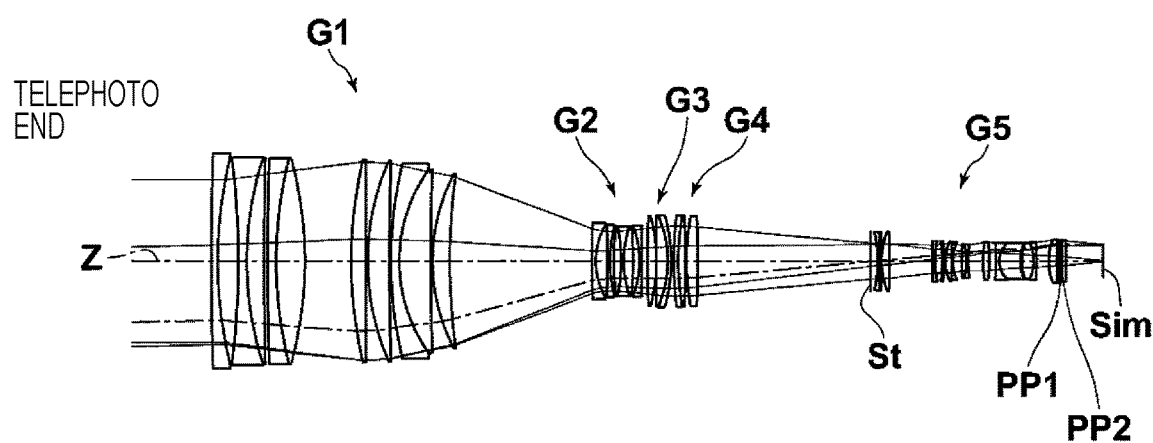

FIG. 10
EXAMPLE 10
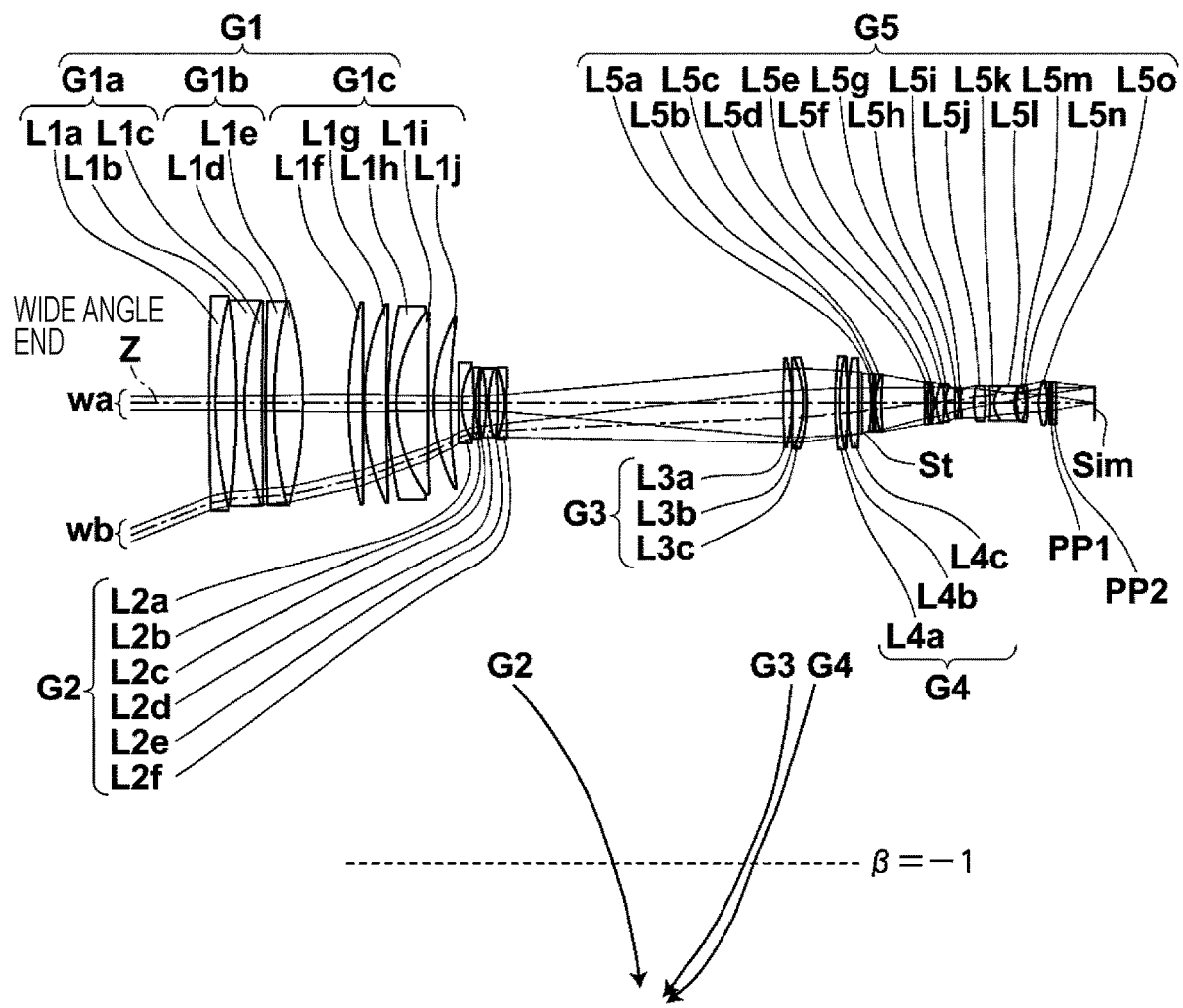
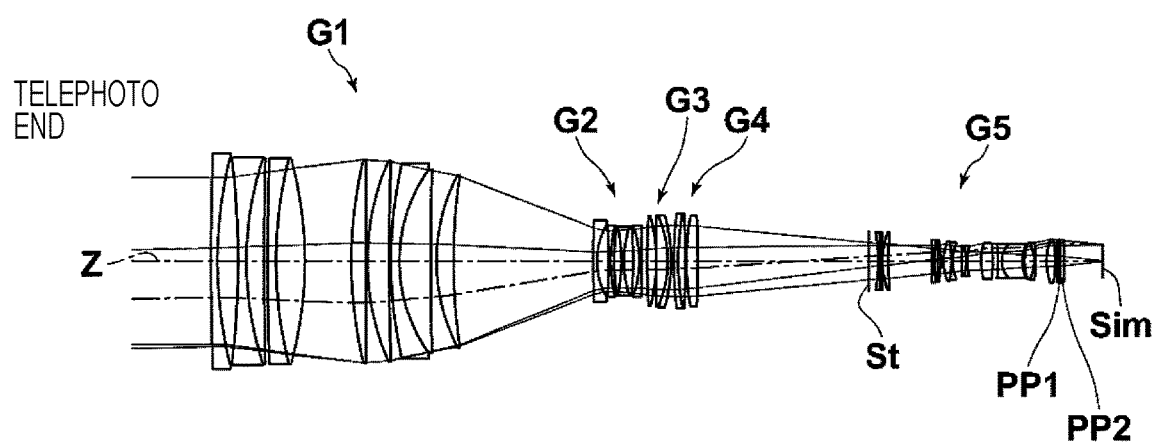

FIG. 11
EXAMPLE 1
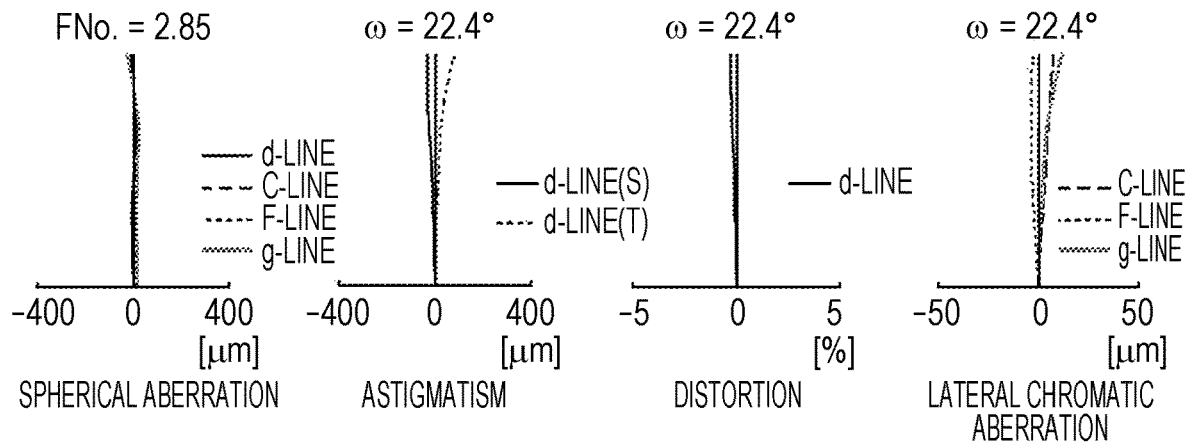
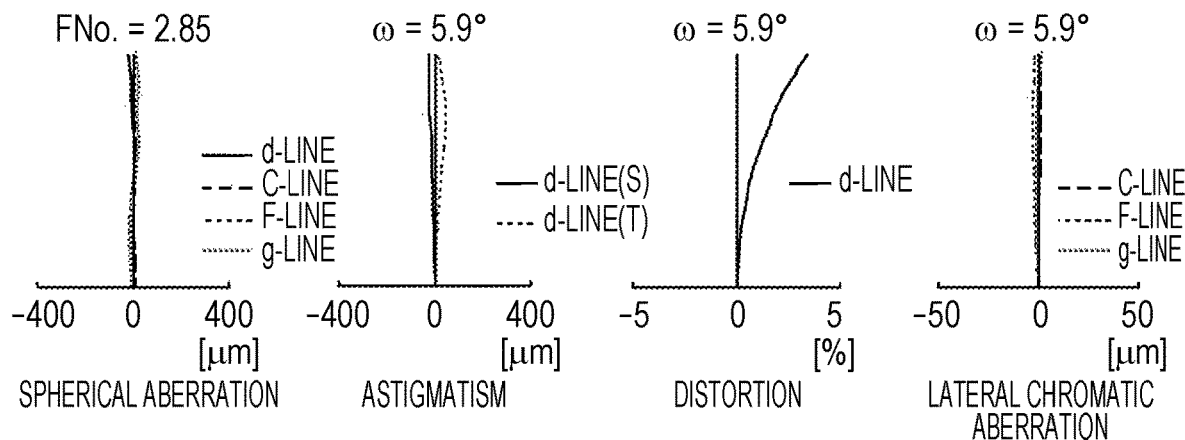
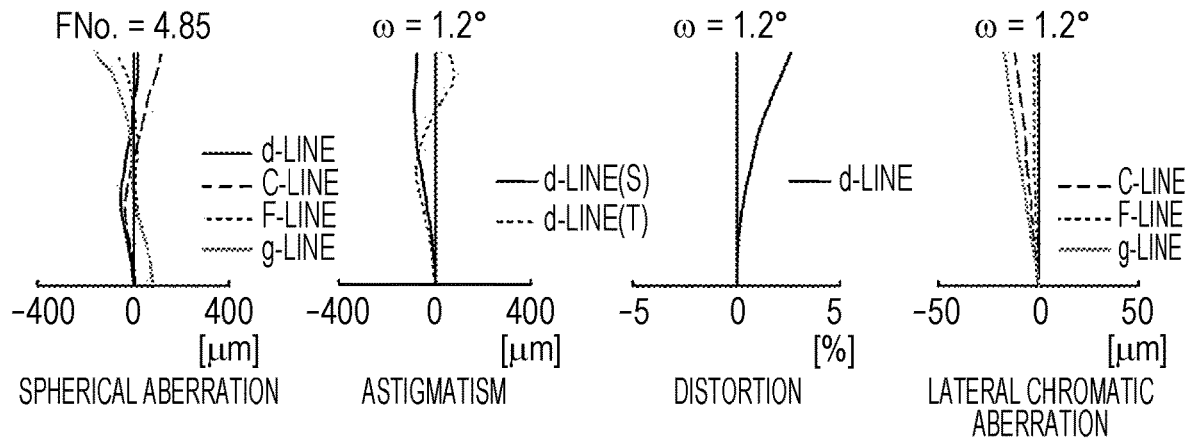

FIG. 12
EXAMPLE 2
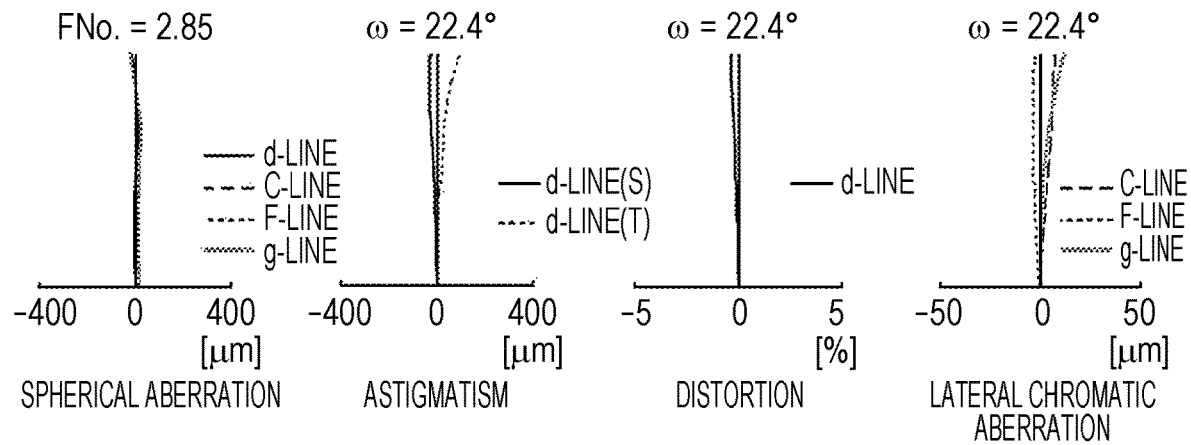
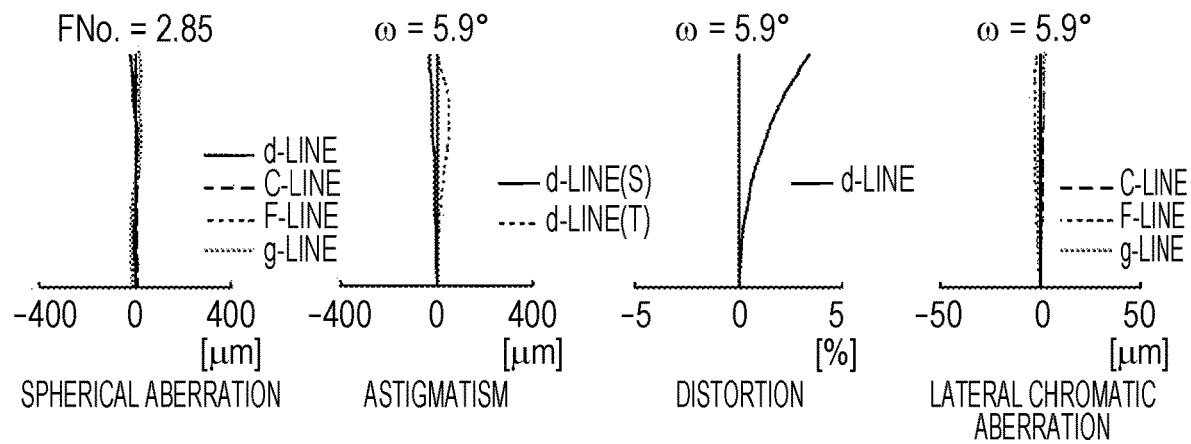
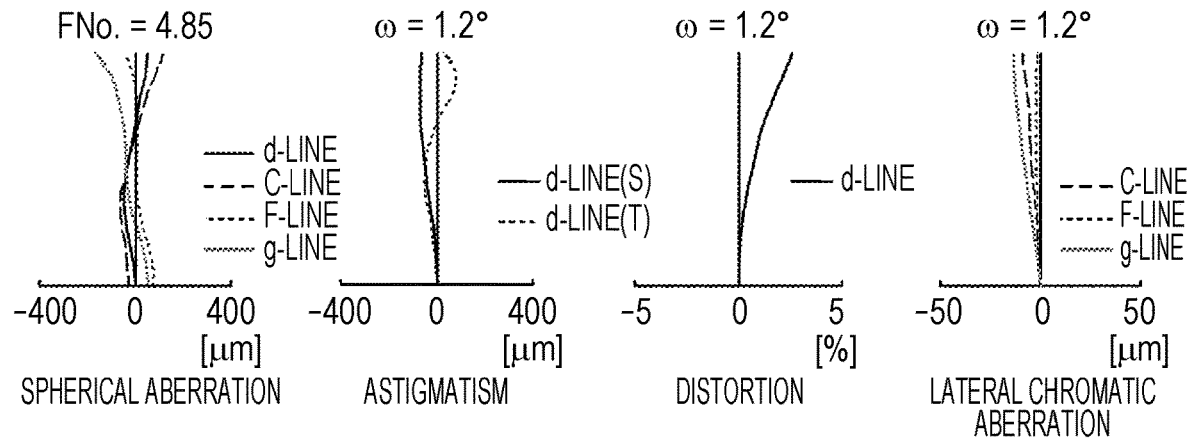

FIG. 13
EXAMPLE 3
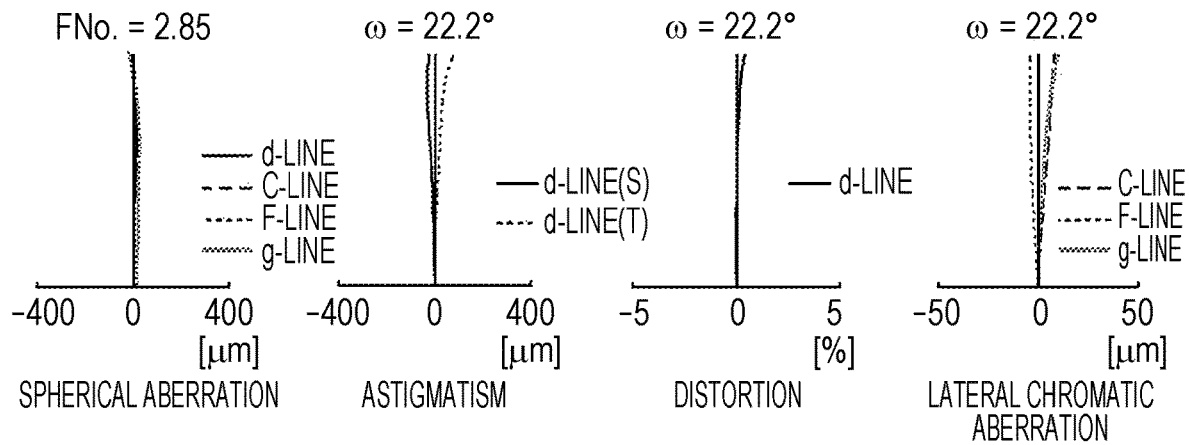
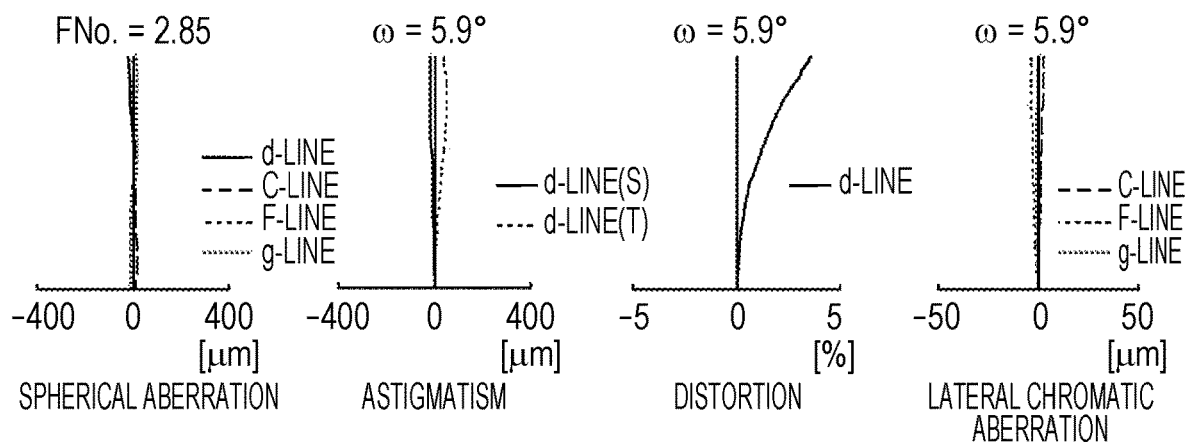
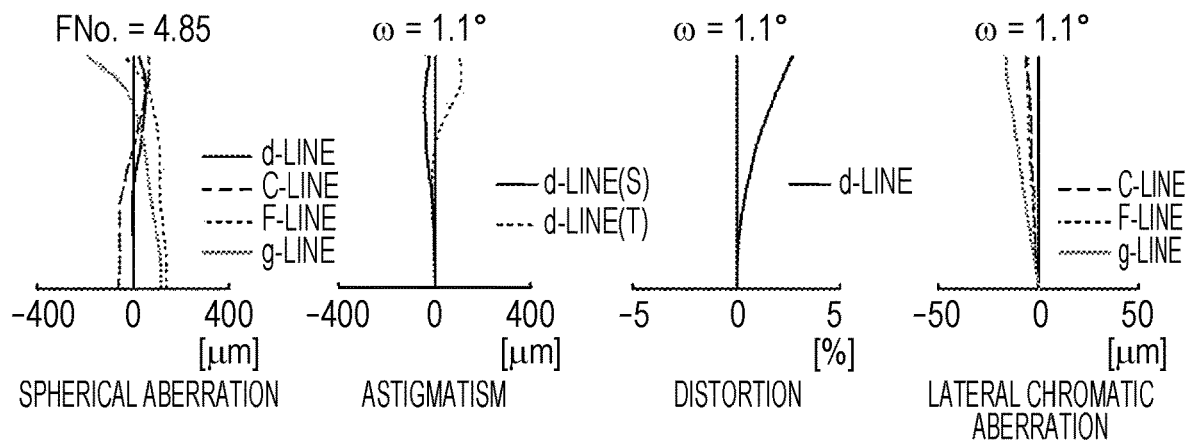

FIG. 14
EXAMPLE 4
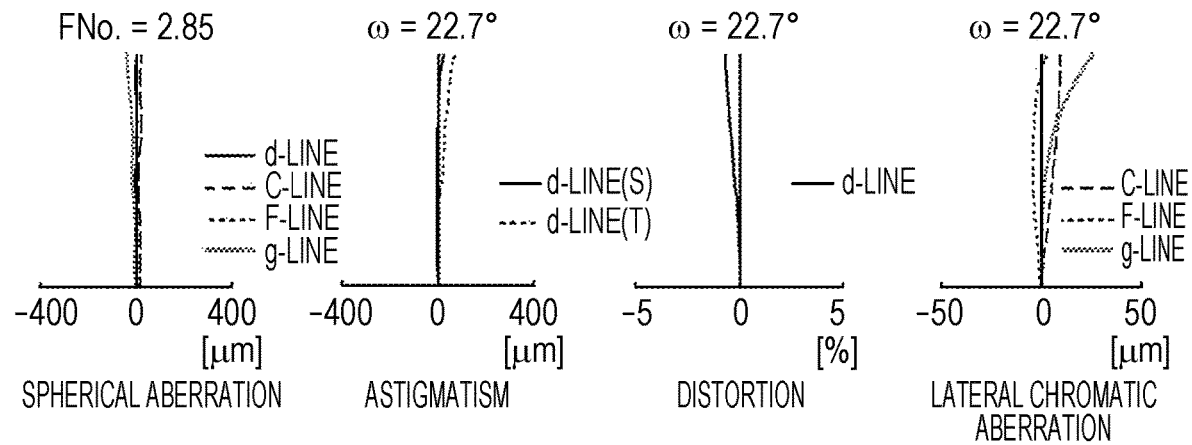
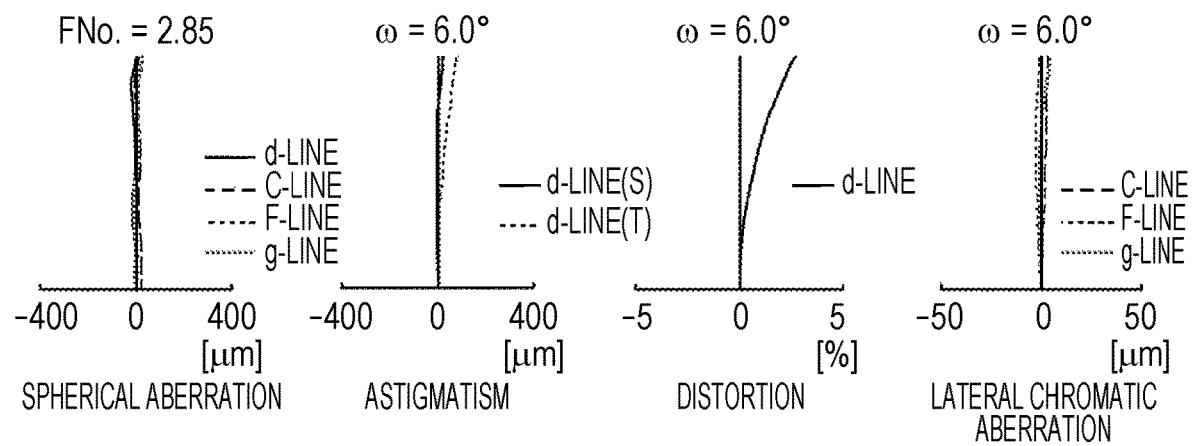
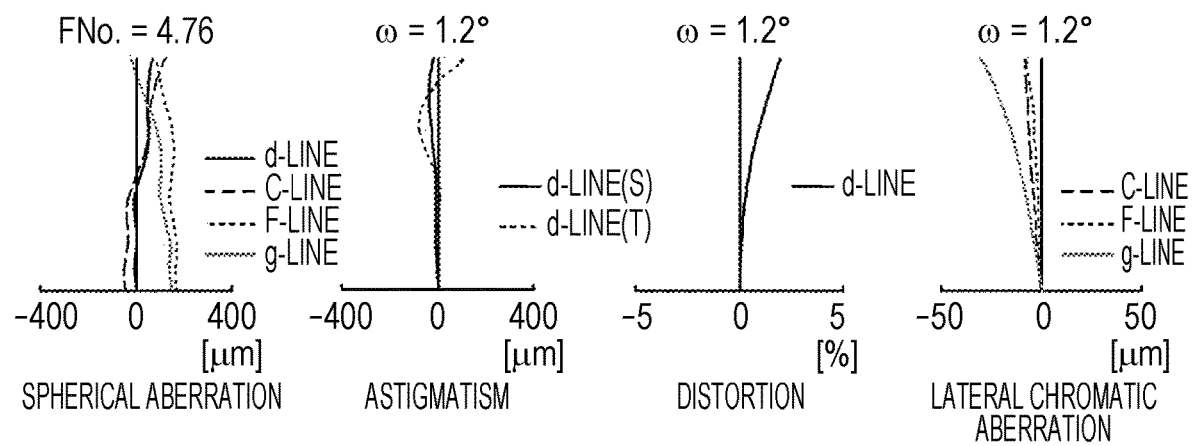

FIG. 15
EXAMPLE 5
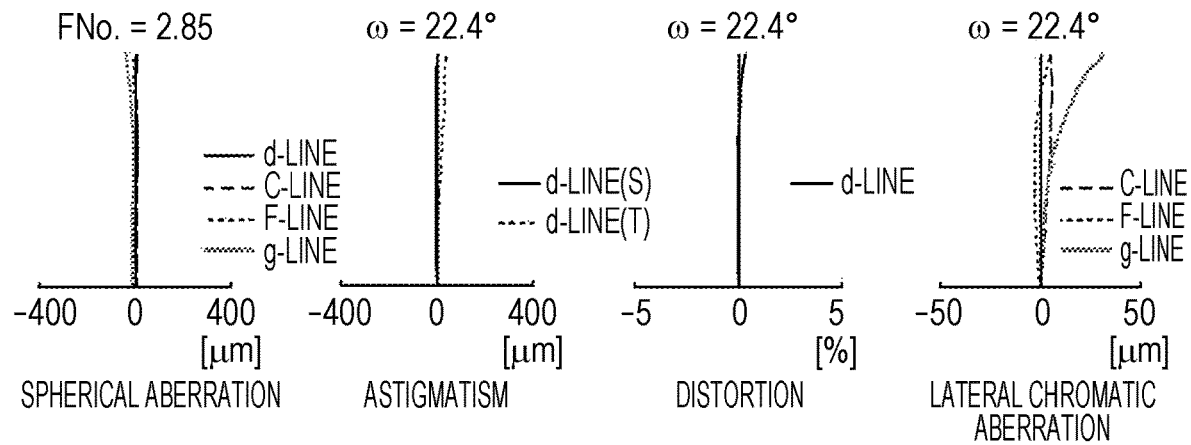
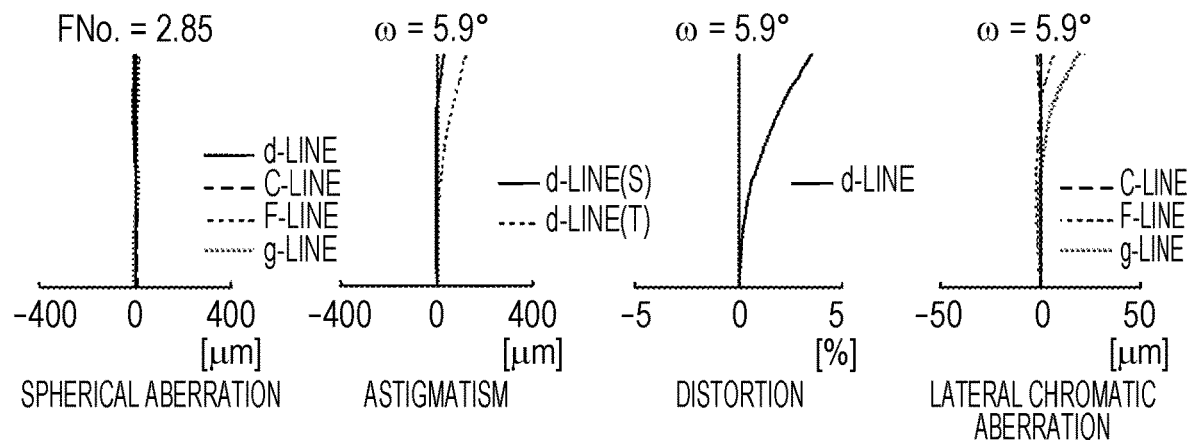
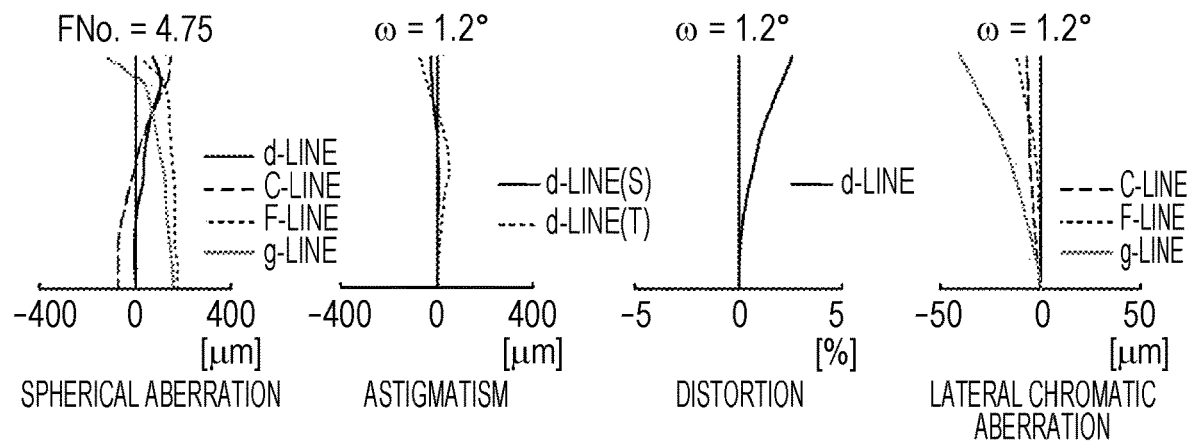

FIG. 16
EXAMPLE 6
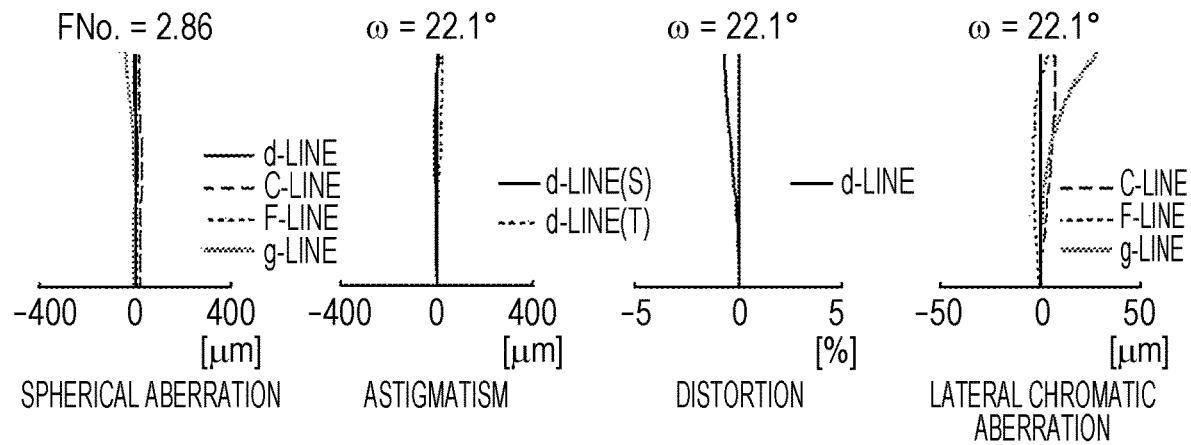
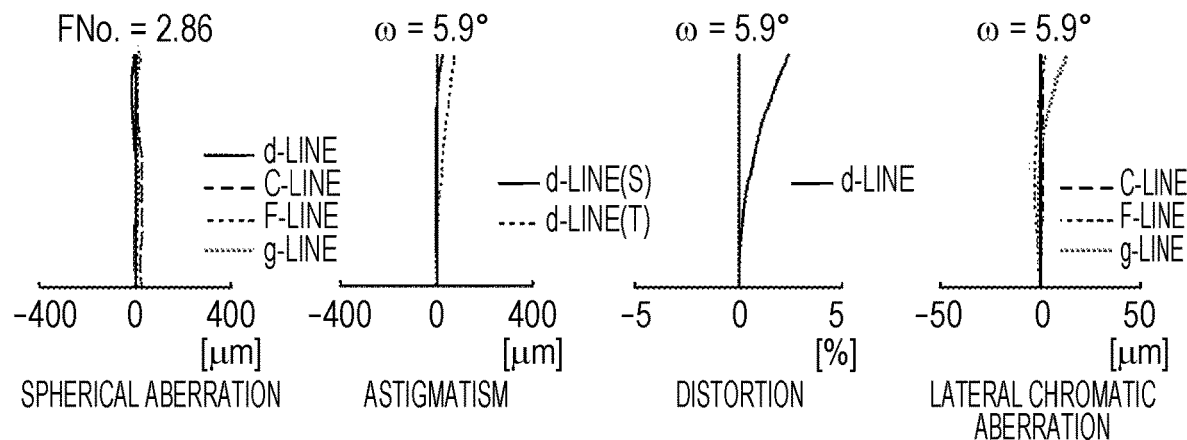
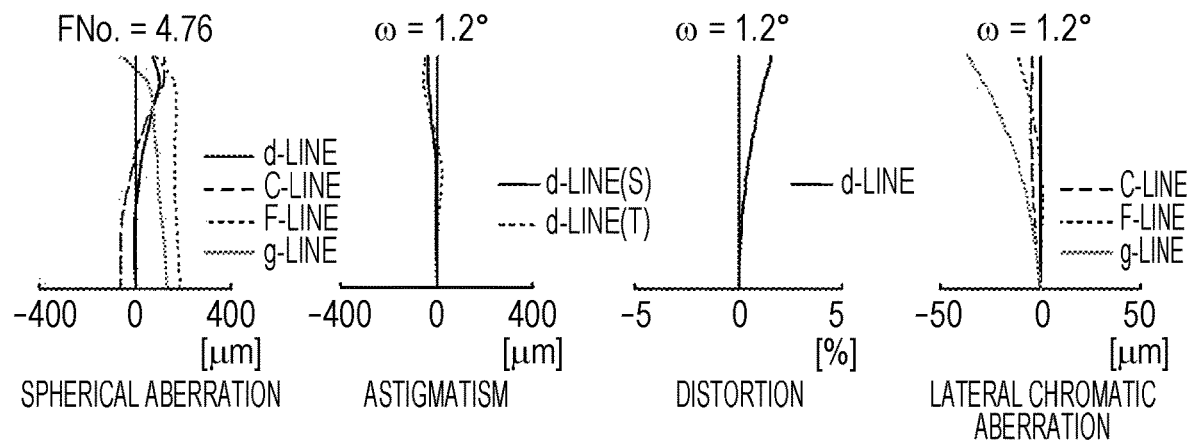

FIG. 17
EXAMPLE 7
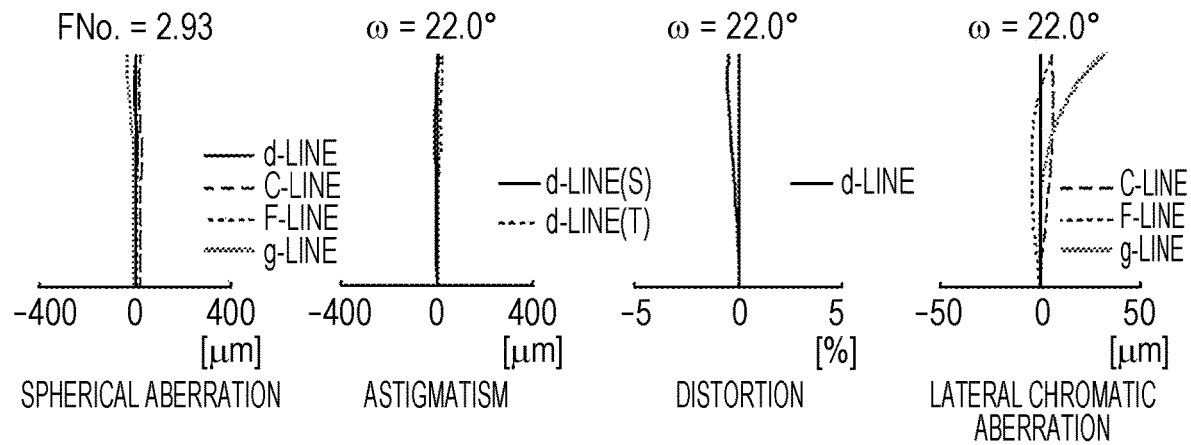
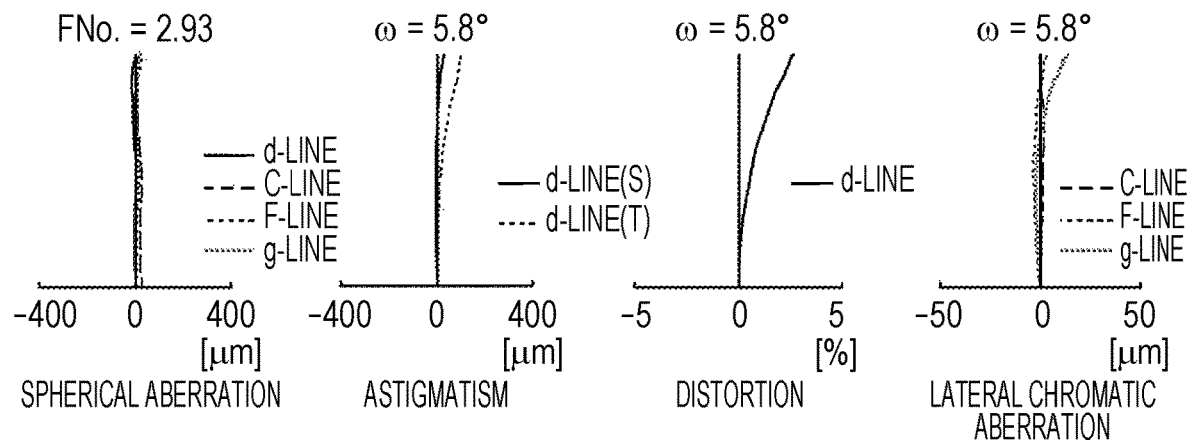
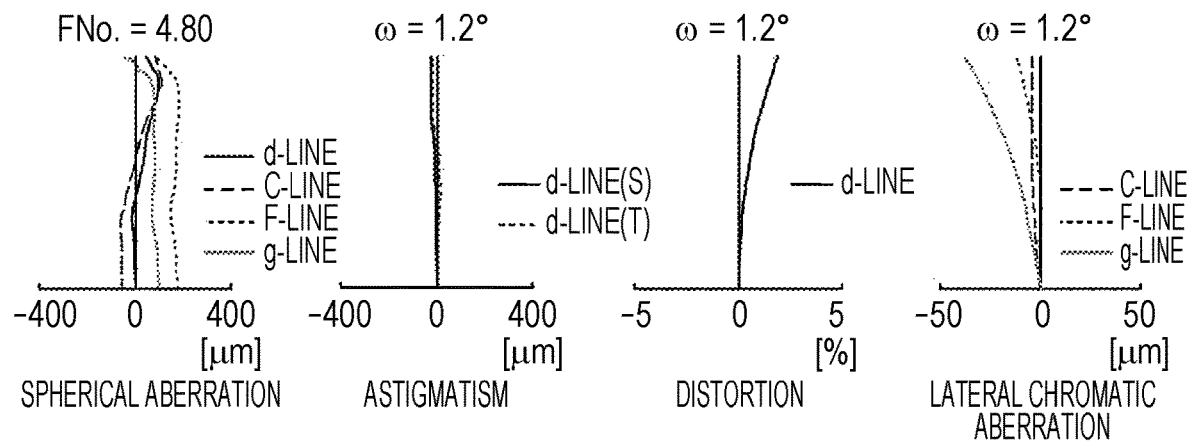

FIG. 18
EXAMPLE 8
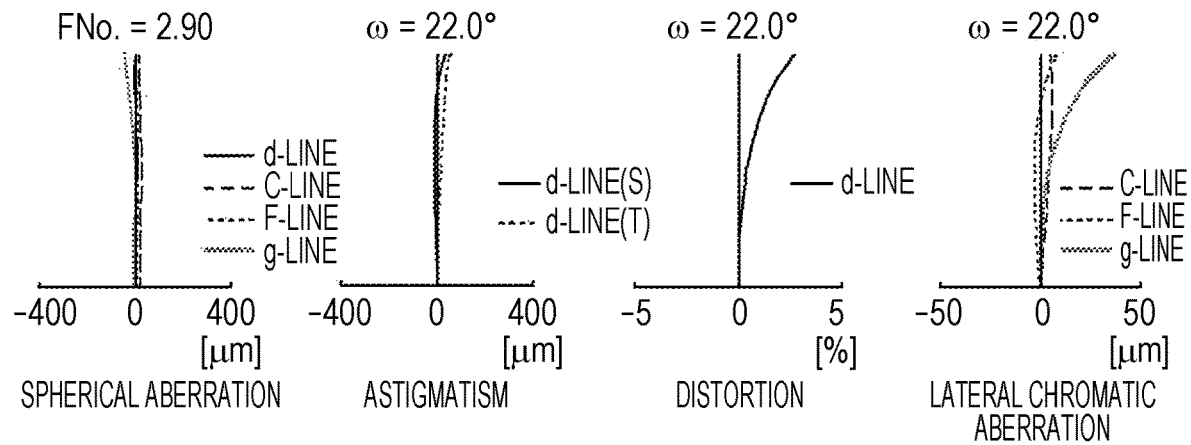
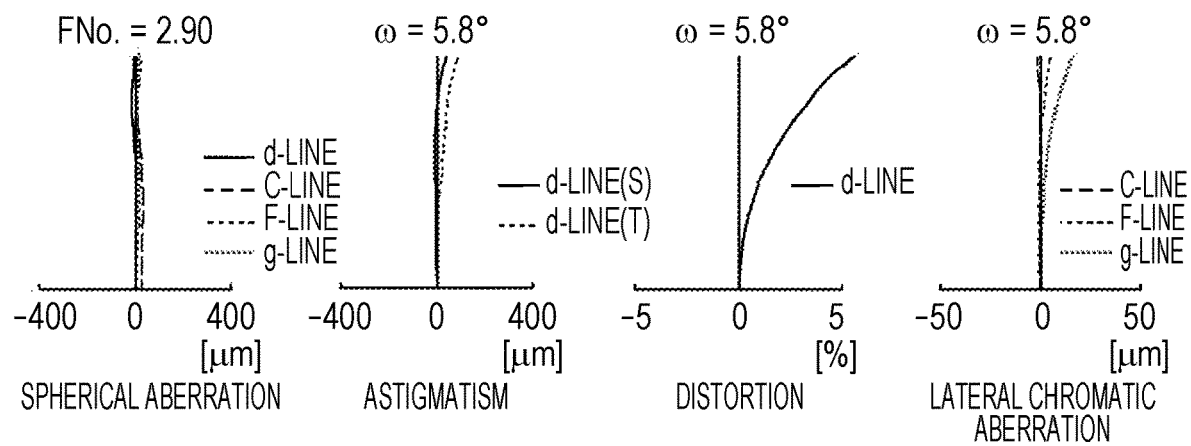
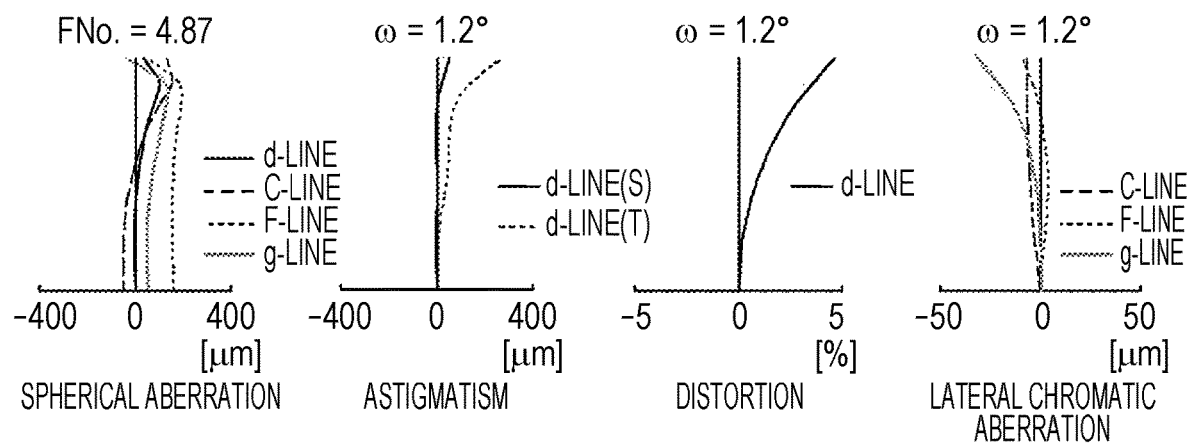

FIG. 19
EXAMPLE 9
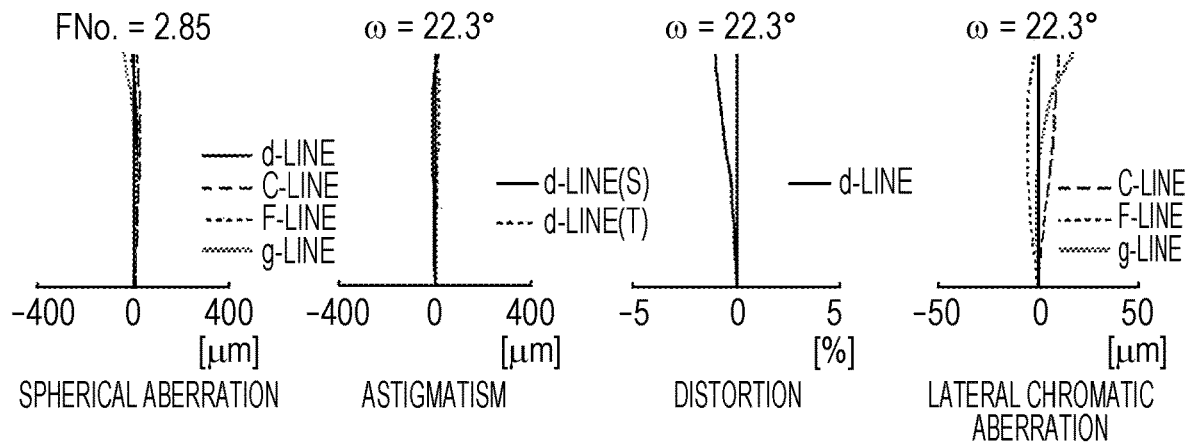
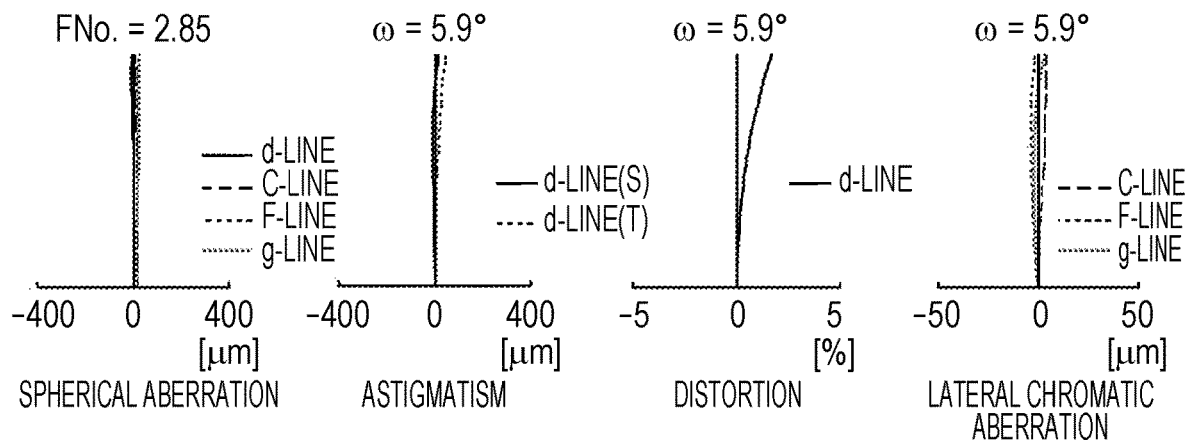
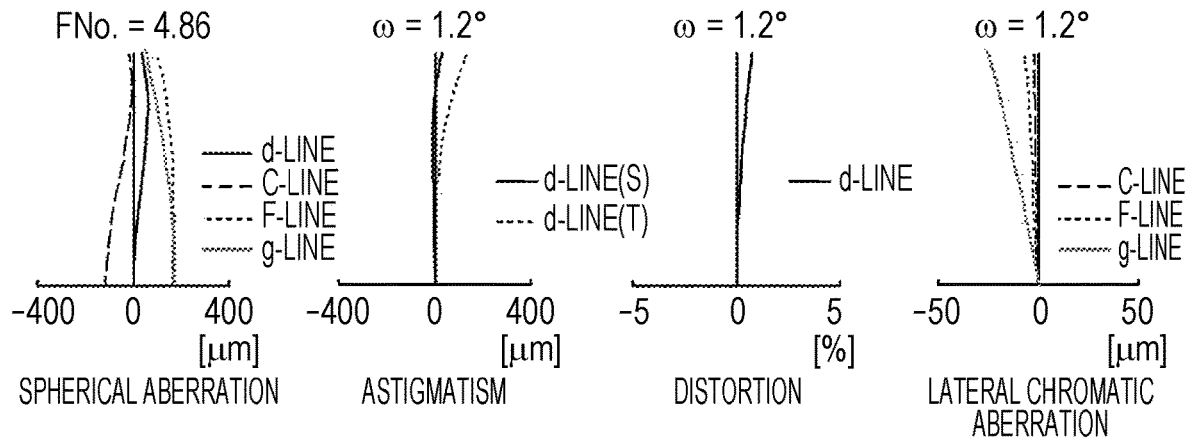

FIG. 20
EXAMPLE 10
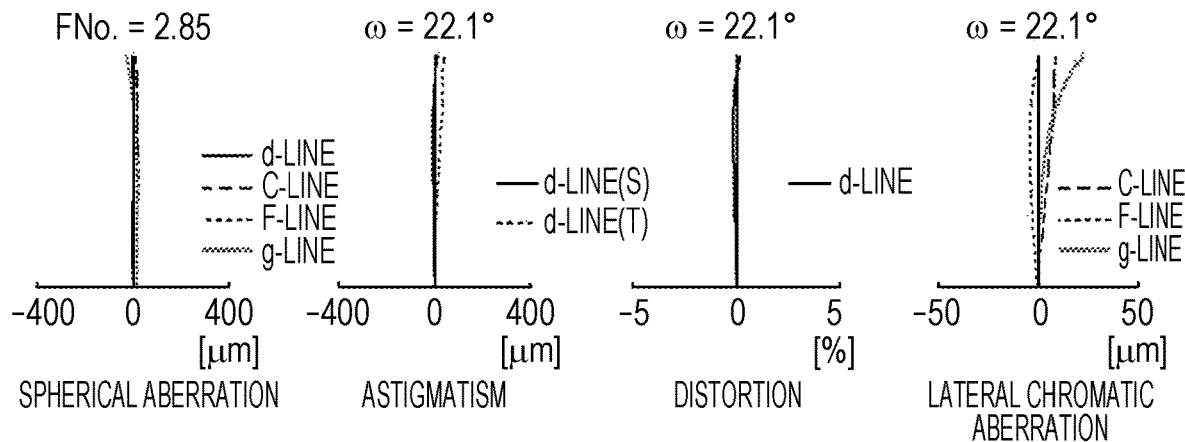
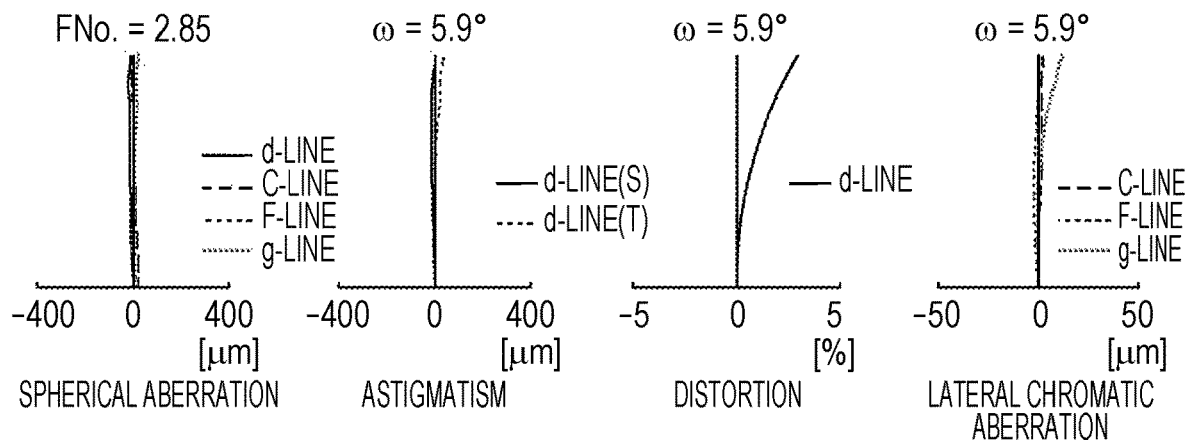
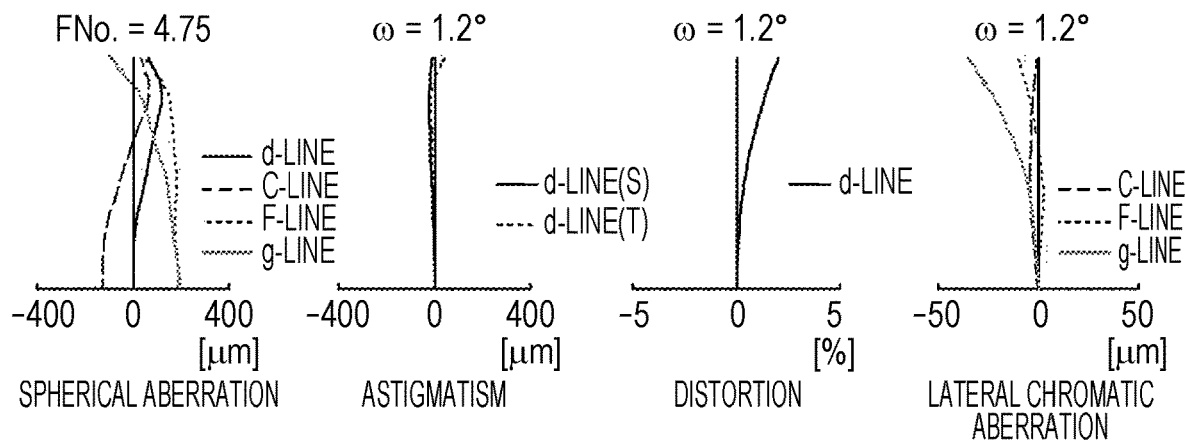

ZOOM LENS AND IMAGING APPARATUS

CROSS-REFERENCE TO RELATED APPLICATIONS

This application is a continuation application of International Application No. PCT/JP2017/009142, filed Mar. 8, 2017, the disclosure of which is incorporated herein by reference in its entirety. Further, this application claims priority from Japanese Patent Application No. 2016-065232, filed Mar. 29, 2016, the disclosure of which is incorporated herein by reference in its entirety.

BACKGROUND OF THE INVENTION

1. Field of the Invention

The present invention relates to a zoom lens suitable for an electronic camera, such as a digital camera, a video camera, a broadcast camera, a motion-picture camera, or a surveillance camera; and also relates to an imaging apparatus including the zoom lens.

2. Description of the Related Art

A zoom lens is suggested in JP2015-212724A, as a zoom lens used for an electronic camera, such as a digital camera, a video camera, a broadcast camera, a motion-picture camera, or a surveillance camera.

SUMMARY OF THE INVENTION

However, the F-number of the lens of JP2015-212724A at a telephoto end is not sufficiently small, and thus a zoom lens having a small F-number at the telephoto end is demanded.

The invention is made in light of the situations, and it is an object of the invention to provide a high-performance zoom lens which has a small F-number at a telephoto end, and whose aberrations have been properly corrected; and an imaging apparatus including the zoom lens.

A zoom lens according to an aspect of the invention consists of, in order from an object side, a first lens group having a positive refractive power, a second lens group having a negative refractive power, a third lens group having a positive refractive power, a fourth lens group having a positive refractive power, and a fifth lens group having a positive refractive power; during zooming, the first lens group is fixed relative to an image surface; during zooming from a wide angle end to a telephoto end, a distance between the first lens group and the second lens group constantly increases, a distance between the second lens group and the third lens group constantly decreases, and a distance between the third lens group and the fourth lens group at the telephoto end is smaller than a distance between the third lens group and the fourth lens group at the wide angle end; the first lens group consists of, in order from the object side, a 1a lens group fixed relative to the image surface during focusing and having a negative refractive power, a 1b lens group being movable along an optical axis during focusing and having a positive refractive power, and a 1c lens group fixed relative to the image surface during focusing and having a positive refractive power, and the 1c lens group has on the most image side four lenses of, in order from the object side, a positive lens, a cemented lens in which a negative meniscus lens having a convex surface facing the object side and a positive lens are cemented in that order from the object side, and a positive meniscus lens having a convex surface facing the object side.

With the zoom lens according to the invention, during zooming, the fifth lens group is preferably fixed relative to the image surface; and during zooming from the wide angle end to the telephoto end, a 3-4 composite lens group composed of the third lens group and the fourth lens group, and the second lens group preferably simultaneously pass through respective points at which imaging magnifications of the 3-4 composite lens group and the second lens group are −1.

During zooming from the wide angle end to the telephoto end, the distance between the third lens group and the fourth lens group preferably decreases, increases, and then decreases.

The following conditional expressions (1) and (2) are preferably satisfied, and the following conditional expression (1-1) and/or conditional expression (2-1) are further preferably satisfied $$75 < f1c\_vd\_ave < 96 \quad (1),$$

$$0.5 < f1c\_\theta gF\_ave < 0.6 \quad (2), \text{ and}$$

$$80 < f1c\_vd\_ave < 96 \quad (1\text{-}1), \text{ and/or}$$

$$0.52 < f1c\_\theta gF\_ave < 0.56 \quad (2\text{-}1),$$

where f1c_vd_ave is an average value of Abbe numbers for a d-line of the positive lenses included in the 1c lens group, and f1c_θgF_ave is an average value of partial dispersion ratios of the positive lenses included in the 1c lens group.

The following conditional expression (3) is preferably satisfied, and the following conditional expression (3-1) is further preferably satisfied $$0.8 < f1/f1c < 1.2 \quad (3), \text{ and}$$

$$0.9 < f1/f1c < 1.1 \quad (3\text{-}1),$$

where f1 is a focal length for the d-line of the first lens group, and f1c is a focal length for the d-line of the 1c lens group.

The number of positive lenses included in the 1b lens group and the 1c lens group is preferably five in total.

When the number of positive lenses included in the 1b lens group and the 1c lens group is five in total, the 1b lens group may consist of, in order from the object side, a cemented lens in which a negative meniscus lens and a biconvex lens are cemented in that order from the object side, and a biconvex lens; and the 1c lens group may consist of, in order from the object side, a biconvex lens, a cemented lens in which a negative meniscus lens and a positive meniscus lens are cemented in that order from the object side, and a positive meniscus lens.

When the number of positive lenses included in the 1b lens group and the 1c lens group is five in total, the 1b lens group may consist of a cemented lens in which a negative meniscus lens and a biconvex lens are cemented in that order from the object side; and the 1c lens group may consist of, in order from the object side, a positive lens having a convex surface facing the object side, a positive meniscus lens, a cemented lens in which a negative meniscus lens and a positive meniscus lens are cemented in that order from the object side, and a positive meniscus lens.

The 1a lens group preferably consists of, in order from the object side, a first negative lens, a second negative lens, and a positive lens, preferably satisfies the following conditional expression (4), and further preferably satisfies the following conditional expression (4-1)

$$-0.8<(L1ar+L1bf)/(L1ar-L1bf)<-0.04 \quad (4), \text{ and}$$

$$-0.5<(L1ar+L1bf)/(L1ar-L1bf)<-0.04 \quad (4-1),$$

where

L1ar is a curvature radius of a surface on an image side of the first negative lens, and L1bf is a curvature radius of a surface on the object side of the second negative lens.

When the 1a lens group consists of, in order from the object side, the first negative lens, the second negative lens, and the positive lens, the 1a lens group preferably satisfies the following conditional expression (5), and further preferably satisfies the following conditional expression (5-1)

$$0.04<d2/tt1<0.15 \quad (5), \text{ and}$$

$$0.06<d2/tt1<0.12 \quad (5-1),$$

where d2 is a distance between the first negative lens and the second negative lens, and tt1 is a length on the optical axis of the first lens group.

The 1a lens group preferably consists of, in order from the object side, a negative meniscus lens, a biconcave lens, and a positive lens.

The second lens group preferably consists of, in order from the object side, a first lens component, a second lens component, a third lens component, and a fourth lens component; and the first lens component is preferably a negative lens having a concave surface that faces the image side and that has a smaller absolute value of a curvature radius than an absolute value of a curvature radius of a surface on the object side of the negative lens; the second lens component is preferably a cemented lens in which a biconcave lens and a positive meniscus lens are cemented in that order from the object side and which entirely has a negative refractive power; the third lens component is preferably a cemented lens in which a biconcave lens and a positive lens are cemented in that order from the object side; and the fourth lens component is preferably a negative lens having a concave surface that faces the object side and that has a smaller absolute value of a curvature radius than an absolute value of a curvature radius of a surface on the image side of the negative lens.

An imaging apparatus according to the invention includes the above-described zoom lens according to the invention.

The aforementioned expression "consist of . . . " implies that a lens having no power; optical elements other than a lens, such as a diaphragm, a mask, a cover glass, and a filter; a lens flange; a lens barrel; an imaging element; a mechanism part such as a camera shake correction mechanism; and so forth, may be included in addition to those described as the components.

The sign of the refractive power of any of the aforementioned lens groups, the sign of the refractive power of any of the aforementioned lenses, and the surface shape of any of the lenses are considered in a paraxial region as far as an aspherical surface is included. All the aforementioned conditional expressions use the d-line (wavelength of 587.6 nm) as the reference and use values in focus at infinity unless otherwise noted.

A zoom lens according to the invention consists of, in order from an object side, a first lens group having a positive refractive power, a second lens group having a negative refractive power, a third lens group having a positive refractive power, a fourth lens group having a positive refractive power, and a fifth lens group having a positive refractive power; during zooming, the first lens group is fixed relative to an image surface; during zooming from a wide angle end to a telephoto end, a distance between the first lens group and the second lens group constantly increases, a distance between the second lens group and the third lens group constantly decreases, and a distance between the third lens group and the fourth lens group at the telephoto end is smaller than a distance between the third lens group and the fourth lens group at the wide angle end; the first lens group consists of, in order from the object side, a 1a lens group fixed relative to the image surface during focusing and having a negative refractive power, a 1b lens group being movable along an optical axis during focusing and having a positive refractive power, and a 1c lens group fixed relative to the image surface during focusing and having a positive refractive power; and the 1c lens group has on the most image side four lenses of, in order from the object side, a positive lens, a cemented lens in which a negative meniscus lens having a convex surface facing the object side and a positive lens are cemented in that order from the object side, and a positive meniscus lens having a convex surface facing the object side. Thus, the zoom lens can be a high-performance zoom lens which has a small F-number at the telephoto end, and whose aberrations have been properly corrected.

An imaging apparatus according to the invention includes the zoom lens according to the invention, and thus an image with high image quality can be obtained.

BRIEF DESCRIPTION OF THE DRAWINGS

FIG. 1 provides cross-sectional views illustrating a lens configuration of a zoom lens according to an embodiment (common to Example 1) of the invention;

FIG. 2 provides cross-sectional views illustrating a lens configuration of a zoom lens according to Example 2 of the invention;

FIG. 3 provides cross-sectional views illustrating a lens configuration of a zoom lens according to Example 3 of the invention;

FIG. 4 provides cross-sectional views illustrating a lens configuration of a zoom lens according to Example 4 of the invention;

FIG. 5 provides cross-sectional views illustrating a lens configuration of a zoom lens according to Example 5 of the invention;

FIG. 6 provides cross-sectional views illustrating a lens configuration of a zoom lens according to Example 6 of the invention;

FIG. 7 provides cross-sectional views illustrating a lens configuration of a zoom lens according to Example 7 of the invention;

FIG. 8 provides cross-sectional views illustrating a lens configuration of a zoom lens according to Example 8 of the invention;

FIG. 9 provides cross-sectional views illustrating a lens configuration of a zoom lens according to Example 9 of the invention;

FIG. 10 provides cross-sectional views illustrating a lens configuration of a zoom lens according to Example 10 of the invention;

FIG. 11 provides aberration diagrams of the zoom lens according to Example 1 of the invention;

FIG. 12 provides aberration diagrams of the zoom lens according to Example 2 of the invention;

FIG. 13 provides aberration diagrams of the zoom lens according to Example 3 of the invention;

FIG. 14 provides aberration diagrams of the zoom lens according to Example 4 of the invention;

FIG. 15 provides aberration diagrams of the zoom lens according to Example 5 of the invention;

FIG. 16 provides aberration diagrams of the zoom lens according to Example 6 of the invention;

FIG. 17 provides aberration diagrams of the zoom lens according to Example 7 of the invention;

FIG. 18 provides aberration diagrams of the zoom lens according to Example 8 of the invention;

FIG. 19 provides aberration diagrams of the zoom lens according to Example 9 of the invention;

FIG. 20 provides aberration diagrams of the zoom lens according to Example 10 of the invention.

DESCRIPTION OF THE PREFERRED EMBODIMENTS

Figure 21:
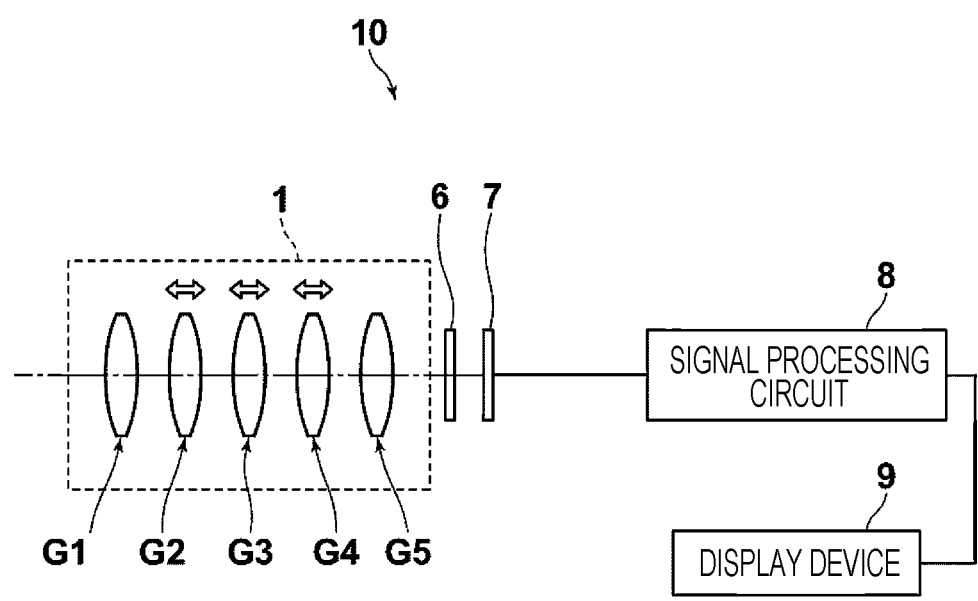
FIG. 21 is a brief configuration diagram of an imaging apparatus according to an embodiment of the invention.

An embodiment of the invention is described below in detail with reference to the drawings. FIG. 1 provides cross-sectional views illustrating a lens configuration of a zoom lens according to an embodiment of the invention. A configuration example illustrated in FIG. 1 is common to the configuration of a zoom lens according to Example 1 which will be described later. In FIG. 1, the left side is an object side and the right side is an image side. An illustrated aperture diaphragm St does not necessarily indicate the size or shape, but indicates the position on an optical axis Z. FIG. 1 also illustrates an arrow indicative of a movement locus of each lens group during zooming from a wide angle end to a telephoto end, a point at which an imaging magnification is −1 (a horizontal dotted line with β=−1 in the drawing), axial rays wa, and rays wb at the maximum angle of view.

The zoom lens according to this embodiment consists of, in order from the object side, a first lens group G1 having a positive refractive power, a second lens group G2 having a negative refractive power, a third lens group G3 having a positive refractive power, a fourth lens group G4 having a positive refractive power, an aperture diaphragm St, and a fifth lens group G5 having a positive refractive power; and the zoom lens is configured such that, during zooming, the first lens group G1 is fixed relative to an image surface Sim, and during zooming from the wide angle end to the telephoto end, the distance between the first lens group G1 and the second lens group G2 constantly increases, the distance between the second lens group G2 and the third lens group G3 constantly decreases, and the distance between the third lens group G3 and the fourth lens group G4 at the telephoto end is smaller than that at the wide angle end.

When the zoom lens is applied to an imaging apparatus, it is preferable to arrange a cover glass, a prism, and/or any of various filters, such as an infrared cut filter or a low pass filter, between the optical system and the image surface Sim in accordance with a camera configuration on which the lens is mounted. Thus, FIG. 1 illustrates an example in which parallel-plane-shaped optical members PP1 and PP2 that expect the above-listed components are arranged between the lens system and the image surface Sim.

With this configuration, the third lens group G3 and the fourth lens group G4 correct a variation in position of the image surface caused by zooming with respect to the second lens group G2 that acts on zooming, and the third lens group G3 and the fourth lens group G4 relatively move. Thus, field curvature during zooming can be corrected and a variation in spherical aberration during zooming can be properly corrected.

Since the third lens group G3 and the fourth lens group G4 are configured to move so that the distance therebetween on a telephoto side is smaller than that on a wide angle side, the movement range of the second lens group G2 on the telephoto side can be large, and the refractive power of the second lens group G2 can be suppressed. Thus, a variation in aberration caused by zooming can be suppressed.

The first lens group G1 is composed of, in order from the object side, a 1a lens group G1a fixed relative to the image surface Sim during focusing and having a negative refractive power, a 1b lens group G1b being movable along an optical axis during focusing and having a positive refractive power, and a 1c lens group G1c fixed relative to the image surface Sim during focusing and having a positive refractive power. This configuration contributes to reduction in spherical aberration, axial chromatic aberration, and variation in the angle of view caused by downsizing and/or focusing.

The 1c lens group G1c is configured to have on the most image side four lenses of, in order from the object side, a positive lens, a cemented lens in which a negative meniscus lens having a convex surface facing the object side and a positive lens are cemented in that order from the object side, and a positive meniscus lens having a convex surface facing the object side.

With this configuration, since spherical aberration of marginal rays on the telephoto side is properly corrected, the F-number can be decreased while high magnification is attained. Specifically, marginal rays on the telephoto side become convergent rays due to the positive lens on the most object side among the four lenses. The convergent rays are incident on the negative meniscus lens next to that positive lens, and hence spherical aberration is not excessively corrected. The convergent rays are also incident on the positive meniscus lens, and hence spherical aberration is not excessively corrected. Thus, the spherical aberration can be properly corrected.

With the zoom lens according to this embodiment, during zooming, the fifth lens group G5 is preferably fixed relative to the image surface Sim, and during zooming from the wide angle end to the telephoto end, a 3-4 composite lens group composed of the third lens group G3 and the fourth lens group G4, and the second lens group G2 preferably simultaneously pass through respective points at which imaging magnifications of the 3-4 composite lens group and the second lens group G2 are −1. With this configuration, the third lens group G3 does not return to the image side and a large zoom ratio can be obtained during zooming from the wide angle end to the telephoto end.

During zooming from the wide angle end to the telephoto end, the distance between the third lens group G3 and the fourth lens group G4 preferably decreases, increases, and then decreases. With this configuration, a variation in field curvature at an intermediate focal length can be suppressed.

The following conditional expressions (1) and (2) are preferably satisfied. If Abbe numbers and partial dispersion ratios of the positive lenses included in the 1c lens group G1c satisfy the conditional expressions (1) and (2), axial chromatic aberration and secondary spectrum on the telephoto side can be simultaneously properly corrected. If the following conditional expression (1-1) and/or conditional expression (2-1) are satisfied, further proper characteristics can be obtained.

$$75 < f1c\_vd\_ave < 96 \qquad (1),$$

$$0.5 < f1c\_\theta gF\_ave < 0.6 \qquad (2), \text{ and}$$

$$80 < f1c\_vd\_ave < 96 \qquad (1\text{-}1), \text{ and/or}$$

$$0.52 < f1c\_\theta gF\_ave < 0.56 \qquad (2\text{-}1)$$

where f1c_vd_ave is an average value of Abbe numbers for the d-line of the positive lenses included in the 1c lens group, and f1c_θgF_ave is an average value of partial dispersion ratios of the positive lenses included in the 1c lens group.

The following conditional expression (3) is preferably satisfied. As long as below the upper limit of the conditional expression (3), spherical aberration can be properly corrected. As long as above the lower limit of the conditional expression (3), the back focus of the first lens group G1 can be increased, and even for a high-magnification lens, the power of the second lens group G2 can be suppressed. Thus, occurrence of aberrations due to the second lens group G2 can be suppressed. If the following conditional expression (3-1) is satisfied, further proper characteristics can be obtained.

$$0.8 < f1/f1c < 1.2 \qquad (3), \text{ and}$$

$$0.9 < f1/f1c < 1.1 \qquad (3\text{-}1),$$

where f1 is a focal length for the d-line of the first lens group, and f1c is a focal length for the d-line of the 1c lens group.

Spherical aberration can be more easily corrected as the number of positive lenses included in the 1b lens group G1b and the 1c lens group G1c increases; however, it is difficult to secure a stroke during focusing. Thus, the number of positive lenses included in the 1b lens group G1b and the 1c lens group G1c is preferably five in total. With this configuration, the spherical aberration can be corrected and the stroke during focusing can be secured.

When the number of positive lenses included in the 1b lens group G1b and the 1c lens group G1c is five in total, the 1b lens group G1b may consist of, in order from the object side, a cemented lens in which a negative meniscus lens and a biconvex lens are cemented in that order from the object side, and a biconvex lens; and the 1c lens group G1c may consist of, in order from the object side, a biconvex lens, a cemented lens in which a negative meniscus lens and a positive meniscus lens are cemented in that order from the object side, and a positive meniscus lens.

With this configuration, the power of the 1b lens group G1b can be increased, and the height of marginal rays incident on the 1c lens group G1c can be decreased. Thus, even when the F-number is small, the configuration is advantageous to downsizing.

When the number of positive lenses included in the 1b lens group G1b and the 1c lens group G1c is five in total, the 1b lens group G1b may consist of a cemented lens in which a negative meniscus lens and a biconvex lens are cemented in that order from the object side; and the 1c lens group G1c may consist of, in order from the object side, a positive lens having a convex surface facing the object side, a positive meniscus lens, a cemented lens in which a negative meniscus lens and a positive meniscus lens are cemented in that order from the object side, and a positive meniscus lens.

With this configuration, the power of the 1c lens group G1c can be increased, and the power of the 1b lens group G1b can be decreased. Thus, aberrations during variation in focus, in particular, variation in spherical aberration can be suppressed.

The 1a lens group G1a preferably consists of, in order from the object side, a first negative lens, a second negative lens, and a positive lens, and the 1a lens group G1a preferably satisfies the following conditional expression (4). Since the 1a lens group G1a has the above-described configuration, the angle of chief rays at a peripheral angle of view incident on the 1b lens group G1b can be decreased, and occurrence of astigmatism due to the 1b lens group G1b and later can be reduced. Also, since the conditional expression (4) is satisfied, variation in field curvature during zooming can be reduced, and further spherical aberration on the telephoto side can be accommodated within a proper range. If the following conditional expression (4-1) is satisfied, further proper characteristics can be obtained.

$$-0.8 < (L1ar+L1bf)/(L1ar-L1bf) < -0.04 \qquad (4), \text{ and}$$

$$-0.5 < (L1ar+L1bf)/(L1ar-L1bf) < -0.04 \qquad (4\text{-}1),$$

where

L1ar is a curvature radius of a surface on the image side of the first negative lens, and L1bf is a curvature radius of a surface on the object side of the second negative lens.

When the 1a lens group G1a consists of, in order from the object side, the first negative lens, the second negative lens, and the positive lens, the 1a lens group G1a preferably satisfies the following conditional expression (5). As long as below the upper limit of the conditional expression (5), spherical aberration on the telephoto side can be reduced. As long as above the lower limit of the conditional expression (5), a sufficient negative power can be given to an air lens that is formed between the first negative lens and the second negative lens, and hence spherical aberration on the telephoto side can be reduced. If the following conditional expression (5-1) is satisfied, further proper characteristics can be obtained.

$$0.04 < d2/tt1 < 0.15 \qquad (5), \text{ and}$$

$$0.06 < d2/tt1 < 0.12 \qquad (5\text{-}1),$$

where d2 is a distance between the first negative lens and the second negative lens, and tt1 is a length on the optical axis of the first lens group.

The 1a lens group G1a preferably consists of, in order from the object side, a negative meniscus lens, a biconcave lens, and a positive lens. With this configuration, distortion on the wide angle side, and spherical aberration on the telephoto side can be properly corrected.

The second lens group G2 preferably consists of, in order from the object side, a first lens component, a second lens component, a third lens component, and a fourth lens component; and the first lens component is preferably a negative lens having a concave surface that faces the image side and that has a smaller absolute value of a curvature radius than an absolute value of a curvature radius of a surface on the object side of the negative lens; the second lens component is preferably a cemented lens in which a biconcave lens and a positive meniscus lens are cemented in that order from the object side and which entirely has a negative refractive power; the third lens component is preferably a cemented lens in which a biconcave lens and a positive lens are cemented in that order from the object side; and the fourth lens component is preferably a negative lens having a concave surface that faces the object side and that has a smaller absolute value of a curvature radius than an absolute value of a curvature radius of a surface on the image side of the negative lens.

If the second lens group G2 has more than four lens components, the movement range of the second lens group G2 may be hardly secured. If the second lens group G2 has less than four lens components, it is difficult to suppress aberrations. Thus, with the four lens components, the movement range of the second lens group G2 can be secured and aberrations can be suppressed.

To attain high magnification, the principal point position of the second lens group G2 is required to be located at a position closer to the object side, and hence a negative lens is required to be added to the second lens group G2.

Since the first lens component has the above-described configuration, occurrence of distortion and astigmatism on the wide angle side can be suppressed.

The principal point position can be located closer to the object side by arranging the negative lens on the image side of the second lens component; however, lateral chromatic aberration likely occurs on the wide angle side. Owing to this, since the second lens component is the cemented lens of the biconcave lens and the positive meniscus lens as described above and the cemented lens entirely has the negative refractive power, the lateral chromatic aberration can be corrected while the principal point position is located closer to the object side. Also, if the positive meniscus lens has a concave surface on the image side, this is advantageous to widening the angle of view.

Since the second lens component has the concave surface on the image side, for the third lens component, by arranging on the most object side a lens having a concave surface on the object side, occurrence of spherical aberration on the telephoto side can be suppressed. Also, if a cemented lens of a biconcave lens and a positive lens is employed, axial chromatic aberration on the telephoto side can be corrected.

Since the fourth lens component has the concave surface on the object side, the fourth lens component contributes to correcting astigmatism that occurs due to the first lens group G1 on the wide angle side while suppressing occurrence of spherical aberration on the telephoto side. Also, since the negative lens is employed, the fourth lens component contributes to enhancing the negative refractive power of the entire second lens group G2.

While FIG. 1 illustrates the example in which the optical members PP1 and PP2 are arranged between the lens system and the image surface Sim, instead of arranging any of various filters, such as a low pass filter or one that cuts a specific wavelength range, between the lens system and the image surface Sim, such various filters may be arranged between respective lenses, or a lens surface of any of the lenses may be treated with a coating having an effect similar to those of the various filters.

Next, numerical examples of the zoom lens of the invention are described.

A zoom lens according to Example 1 is described first. FIG. 1 provides cross-sectional views illustrating a lens configuration of the zoom lens according to Example 1. In FIG. 1, and FIGS. 2 to 10 corresponding to Examples 2 to 10, the left side is an object side and the right side is an image side. An illustrated aperture diaphragm St does not necessarily indicate the size or shape, but indicates the position on an optical axis Z. FIG. 1 also illustrates an arrow indicative of a movement locus of each lens group during zooming from a wide angle end to a telephoto end, a point at which an imaging magnification is −1 (a horizontal dotted line with β=−1 in the drawing), axial rays wa, and rays wb at the maximum angle of view.

The zoom lens according to Example 1 is composed of, in order from the object side, a first lens G1 consisting of ten lenses of a lens L1a to a lens L1j and entirely having a positive refractive power, a second lens group G2 consisting of six lenses of a lens L2a to a lens L2f and entirely having a negative refractive power, a third lens group G3 consisting of three lenses of a lens L3a to a lens L3c and entirely having a positive refractive power, a fourth lens group G4 consisting of three lenses of a lens L4a to a lens L4c and entirely having a positive refractive power, and a fifth lens group G5 consisting of fifteen lenses of a lens L5a to a lens L5o and entirely having a positive refractive power.

The first lens group G1 is composed of a 1a lens group G1a consisting of three lenses of the lens L1a to the lens L1c, a 1b lens group G1b consisting of three lenses of the lens L1d to the lens L1f, and a 1c lens group G1c consisting of four lenses of the lens L1g to the lens L1j.

Table 1 shows basic lens data of the zoom lens according to Example 1, Table 2 shows data relating to specifications, Table 3 shows data relating to surface distances that change during zooming, and Table 4 shows data relating to aspherical coefficients. The meaning of reference signs in the table are exemplarily described below according to Example 1, and reference signs according to Examples 2 to 10 are basically similar to those according to Example 1.

In the lens data in Table 1, the column of surface number indicates surface numbers that sequentially increase toward the image side while a surface of a component on the most object side is counted as the first surface, the column of curvature radius indicates a curvature radius of each surface, and the column of surface distance indicates a distance between each surface and a surface next thereto on the optical axis Z. Also, the column of nd indicates a refractive index for the d-line (wavelength of 587.6 nm) of each optical element, the column of vd indicates an Abbe number for the d-line (wavelength of 587.6 nm) of each optical element, and the column of θgF indicates a partial dispersion ratio of each optical element.

The partial dispersion ratio θgF is expressed by the following expression $$\theta gF=(ng-nF)/(nF-nC)$$

where
ng is a refractive index for a g-line,
nF is a refractive index for an F-line, and
nC is a refractive index for a C-line.

In this case, the sign of the curvature radius is positive when the surface shape is convex on the object side, and negative when the surface shape is convex on the image side. The basic lens data includes the aperture diaphragm St and the optical members PP1 and PP2. A word "diaphragm" together with the surface number thereof is written in a cell of a surface corresponding to the aperture diaphragm St in the column of surface number. In the lens data in Table 1, DD [surface number] is written in a cell of the column of surface distance if the distance changes during zooming. The numerical value corresponding to DD [surface number] is shown in Table 3.

For data relating to specifications in Table 2, values of zoom magnification, focal length f, F-number FNo., and total angle of view 2ω are shown.

In the basic lens data, data relating to specifications, and data relating to surface distances that change, the unit of angle is degree, and the unit of length is millimeter; however, since the optical system can be used although the optical system is proportionally expanded or proportionally contracted, other suitable units may be used.

In the lens data in Table 1, an asterisk* is added to a surface number of an aspherical surface, and a numerical value of a paraxial curvature radius is indicated as a curvature radius of the aspherical surface. The data relating to aspherical coefficients in Table 4 indicates a surface number of an aspherical surface, and an aspherical coefficient relating to the aspherical surface. A numerical value "E±n" (n is an integer) of an aspherical coefficient represents "×10$^{±n}$." The aspherical coefficient is a value of each of coefficients KA, Am (m=3 ... 16) expressed by the following aspherical surface expression $$Zd = C \cdot h^2 / \{1 + (1 - KA \cdot C^2 \cdot h^2)^{1/2}\} + \Sigma Am \cdot h^m$$

where

Zd is an aspherical surface depth (a length of a perpendicular line extending from a point on an aspherical surface at a height h to a plane perpendicular to the optical axis with which the vertex of the aspherical surface comes into contact), h is a height (a distance from the optical axis), C is a reciprocal of a paraxial curvature radius, and KA, Am each are an aspherical coefficient (m=3 ... 16).

TABLE 1

Example 1, lens data (nd, νd for d-line)

| Surface number | Curvature radius | Surface distance | nd | νd | θgF |
|---|---|---|---|---|---|
| 1 | −13378.35006 | 5.977 | 1.77250 | 49.60 | 0.55212 |
| 2 | 506.33763 | 16.475 | | | |
| 3 | −584.49773 | 4.800 | 1.80400 | 46.58 | 0.55730 |
| 4 | 335.43813 | 2.500 | | | |
| 5 | 349.09925 | 12.000 | 1.84139 | 24.56 | 0.61274 |
| 6 | 8435.34081 | 4.877 | | | |
| 7 | 7849.07545 | 5.000 | 1.80000 | 29.84 | 0.60178 |
| 8 | 439.82608 | 18.270 | 1.49700 | 81.54 | 0.53748 |
| 9 | −444.99046 | 0.125 | | | |
| 10 | 1000.00000 | 10.877 | 1.63246 | 63.77 | 0.54215 |
| 11 | −1249.86489 | 34.999 | | | |
| 12 | 336.67292 | 23.000 | 1.43387 | 95.18 | 0.53733 |
| 13 | −555.44540 | 1.838 | | | |
| 14 | 224.29284 | 6.264 | 1.63980 | 34.47 | 0.59233 |
| 15 | 143.35462 | 28.031 | 1.43875 | 94.94 | 0.53433 |
| 16 | 8626.60879 | 3.144 | | | |
| 17 | 176.57760 | 17.500 | 1.49700 | 81.54 | 0.53748 |
| 18 | 475.02631 | DD [18] | | | |
| 19 | 182.61414 | 4.500 | 1.95375 | 32.32 | 0.59015 |
| 20 | 86.38802 | 12.791 | | | |
| 21 | −331.30207 | 3.073 | 1.55032 | 75.50 | 0.54001 |
| 22 | 61.69495 | 4.501 | 1.54814 | 45.78 | 0.56859 |
| 23 | 78.10163 | 9.831 | | | |
| 24 | −145.36707 | 2.145 | 1.49700 | 81.54 | 0.53748 |
| 25 | 96.62937 | 7.000 | 1.84139 | 24.56 | 0.61274 |
| 26 | −687.33596 | 5.926 | | | |
| 27 | −76.16819 | 2.130 | 1.43875 | 94.94 | 0.53433 |
| 28 | 1644.59414 | DD [28] | | | |
| 29 | 4104.02749 | 7.091 | 1.43875 | 94.66 | 0.53402 |
| 30 | −137.72084 | 0.177 | | | |
| 31 | 2020.97885 | 7.824 | 1.43875 | 94.66 | 0.53402 |
| 32 | −125.76283 | 2.257 | 1.94692 | 32.77 | 0.58862 |
| 33 | −185.59421 | DD [33] | | | |
| 34 | 124.45199 | 6.891 | 1.80390 | 32.49 | 0.59305 |
| 35 | 90.80287 | 10.021 | 1.43875 | 94.66 | 0.53402 |
| 36 | −49972.97817 | 2.118 | | | |
| 37 | 817.29840 | 6.060 | 1.43875 | 94.66 | 0.53402 |
| *38 | −343.72331 | DD [38] | | | |
| 39 (diaphragm) | ∞ | 7.705 | | | |
| 40 | −170.68031 | 4.420 | 1.51793 | 61.26 | 0.54257 |
| 41 | 1424.66641 | 1.393 | | | |
| 42 | 854.58215 | 4.351 | 1.84139 | 24.56 | 0.61274 |
| 43 | −298.35856 | 3.656 | 1.83481 | 42.72 | 0.56486 |
| 44 | 408.16101 | 22.581 | | | |

TABLE 1-continued

Example 1, lens data (nd, νd for d-line)

| Surface number | Curvature radius | Surface distance | nd | νd | θgF |
|---|---|---|---|---|---|
| 45 | −124.70799 | 2.963 | 1.63723 | 35.15 | 0.58660 |
| 46 | 545.65832 | 5.104 | 1.84139 | 24.56 | 0.61274 |
| 47 | −188.00072 | 0.570 | | | |
| 48 | 59.62634 | 5.814 | 1.73532 | 53.96 | 0.54449 |
| 49 | 1199.51213 | 3.520 | 1.72395 | 29.02 | 0.60094 |
| 50 | 86.05183 | 19.251 | | | |
| 51 | 144.47442 | 7.880 | 1.74356 | 40.77 | 0.57416 |
| 52 | −63.44339 | 2.500 | 1.92486 | 36.38 | 0.57719 |
| 53 | 99.00655 | 14.855 | | | |
| 54 | 342.36858 | 5.042 | 1.84139 | 24.56 | 0.61274 |
| 55 | −97.66651 | 13.086 | | | |
| 56 | 222.75255 | 4.531 | 1.52189 | 50.90 | 0.55751 |
| 57 | 21.13645 | 6.601 | 1.49700 | 81.54 | 0.53748 |
| 58 | 48.14182 | 8.035 | | | |
| 59 | 95.08701 | 6.958 | 1.49700 | 81.54 | 0.53748 |
| 60 | −37.48307 | 2.876 | 1.95375 | 32.32 | 0.59015 |
| 61 | −260.67641 | 9.976 | | | |
| 62 | 55.91542 | 4.808 | 1.53515 | 57.90 | 0.54800 |
| 63 | −387.96848 | 2.000 | | | |
| 64 | ∞ | 1.500 | 1.51633 | 64.14 | 0.53531 |
| 65 | ∞ | 0.000 | | | |
| 66 | ∞ | 3.690 | 1.51633 | 64.14 | 0.53531 |
| 67 | ∞ | 35.589 | | | |

TABLE 2

Example 1, specifications (d-line)

| | Wide angle end | Intermediate position | Telephoto end |
|---|---|---|---|
| Zoom magnification | 1.0 | 3.8 | 19.8 |
| f' | 34.993 | 134.373 | 692.862 |
| FNo. | 2.85 | 2.85 | 4.85 |
| 2ω [°] | 44.8 | 11.8 | 2.4 |

TABLE 3

Example 1, zoom distance

| | Wide angle end | Intermediate position | Telephoto end |
|---|---|---|---|
| DD [18] | 5.430 | 85.787 | 118.419 |
| DD [28] | 231.414 | 131.867 | 2.255 |
| DD [33] | 24.452 | 5.861 | 2.307 |
| DD [38] | 2.654 | 40.435 | 140.970 |

TABLE 4

Example 1, aspherical coefficient

| Surface number | 38 |
|---|---|
| KA | −6.0660447E+00 |
| A3 | 0.0000000E+00 |
| A4 | −2.8516819E−09 |
| A5 | −3.7645381E−10 |
| A6 | 5.1922095E−11 |
| A7 | −1.9515833E−13 |
| A8 | 4.9687016E−14 |
| A9 | −1.0574536E−14 |
| A10 | 2.5263117E−17 |

TABLE 4-continued

Example 1, aspherical coefficient

| Surface number | 38 |
|---|---|
| A11 | 2.5847685E−17 |
| A12 | −7.1492956E−19 |
| A13 | 3.0977491E−21 |
| A14 | −1.5830950E−22 |
| A15 | 9.3185221E−24 |
| A16 | −1.0801038E−25 |

FIG. 11 provides aberration diagrams of the zoom lens according to Example 1. Spherical aberration, astigmatism, distortion, and lateral chromatic aberration at the wide angle end are shown in FIG. 11 in order from the left side in the upper section. Spherical aberration, astigmatism, distortion, and lateral chromatic aberration at an intermediate position are shown in FIG. 11 in order from the left side in the middle section. Spherical aberration, astigmatism, distortion, and lateral chromatic aberration at the telephoto end are shown in FIG. 11 in order from the left side in the lower section. The aberration diagrams show states when the object distance is infinity. The aberration diagrams showing spherical aberration, astigmatism, and distortion show aberrations using the d-line (wavelength of 587.6 nm) as the reference wavelength. The spherical aberration diagram shows aberrations for the d-line (wavelength of 587.6 nm), C-line (wavelength of 656.3 nm), F-line (wavelength of 486.1 nm), and g-line (wavelength of 435.8 nm) by respectively using solid line, long dotted line, short dotted line, and gray solid line. The astigmatism diagram shows aberrations in a sagittal direction and a tangential direction by respectively using solid line and short dotted line. The lateral chromatic aberration diagram shows aberrations for the C-line (wavelength of 656.3 nm), F-line (wavelength of 486.1 nm), and g-line (wavelength of 435.8 nm) by respectively using long dotted line, short dotted line, and gray solid line. Note that FNo. in the spherical aberration diagram indicates an F-number, and ω in the other aberration diagrams indicates a half angle of view.

A zoom lens according to Example 2 is described next. FIG. 2 provides cross-sectional views illustrating a lens configuration of the zoom lens according to Example 2. The zoom lens according to Example 2 has the same lens number configuration as that of the zoom lens according to Example 1. Table 5 shows basic lens data of the zoom lens according to Example 2, Table 6 shows data relating to specifications, Table 7 shows data relating to surface distances that change, and Table 8 shows data relating to aspherical coefficients. FIG. 12 shows aberrations.

TABLE 5

Example 2, lens data (nd, vd for d-line)

| Surface number | Curvature radius | Surface distance | nd | vd | θgF |
|---|---|---|---|---|---|
| 1 | −17374.27699 | 4.954 | 1.77250 | 49.60 | 0.55212 |
| 2 | 515.52725 | 16.475 | | | |
| 3 | −565.78121 | 4.800 | 1.80400 | 46.58 | 0.55730 |
| 4 | 334.28184 | 2.500 | | | |
| 5 | 348.58721 | 12.000 | 1.84139 | 24.56 | 0.61274 |
| 6 | 7335.08162 | 4.857 | | | |
| 7 | 8100.03388 | 5.000 | 1.80000 | 29.84 | 0.60178 |
| 8 | 441.57926 | 18.270 | 1.49700 | 81.54 | 0.53748 |
| 9 | −459.45313 | 0.125 | | | |
| 10 | 999.62577 | 10.863 | 1.63246 | 63.77 | 0.54215 |
| 11 | −1249.85366 | 34.988 | | | |
| 12 | 331.41864 | 23.000 | 1.43387 | 95.18 | 0.53733 |
| 13 | −555.43460 | 1.844 | | | |
| 14 | 231.27593 | 6.246 | 1.72047 | 34.71 | 0.58350 |
| 15 | 143.34892 | 28.057 | 1.49700 | 81.54 | 0.53748 |
| 16 | 4763.22108 | 3.150 | | | |
| 17 | 179.29715 | 17.500 | 1.49700 | 81.54 | 0.53748 |
| 18 | 457.42906 | DD [18] | | | |
| 19 | 182.44776 | 4.500 | 1.95375 | 32.32 | 0.59015 |
| 20 | 86.51118 | 12.791 | | | |
| 21 | −334.16437 | 3.072 | 1.55032 | 75.50 | 0.54001 |
| 22 | 61.82805 | 4.500 | 1.54814 | 45.78 | 0.56859 |
| 23 | 78.16316 | 9.822 | | | |
| 24 | −145.45264 | 2.145 | 1.49700 | 81.54 | 0.53748 |
| 25 | 96.79029 | 7.009 | 1.84139 | 24.56 | 0.61274 |
| 26 | −694.72543 | 5.941 | | | |
| 27 | −76.19334 | 2.141 | 1.43875 | 94.94 | 0.53433 |
| 28 | 1736.83551 | DD [28] | | | |
| 29 | 4270.48200 | 7.105 | 1.43875 | 94.66 | 0.53402 |
| 30 | −137.86493 | 0.194 | | | |
| 31 | 2057.62397 | 7.841 | 1.43875 | 94.66 | 0.53402 |
| 32 | −126.04188 | 2.251 | 1.94709 | 32.76 | 0.58864 |
| 33 | −185.50599 | DD [33] | | | |
| 34 | 124.39046 | 6.894 | 1.80391 | 32.49 | 0.59304 |
| 35 | 90.81996 | 10.020 | 1.43875 | 94.66 | 0.53402 |
| 36 | −169144.05304 | 2.114 | | | |
| 37 | 824.45845 | 6.056 | 1.43875 | 94.66 | 0.53402 |
| *38 | −346.58355 | DD [38] | | | |
| 39 (diaphragm) | ∞ | 7.698 | | | |
| 40 | −170.85337 | 4.409 | 1.51792 | 61.26 | 0.54256 |
| 41 | 1412.02444 | 1.380 | | | |
| 42 | 849.25112 | 4.339 | 1.84139 | 24.56 | 0.61274 |
| 43 | −295.14207 | 3.651 | 1.83481 | 42.72 | 0.56486 |
| 44 | 407.32585 | 22.575 | | | |
| 45 | −124.60852 | 2.955 | 1.63728 | 35.13 | 0.58662 |
| 46 | 549.68268 | 5.099 | 1.84139 | 24.56 | 0.61274 |
| 47 | −188.55815 | 0.573 | | | |
| 48 | 59.52609 | 5.815 | 1.73548 | 53.96 | 0.54449 |
| 49 | 1254.27053 | 3.520 | 1.72380 | 29.01 | 0.60096 |
| 50 | 86.04201 | 19.247 | | | |
| 51 | 144.55821 | 7.876 | 1.74390 | 40.78 | 0.57413 |
| 52 | −63.49507 | 2.500 | 1.92466 | 36.38 | 0.57721 |
| 53 | 99.04128 | 14.838 | | | |
| 54 | 347.50320 | 5.029 | 1.84139 | 24.56 | 0.61274 |
| 55 | −97.91525 | 13.073 | | | |
| 56 | 222.40660 | 4.518 | 1.52047 | 51.16 | 0.55705 |
| 57 | 21.11965 | 6.594 | 1.49700 | 81.54 | 0.53748 |
| 58 | 48.22752 | 8.032 | | | |
| 59 | 94.79522 | 6.951 | 1.49700 | 81.54 | 0.53748 |
| 60 | −37.49466 | 2.868 | 1.95375 | 32.32 | 0.59015 |
| 61 | −259.55822 | 9.975 | | | |
| 62 | 55.77235 | 4.807 | 1.53634 | 57.80 | 0.54818 |
| 63 | −380.90253 | 2.000 | | | |
| 64 | ∞ | 1.500 | 1.51633 | 64.14 | 0.53531 |
| 65 | ∞ | 0.000 | | | |
| 66 | ∞ | 3.690 | 1.51633 | 64.14 | 0.53531 |
| 67 | ∞ | 35.589 | | | |

TABLE 6

Example 2, specifications (d-line)

| | Wide angle end | Intermediate position | Telephoto end |
|---|---|---|---|
| Zoom magnification | 1.0 | 3.8 | 19.8 |
| f | 34.992 | 134.370 | 692.844 |
| FNo. | 2.85 | 2.85 | 4.85 |
| 2ω [°] | 44.8 | 11.8 | 2.4 |

TABLE 7

Example 2, zoom distance

|  | Wide angle end | Intermediate position | Telephoto end |
|---|---|---|---|
| DD [18] | 7.414 | 87.953 | 120.637 |
| DD [28] | 231.897 | 132.146 | 2.241 |
| DD [33] | 24.482 | 5.853 | 2.287 |
| DD [38] | 2.530 | 40.369 | 141.157 |

TABLE 8

Example 2, aspherical coefficient

| Surface number | 38 |
|---|---|
| KA | −6.0661247E+00 |
| A3 | 0.0000000E+00 |
| A4 | −6.0498397E−10 |
| A5 | −3.9242470E−10 |
| A6 | 4.2998199E−11 |
| A7 | 6.5777538E−15 |
| A8 | 6.1474104E−14 |
| A9 | −1.0495812E−14 |
| A10 | 1.5144561E−17 |
| A11 | 2.4967345E−17 |
| A12 | −7.1763341E−19 |
| A13 | 5.0602365E−21 |
| A14 | −1.7779216E−22 |
| A15 | 8.3996059E−24 |
| A16 | −9.3643011E−26 |

A zoom lens according to Example 3 is described next. FIG. 3 provides cross-sectional views illustrating a lens configuration of the zoom lens according to Example 3. The zoom lens according to Example 3 has the same lens number configuration as that of the zoom lens according to Example 1. Table 9 shows basic lens data of the zoom lens according to Example 3, Table 10 shows data relating to specifications, Table 11 shows data relating to surface distances that change, and Table 12 shows data relating to aspherical coefficients. FIG. 13 shows aberrations.

TABLE 9

Example 3, lens data (nd, vd for d-line)

| Surface number | Curvature radius | Surface distance | nd | vd | θgF |
|---|---|---|---|---|---|
| 1 | 31335.06747 | 5.980 | 1.77250 | 49.60 | 0.55212 |
| 2 | 489.39985 | 16.475 | | | |
| 3 | −607.98263 | 4.800 | 1.80400 | 46.58 | 0.55730 |
| 4 | 338.23443 | 2.500 | | | |
| 5 | 351.80001 | 12.000 | 1.84139 | 24.56 | 0.61274 |
| 6 | 5645.25277 | 4.829 | | | |
| 7 | 5037.54253 | 5.000 | 1.80000 | 29.84 | 0.60178 |
| 8 | 416.86150 | 18.270 | 1.49700 | 81.54 | 0.53748 |
| 9 | −440.71712 | 0.125 | | | |
| 10 | 999.99521 | 10.829 | 1.63246 | 63.77 | 0.54215 |
| 11 | −1249.81060 | 35.076 | | | |
| 12 | 341.50810 | 23.000 | 1.43387 | 95.18 | 0.53733 |
| 13 | −555.44540 | 1.826 | | | |
| 14 | 218.29118 | 6.257 | 1.62004 | 36.26 | 0.58800 |
| 15 | 143.35678 | 28.012 | 1.43875 | 94.94 | 0.53433 |
| 16 | 9804.77077 | 3.126 | | | |
| 17 | 172.79153 | 17.500 | 1.43875 | 94.94 | 0.53433 |
| 18 | 472.57533 | DD [18] | | | |
| 19 | 184.30388 | 4.485 | 1.95375 | 32.32 | 0.59015 |
| 20 | 86.21375 | 12.779 | | | |
| 21 | −327.42076 | 3.061 | 1.55032 | 75.50 | 0.54001 |

TABLE 9-continued

Example 3, lens data (nd, vd for d-line)

| Surface number | Curvature radius | Surface distance | nd | vd | θgF |
|---|---|---|---|---|---|
| 22 | 61.43736 | 4.500 | 1.54814 | 45.78 | 0.56859 |
| 23 | 77.86458 | 9.830 | | | |
| 24 | −144.01651 | 2.155 | 1.49700 | 81.54 | 0.53748 |
| 25 | 96.10729 | 7.000 | 1.84139 | 24.56 | 0.61274 |
| 26 | −679.42572 | 5.898 | | | |
| 27 | −75.75003 | 2.125 | 1.43875 | 94.94 | 0.53433 |
| 28 | 1478.43455 | DD [28] | | | |
| 29 | 4567.42296 | 7.086 | 1.43875 | 94.66 | 0.53402 |
| 30 | −138.46671 | 0.166 | | | |
| 31 | 2111.50348 | 7.813 | 1.43875 | 94.66 | 0.53402 |
| 32 | −126.19862 | 2.268 | 1.94652 | 32.80 | 0.58853 |
| 33 | −185.32437 | DD [33] | | | |
| 34 | 124.52210 | 6.889 | 1.80381 | 32.49 | 0.59305 |
| 35 | 90.89636 | 10.023 | 1.43875 | 94.66 | 0.53402 |
| 36 | −186927.49799 | 2.117 | | | |
| 37 | 829.24124 | 6.060 | 1.43875 | 94.66 | 0.53402 |
| *38 | −343.97598 | DD [38] | | | |
| 39 (diaphragm) | ∞ | 7.702 | | | |
| 40 | −170.75799 | 4.421 | 1.51777 | 61.27 | 0.54254 |
| 41 | 1475.89688 | 1.393 | | | |
| 42 | 850.55831 | 4.352 | 1.84139 | 24.56 | 0.61274 |
| 43 | −305.31634 | 3.654 | 1.83481 | 42.72 | 0.56486 |
| 44 | 413.48017 | 22.576 | | | |
| 45 | −124.89221 | 2.963 | 1.63709 | 35.15 | 0.58659 |
| 46 | 549.68685 | 5.103 | 1.84139 | 24.56 | 0.61274 |
| 47 | −187.85314 | 0.562 | | | |
| 48 | 59.64886 | 5.814 | 1.73577 | 53.93 | 0.54453 |
| 49 | 1254.69959 | 3.520 | 1.72411 | 29.00 | 0.60099 |
| 50 | 86.06614 | 19.253 | | | |
| 51 | 144.26045 | 7.882 | 1.74352 | 40.78 | 0.57414 |
| 52 | −63.37168 | 2.504 | 1.92475 | 36.38 | 0.57718 |
| 53 | 98.95567 | 14.864 | | | |
| 54 | 341.41408 | 5.047 | 1.84139 | 24.56 | 0.61274 |
| 55 | −97.75851 | 13.082 | | | |
| 56 | 221.61374 | 4.531 | 1.52295 | 50.71 | 0.55785 |
| 57 | 21.13749 | 6.600 | 1.49700 | 81.54 | 0.53748 |
| 58 | 48.16130 | 8.031 | | | |
| 59 | 94.87124 | 6.958 | 1.49700 | 81.54 | 0.53748 |
| 60 | −37.45970 | 2.870 | 1.95375 | 32.32 | 0.59015 |
| 61 | −258.87634 | 9.967 | | | |
| 62 | 55.96570 | 4.807 | 1.53491 | 57.92 | 0.54796 |
| 63 | −390.17281 | 2.000 | | | |
| 64 | ∞ | 1.500 | 1.51633 | 64.14 | 0.53531 |
| 65 | ∞ | 0.000 | | | |
| 66 | ∞ | 3.690 | 1.51633 | 64.14 | 0.53531 |
| 67 | ∞ | 35.273 | | | |

TABLE 10

Example 3, specifications (d-line)

|  | Wide angle end | Intermediate position | Telephoto end |
|---|---|---|---|
| Zoom magnification | 1.0 | 3.8 | 20.0 |
| f' | 34.989 | 134.359 | 699.788 |
| FNo. | 2.85 | 2.85 | 4.85 |
| 2ω [°] | 44.4 | 11.8 | 2.2 |

TABLE 11

Example 3, zoom distance

|  | Wide angle end | Intermediate position | Telephoto end |
|---|---|---|---|
| DD [18] | 5.867 | 85.721 | 118.204 |
| DD [28] | 232.487 | 133.483 | 3.402 |

TABLE 11-continued

Example 3, zoom distance

|  | Wide angle end | Intermediate position | Telephoto end |
|---|---|---|---|
| DD [33] | 24.441 | 5.855 | 2.323 |
| DD [38] | 2.695 | 40.431 | 141.560 |

TABLE 12

Example 3, aspherical coefficient

| Surface number | 38 |
|---|---|
| KA | −6.0659990E+00 |
| A3 | 0.0000000E+00 |
| A4 | 7.5934682E−09 |
| A5 | −1.2082285E−09 |
| A6 | 5.9533640E−11 |
| A7 | 5.6310087E−14 |
| A8 | 6.4475101E−14 |
| A9 | −1.0442256E−14 |
| A10 | 6.3094636E−17 |
| A11 | 2.0953831E−17 |
| A12 | −6.5812003E−19 |
| A13 | 5.7283785E−21 |
| A14 | −1.3871386E−22 |
| A15 | 6.1553364E−24 |
| A16 | −6.9270089E−26 |

A zoom lens according to Example 4 is described next. FIG. 4 provides cross-sectional views illustrating a lens configuration of the zoom lens according to Example 4.

The zoom lens according to Example 4 differs from the zoom lens according to Example 1 only for the lens number configuration of a first lens group G1. The first lens group G1 is composed of a 1a lens group G1a consisting of three lenses of a lens L1a to a lens L1c, a 1b lens group G1b consisting of two lenses of a lens L1d and a lens L1e, and a 1c lens group G1c consisting of five lenses of a lens L1f to a lens L1j.

Table 13 shows basic lens data of the zoom lens according to Example 4, Table 14 shows data relating to specifications, Table 15 shows data relating to surface distances that change, and Table 16 shows data relating to aspherical coefficients. FIG. 14 shows aberrations.

TABLE 13

Example 4, lens data (nd, vd for d-line)

| Surface number | Curvature radius | Surface distance | nd | vd | θgF |
|---|---|---|---|---|---|
| 1 | 1203.32487 | 4.400 | 1.88300 | 40.76 | 0.56679 |
| 2 | 388.55765 | 22.500 | | | |
| 3 | −592.83878 | 4.400 | 1.65113 | 55.89 | 0.54672 |
| 4 | 307.63955 | 3.009 | | | |
| 5 | 329.25013 | 13.266 | 1.84139 | 24.56 | 0.61274 |
| 6 | 1422.51599 | 2.995 | | | |
| 7 | 1227.16435 | 7.230 | 1.54072 | 47.23 | 0.56511 |
| 8 | 303.53553 | 28.076 | 1.43875 | 94.94 | 0.53433 |
| 9 | −436.87379 | 47.872 | | | |
| 10 | 411.84229 | 11.251 | 1.69400 | 56.29 | 0.54506 |
| 11 | ∞ | 8.520 | | | |
| 12 | 221.02501 | 20.000 | 1.43387 | 95.18 | 0.53733 |
| 13 | 3784.25046 | 0.250 | | | |
| 14 | 253.15612 | 7.500 | 1.69895 | 30.05 | 0.60290 |

TABLE 13-continued

Example 4, lens data (nd, vd for d-line)

| Surface number | Curvature radius | Surface distance | nd | vd | θgF |
|---|---|---|---|---|---|
| 15 | 127.15122 | 30.030 | 1.43875 | 94.94 | 0.53433 |
| 16 | 2555.29938 | 5.000 | | | |
| 17 | 168.85857 | 11.910 | 1.49700 | 81.54 | 0.53748 |
| 18 | 385.87126 | DD [18] | | | |
| 19 | 2766.24481 | 3.250 | 1.71299 | 53.87 | 0.54587 |
| 20 | 64.32982 | 12.471 | | | |
| 21 | −200.04038 | 1.820 | 1.83481 | 42.72 | 0.56486 |
| 22 | 131.40042 | 3.000 | 1.84139 | 24.56 | 0.61274 |
| 23 | 227.27773 | 4.788 | | | |
| 24 | −263.90206 | 2.032 | 1.49700 | 81.54 | 0.53748 |
| 25 | 96.99160 | 7.818 | 1.78472 | 25.68 | 0.61621 |
| 26 | −394.03764 | 5.500 | | | |
| 27 | −97.99682 | 2.000 | 1.43875 | 94.94 | 0.53433 |
| 28 | −2704.70097 | DD [28] | | | |
| 29 | 571.03169 | 7.574 | 1.43875 | 94.66 | 0.53402 |
| 30 | −175.34201 | 0.125 | | | |
| 31 | −5273.85855 | 9.925 | 1.43875 | 94.66 | 0.53402 |
| 32 | −99.81994 | 3.000 | 1.80000 | 29.84 | 0.60178 |
| 33 | −143.78222 | DD [33] | | | |
| 34 | 288.39088 | 4.000 | 1.80000 | 29.84 | 0.60178 |
| 35 | 189.38496 | 6.545 | 1.43875 | 94.66 | 0.53402 |
| 36 | −1294.84337 | 0.757 | | | |
| 37 | 195.15150 | 9.750 | 1.43875 | 94.66 | 0.53402 |
| *38 | −3419.85116 | DD [38] | | | |
| 39 (diaphragm) | ∞ | 7.602 | | | |
| 40 | −154.21325 | 1.520 | 1.83481 | 42.72 | 0.56486 |
| 41 | 1055.59942 | 2.568 | 1.84139 | 24.56 | 0.61274 |
| 42 | −481.20610 | 0.200 | | | |
| 43 | 75.70122 | 4.890 | 1.56384 | 60.83 | 0.54082 |
| 44 | 242.81541 | 36.671 | | | |
| 45 | −2628.86635 | 2.000 | 1.80610 | 33.27 | 0.58845 |
| 46 | 97.76108 | 3.437 | | | |
| 47 | −173.65554 | 2.443 | 1.95906 | 17.47 | 0.65993 |
| 48 | −87.49658 | 0.300 | | | |
| 49 | 52.59563 | 5.624 | 1.77250 | 49.62 | 0.55186 |
| 50 | −130.79828 | 1.306 | 1.53172 | 48.84 | 0.56558 |
| 51 | 39.25083 | 4.064 | | | |
| 52 | −1280.59765 | 4.032 | 1.63854 | 55.38 | 0.54858 |
| 53 | −44.12784 | 1.000 | 1.95375 | 32.32 | 0.59015 |
| 54 | 121.20174 | 13.118 | | | |
| 55 | 119.12162 | 4.416 | 1.84139 | 24.56 | 0.61274 |
| 56 | −95.72269 | 8.375 | | | |
| 57 | −129.53488 | 3.388 | 1.51200 | 52.12 | 0.56018 |
| 58 | 20.51211 | 18.000 | 1.49700 | 81.54 | 0.53748 |
| 59 | 36.16294 | 2.323 | | | |
| 60 | 58.70246 | 7.174 | 1.49700 | 81.54 | 0.53748 |
| 61 | −42.75542 | 1.526 | 2.00100 | 29.13 | 0.59952 |
| 62 | −166.65679 | 10.250 | | | |
| 63 | 51.72062 | 6.662 | 1.51742 | 52.43 | 0.55649 |
| 64 | −117.33300 | 2.000 | | | |
| 65 | ∞ | 1.500 | 1.51633 | 64.14 | 0.53531 |
| 66 | ∞ | 0.000 | | | |
| 67 | ∞ | 3.690 | 1.51633 | 64.14 | 0.53531 |
| 68 | ∞ | 33.477 | | | |

TABLE 14

Example 4, specifications (d-line)

|  | Wide angle end | Intermediate position | Telephoto end |
|---|---|---|---|
| Zoom magnification | 1.0 | 3.8 | 19.6 |
| f′ | 34.589 | 132.822 | 677.946 |
| FNo. | 2.85 | 2.85 | 4.76 |
| 2ω [°] | 45.4 | 12.0 | 2.4 |

TABLE 15

Example 4, zoom distance

|  | Wide angle end | Intermediate position | Telephoto end |
|---|---|---|---|
| DD [18] | 8.534 | 82.112 | 114.634 |
| DD [28] | 242.787 | 134.807 | 4.410 |
| DD [33] | 9.113 | 3.407 | 2.249 |
| DD [38] | 2.730 | 42.838 | 141.870 |

TABLE 16

Example 4, aspherical coefficient

| Surface number | 38 |
|---|---|
| KA | 1.0000000E+00 |
| A3 | 0.0000000E+00 |
| A4 | −4.7142041E−08 |
| A5 | 2.3491920E−08 |
| A6 | −4.2313783E−09 |
| A7 | 4.0862089E−10 |
| A8 | −2.4055326E−11 |
| A9 | 9.6758230E−13 |
| A10 | −2.9523189E−14 |
| A11 | 6.1417894E−16 |
| A12 | 6.1911610E−19 |
| A13 | −5.8240543E−19 |
| A14 | 1.9090551E−20 |
| A15 | −2.7279816E−22 |
| A16 | 1.5134108E−24 |

A zoom lens according to Example 5 is described next. FIG. 5 provides cross-sectional views illustrating a lens configuration of the zoom lens according to Example 5. The zoom lens according to Example 5 has the same lens number configuration as that of the zoom lens according to Example 4. Table 17 shows basic lens data of the zoom lens according to Example 5, Table 18 shows data relating to specifications, Table 19 shows data relating to surface distances that change, and Table 20 shows data relating to aspherical coefficients. FIG. 15 shows aberrations.

TABLE 17

Example 5, lens data (nd, νd for d-line)

| Surface number | Curvature radius | Surface distance | nd | νd | θgF |
|---|---|---|---|---|---|
| 1 | 1274.22298 | 4.400 | 1.88300 | 40.76 | 0.56679 |
| 2 | 326.74501 | 19.684 | | | |
| 3 | −548.17143 | 4.400 | 1.65113 | 55.89 | 0.54672 |
| 4 | 279.55876 | 2.619 | | | |
| 5 | 295.45890 | 12.485 | 1.84139 | 24.56 | 0.61274 |
| 6 | 1744.32995 | 4.294 | | | |
| 7 | 2819.10370 | 5.030 | 1.54072 | 47.23 | 0.56511 |
| 8 | 353.73687 | 25.000 | 1.43875 | 94.94 | 0.53433 |
| 9 | −334.96231 | 38.468 | | | |
| 10 | 364.50249 | 12.791 | 1.69400 | 56.29 | 0.54506 |
| 11 | ∞ | 4.393 | | | |
| 12 | 222.74581 | 18.826 | 1.43387 | 95.18 | 0.53733 |
| 13 | 3082.74950 | 0.165 | | | |
| 14 | 303.40519 | 5.054 | 1.69895 | 30.05 | 0.60290 |
| 15 | 132.44104 | 29.250 | 1.43875 | 94.94 | 0.53433 |
| 16 | 3846.74680 | 5.000 | | | |
| 17 | 169.82659 | 13.641 | 1.49700 | 81.54 | 0.53748 |
| 18 | 483.48570 | DD [18] | | | |
| 19 | 617.86280 | 2.977 | 1.71299 | 53.87 | 0.54587 |
| 20 | 65.00898 | 11.459 | | | |
| 21 | −503.11416 | 1.820 | 1.83481 | 42.72 | 0.56486 |
| 22 | 153.06550 | 3.000 | 1.84139 | 24.56 | 0.61274 |
| 23 | 298.42399 | 5.513 | | | |
| 24 | −159.10770 | 2.032 | 1.49700 | 81.54 | 0.53748 |
| 25 | 96.50142 | 7.218 | 1.78472 | 25.68 | 0.61621 |
| 26 | −681.45993 | 7.903 | | | |
| 27 | −83.70584 | 2.000 | 1.43875 | 94.94 | 0.53433 |
| 28 | 637.96362 | DD [28] | | | |
| 29 | 2166.99695 | 6.963 | 1.43875 | 94.66 | 0.53402 |
| 30 | −161.11101 | 0.125 | | | |
| 31 | −405.05862 | 7.540 | 1.43875 | 94.66 | 0.53402 |
| 32 | −105.61287 | 3.000 | 1.80000 | 29.84 | 0.60178 |
| 33 | −144.13129 | DD [33] | | | |
| 34 | 242.43997 | 4.431 | 1.80000 | 29.84 | 0.60178 |
| 35 | 151.75864 | 7.723 | 1.43875 | 94.66 | 0.53402 |
| 36 | −2815.57106 | 0.757 | | | |
| 37 | 181.60265 | 10.556 | 1.43875 | 94.66 | 0.53402 |
| *38 | −377.38727 | DD [38] | | | |
| 39 (diaphragm) | ∞ | 9.860 | | | |
| 40 | −133.65484 | 1.520 | 1.83481 | 42.72 | 0.56486 |
| 41 | 288.73885 | 3.709 | 1.84139 | 24.56 | 0.61274 |
| 42 | −382.22988 | 0.632 | | | |
| 43 | 78.52091 | 6.301 | 1.57328 | 61.52 | 0.54253 |
| 44 | 155.19645 | 37.811 | | | |
| 45 | 1799.38883 | 2.114 | 1.78321 | 25.97 | 0.60975 |
| 46 | 87.15520 | 3.914 | | | |
| 47 | −531.25079 | 3.149 | 1.82905 | 26.59 | 0.60918 |
| 48 | −100.44400 | 0.393 | | | |
| 49 | 55.45392 | 8.694 | 1.71006 | 50.50 | 0.55448 |
| 50 | −119.85496 | 1.310 | 1.56200 | 43.51 | 0.57039 |
| 51 | 47.74047 | 3.703 | | | |
| 52 | 551.26851 | 4.508 | 1.62780 | 49.87 | 0.56027 |
| 53 | −52.32986 | 1.000 | 1.94317 | 33.43 | 0.58644 |
| 54 | 142.62331 | 12.620 | | | |
| 55 | 118.28005 | 4.603 | 1.85354 | 22.52 | 0.62153 |
| 56 | −106.22412 | 9.303 | | | |
| 57 | −4540.69688 | 5.705 | 1.51772 | 55.43 | 0.55082 |
| 58 | 20.05508 | 10.796 | 1.49700 | 81.54 | 0.53748 |
| 59 | 35.96189 | 4.756 | | | |
| 60 | 65.96374 | 12.822 | 1.49700 | 81.54 | 0.53748 |
| 61 | −42.55351 | 1.200 | 1.96979 | 30.71 | 0.59530 |
| 62 | −2057.26456 | 8.437 | | | |
| 63 | 60.38503 | 5.578 | 1.53899 | 52.35 | 0.55624 |
| 64 | −107.26704 | 2.000 | | | |
| 65 | ∞ | 1.500 | 1.51633 | 64.14 | 0.53531 |
| 66 | ∞ | 0.000 | | | |
| 67 | ∞ | 3.690 | 1.51633 | 64.05 | 0.53463 |
| 68 | ∞ | 33.854 | | | |

TABLE 18

Example 5, specifications (d-line)

|  | Wide angle end | Intermediate position | Telephoto end |
|---|---|---|---|
| Zoom magnification | 1.0 | 3.8 | 19.6 |
| f' | 34.658 | 133.088 | 679.304 |
| FNo. | 2.85 | 2.85 | 4.75 |
| 2ω [°] | 44.8 | 11.8 | 2.4 |

TABLE 19

Example 5, zoom distance

|  | Wide angle end | Intermediate position | Telephoto end |
|---|---|---|---|
| DD [18] | 2.263 | 82.338 | 117.906 |
| DD [28] | 234.237 | 130.599 | 6.030 |
| DD [33] | 31.332 | 11.588 | 2.249 |
| DD [38] | 5.447 | 48.754 | 147.095 |

TABLE 20

Example 5, aspherical coefficient

| Surface number | 38 |
|---|---|
| KA | 1.0000000E+00 |
| A3 | 0.0000000E+00 |
| A4 | 2.5373147E−08 |
| A5 | −3.1896159E−09 |
| A6 | 4.9719239E−10 |
| A7 | −3.4019825E−11 |
| A8 | 9.1983859E−13 |
| A9 | 1.0565892E−14 |
| A10 | −1.3331255E−15 |
| A11 | 3.5450551E−17 |
| A12 | −6.1939046E−19 |
| A13 | 1.7369551E−20 |
| A14 | −4.7811217E−22 |
| A15 | 6.8387262E−24 |
| A16 | −3.7656702E−26 |

A zoom lens according to Example 6 is described next. FIG. 6 provides cross-sectional views illustrating a lens configuration of the zoom lens according to Example 6. The zoom lens according to Example 6 has the same lens number configuration as that of the zoom lens according to Example 4. Table 21 shows basic lens data of the zoom lens according to Example 6, Table 22 shows data relating to specifications, Table 23 shows data relating to surface distances that change, and Table 24 shows data relating to aspherical coefficients. FIG. 16 shows aberrations.

TABLE 21

Example 6, lens data (nd, νd for d-line)

| Surface number | Curvature radius | Surface distance | nd | νd | θgF |
|---|---|---|---|---|---|
| 1 | 2216.47396 | 4.400 | 1.88300 | 40.76 | 0.56679 |
| 2 | 348.74419 | 21.647 | | | |
| 3 | −456.42458 | 4.400 | 1.65113 | 55.89 | 0.54672 |
| 4 | 335.83718 | 2.549 | | | |
| 5 | 355.21879 | 13.626 | 1.84139 | 24.56 | 0.61274 |
| 6 | −16713.99573 | 2.832 | | | |
| 7 | 2387.81519 | 7.230 | 1.54072 | 47.23 | 0.56511 |
| 8 | 355.83781 | 26.378 | 1.43875 | 94.94 | 0.53433 |
| 9 | −327.41035 | 38.235 | | | |
| 10 | 379.42749 | 12.852 | 1.69400 | 56.29 | 0.54506 |
| 11 | ∞ | 1.200 | | | |
| 12 | 221.02097 | 20.000 | 1.43387 | 95.18 | 0.53733 |
| 13 | 3782.88841 | 0.204 | | | |
| 14 | 308.20464 | 7.227 | 1.69895 | 30.05 | 0.60290 |
| 15 | 132.61749 | 28.875 | 1.43875 | 94.94 | 0.53433 |
| 16 | 1868.31531 | 4.272 | | | |
| 17 | 169.86664 | 13.502 | 1.49700 | 81.54 | 0.53748 |
| 18 | 430.57733 | DD [18] | | | |
| 19 | 1103.58993 | 3.250 | 1.71299 | 53.87 | 0.54587 |
| 20 | 68.01115 | 11.907 | | | |
| 21 | −326.98300 | 1.820 | 1.83481 | 42.72 | 0.56486 |

TABLE 21-continued

Example 6, lens data (nd, νd for d-line)

| Surface number | Curvature radius | Surface distance | nd | νd | θgF |
|---|---|---|---|---|---|
| 22 | 169.63947 | 2.628 | 1.84139 | 24.56 | 0.61274 |
| 23 | 290.89410 | 5.315 | | | |
| 24 | −168.64444 | 2.032 | 1.49700 | 81.54 | 0.53748 |
| 25 | 102.42927 | 7.392 | 1.78472 | 25.68 | 0.61621 |
| 26 | −400.80737 | 5.500 | | | |
| 27 | −89.08531 | 2.000 | 1.43875 | 94.94 | 0.53433 |
| 28 | 591.05707 | DD [28] | | | |
| 29 | 1022.51482 | 6.867 | 1.43875 | 94.66 | 0.53402 |
| 30 | −173.29128 | 0.125 | | | |
| 31 | −963.77281 | 8.813 | 1.43875 | 94.66 | 0.53402 |
| 32 | −103.46118 | 3.000 | 1.80000 | 29.84 | 0.60178 |
| 33 | −145.63723 | DD [33] | | | |
| 34 | 307.20795 | 4.000 | 1.80000 | 29.84 | 0.60178 |
| 35 | 187.24071 | 6.734 | 1.43875 | 94.66 | 0.53402 |
| 36 | −1295.29211 | 0.757 | | | |
| 37 | 190.80292 | 9.750 | 1.43875 | 94.66 | 0.53402 |
| *38 | −574.80733 | DD [38] | | | |
| 39 (diaphragm) | ∞ | 7.835 | | | |
| 40 | −157.05449 | 1.520 | 1.83481 | 42.72 | 0.56486 |
| 41 | 729.25837 | 2.638 | 1.84139 | 24.56 | 0.61274 |
| 42 | −554.56625 | 1.173 | | | |
| 43 | 75.91858 | 5.086 | 1.56384 | 60.83 | 0.54082 |
| 44 | 249.98807 | 41.357 | | | |
| 45 | −3774.71446 | 2.000 | 1.80610 | 33.27 | 0.58845 |
| 46 | 94.85869 | 3.623 | | | |
| 47 | −173.43860 | 2.415 | 1.95906 | 17.47 | 0.65993 |
| 48 | −86.94731 | 2.606 | | | |
| 49 | 51.63691 | 5.569 | 1.77250 | 49.62 | 0.55186 |
| 50 | −119.22975 | 1.220 | 1.53172 | 48.84 | 0.56558 |
| 51 | 38.99544 | 3.956 | | | |
| 52 | −1598.56178 | 3.981 | 1.63854 | 55.38 | 0.54858 |
| 53 | −42.95369 | 1.264 | 1.95375 | 32.32 | 0.59015 |
| 54 | 107.69108 | 13.785 | | | |
| 55 | 117.37581 | 4.235 | 1.84139 | 24.56 | 0.61274 |
| 56 | −98.37784 | 8.474 | | | |
| 57 | −144.27087 | 3.922 | 1.51200 | 52.12 | 0.56018 |
| 58 | 21.27734 | 17.951 | 1.49700 | 81.54 | 0.53748 |
| 59 | 36.86550 | 2.070 | | | |
| 60 | 54.29072 | 7.322 | 1.49700 | 81.54 | 0.53748 |
| 61 | −46.00893 | 1.200 | 2.00100 | 29.13 | 0.59952 |
| 62 | −179.99726 | 10.250 | | | |
| 63 | 46.73203 | 6.560 | 1.51742 | 52.43 | 0.55649 |
| 64 | −180.74015 | 2.000 | | | |
| 65 | ∞ | 1.500 | 1.51633 | 64.14 | 0.53531 |
| 66 | ∞ | 0.000 | | | |
| 67 | ∞ | 3.690 | 1.51633 | 64.05 | 0.53463 |
| 68 | ∞ | 32.967 | | | |

TABLE 22

Example 6, specifications (d-line)

|  | Wide angle end | Intermediate position | Telephoto end |
|---|---|---|---|
| Zoom magnification | 1.0 | 3.8 | 19.6 |
| f | 35.510 | 136.357 | 695.987 |
| FNo. | 2.86 | 2.86 | 4.75 |
| 2ω [°] | 44.2 | 11.8 | 2.4 |

TABLE 23

Example 6, zoom distance

|  | Wide angle end | Intermediate position | Telephoto end |
|---|---|---|---|
| DD [18] | 7.151 | 86.917 | 122.100 |
| DD [28] | 241.513 | 134.564 | 5.603 |
| DD [33] | 24.459 | 8.405 | 2.178 |
| DD [38] | 2.711 | 45.948 | 145.953 |

TABLE 24

Example 6, aspherical coefficient

| Surface number | 38 |
|---|---|
| KA | 1.0000000E+00 |
| A3 | 0.0000000E+00 |
| A4 | 4.7590627E−09 |
| A5 | 1.7107487E−09 |
| A6 | −2.7096195E−10 |
| A7 | 2.4286712E−11 |
| A8 | −1.2588015E−12 |
| A9 | 3.9012037E−14 |
| A10 | −9.7460038E−16 |
| A11 | 3.1118871E−17 |
| A12 | −6.6381916E−19 |
| A13 | −7.9197859E−21 |
| A14 | 7.3028040E−22 |
| A15 | −1.3743077E−23 |
| A16 | 8.7579813E−26 |

A zoom lens according to Example 7 is described next. FIG. 7 provides cross-sectional views illustrating a lens configuration of the zoom lens according to Example 7. The zoom lens according to Example 7 has the same lens number configuration as that of the zoom lens according to Example 4. Table 25 shows basic lens data of the zoom lens according to Example 7, Table 26 shows data relating to specifications, Table 27 shows data relating to surface distances that change, and Table 28 shows data relating to aspherical coefficients. FIG. 17 shows aberrations.

TABLE 25

Example 7, lens data (nd, νd for d-line)

| Surface number | Curvature radius | Surface distance | nd | νd | θgF |
|---|---|---|---|---|---|
| 1 | 3115.22902 | 4.400 | 1.88300 | 40.76 | 0.56679 |
| 2 | 349.55385 | 22.499 | | | |
| 3 | −388.68497 | 4.432 | 1.65113 | 55.89 | 0.54672 |
| 4 | 411.65471 | 2.342 | | | |
| 5 | 429.44340 | 13.552 | 1.84139 | 24.56 | 0.61274 |
| 6 | −1689.09587 | 2.687 | | | |
| 7 | 2385.11397 | 7.230 | 1.54072 | 47.23 | 0.56511 |
| 8 | 357.62308 | 26.396 | 1.43875 | 94.94 | 0.53433 |
| 9 | −318.17967 | 38.273 | | | |
| 10 | 368.41048 | 13.143 | 1.69400 | 56.29 | 0.54506 |
| 11 | ∞ | 2.653 | | | |
| 12 | 220.84589 | 19.997 | 1.43387 | 95.18 | 0.53733 |
| 13 | 3693.07273 | 0.224 | | | |
| 14 | 313.75805 | 7.240 | 1.69895 | 30.05 | 0.60290 |
| 15 | 131.42301 | 28.304 | 1.43875 | 94.94 | 0.53433 |
| 16 | 1146.73703 | 3.740 | | | |
| 17 | 164.75208 | 13.328 | 1.49700 | 81.54 | 0.53748 |
| 18 | 414.73079 | DD [18] | | | |
| 19 | 1326.38078 | 3.183 | 1.71299 | 53.87 | 0.54587 |
| 20 | 67.44942 | 12.498 | | | |
| 21 | −286.53431 | 1.820 | 1.83481 | 42.72 | 0.56486 |

TABLE 25-continued

Example 7, lens data (nd, νd for d-line)

| Surface number | Curvature radius | Surface distance | nd | νd | θgF |
|---|---|---|---|---|---|
| 22 | 188.08010 | 2.110 | 1.84139 | 24.56 | 0.61274 |
| 23 | 275.09448 | 5.138 | | | |
| 24 | −176.55465 | 2.032 | 1.49700 | 81.54 | 0.53748 |
| 25 | 100.95140 | 7.702 | 1.78472 | 25.68 | 0.61621 |
| 26 | −329.77942 | 5.500 | | | |
| 27 | −88.87861 | 2.000 | 1.43875 | 94.94 | 0.53433 |
| 28 | 714.95128 | DD [28] | | | |
| 29 | 928.29470 | 7.168 | 1.43875 | 94.66 | 0.53402 |
| 30 | −166.00053 | 0.125 | | | |
| 31 | −1289.47173 | 8.913 | 1.43875 | 94.66 | 0.53402 |
| 32 | −103.32262 | 3.000 | 1.80000 | 29.84 | 0.60178 |
| 33 | −148.26931 | DD [33] | | | |
| 34 | 308.89930 | 4.000 | 1.80000 | 29.84 | 0.60178 |
| 35 | 192.07672 | 6.038 | 1.43875 | 94.66 | 0.53402 |
| 36 | −1294.71907 | 0.757 | | | |
| 37 | 196.66541 | 9.750 | 1.43875 | 94.66 | 0.53402 |
| *38 | −720.72252 | DD [38] | | | |
| 39 (diaphragm) | ∞ | 7.195 | | | |
| 40 | −156.68264 | 1.520 | 1.83481 | 42.72 | 0.56486 |
| 41 | 842.45166 | 2.150 | 1.84139 | 24.56 | 0.61274 |
| 42 | −586.07745 | 0.200 | | | |
| 43 | 75.34448 | 4.999 | 1.56384 | 60.83 | 0.54082 |
| 44 | 249.99493 | 42.069 | | | |
| 45 | −2883.82574 | 2.000 | 1.80610 | 33.27 | 0.58845 |
| 46 | 94.42916 | 3.286 | | | |
| 47 | −178.38958 | 2.280 | 1.95906 | 17.47 | 0.65993 |
| 48 | −87.12464 | 4.073 | | | |
| 49 | 51.00959 | 5.290 | 1.77250 | 49.62 | 0.55186 |
| 50 | −121.12174 | 1.222 | 1.53172 | 48.84 | 0.56558 |
| 51 | 38.98139 | 3.994 | | | |
| 52 | −1400.07367 | 3.970 | 1.63854 | 55.38 | 0.54858 |
| 53 | −42.71093 | 1.000 | 1.95375 | 32.32 | 0.59015 |
| 54 | 98.29809 | 13.516 | | | |
| 55 | 107.32507 | 4.265 | 1.84139 | 24.56 | 0.61274 |
| 56 | −99.07220 | 8.352 | | | |
| 57 | −142.68824 | 4.922 | 1.51200 | 52.12 | 0.56018 |
| 58 | 21.77806 | 18.000 | 1.49700 | 81.54 | 0.53748 |
| 59 | 37.19255 | 1.682 | | | |
| 60 | 52.96086 | 7.467 | 1.49700 | 81.54 | 0.53748 |
| 61 | −45.25620 | 1.200 | 2.00100 | 29.13 | 0.59952 |
| 62 | −177.03293 | 9.775 | | | |
| 63 | 49.57904 | 6.438 | 1.51742 | 52.43 | 0.55649 |
| 64 | −157.84741 | 2.000 | | | |
| 65 | ∞ | 1.500 | 1.51633 | 64.14 | 0.53531 |
| 66 | ∞ | 0.000 | | | |
| 67 | ∞ | 3.690 | 1.51633 | 64.05 | 0.53463 |
| 68 | ∞ | 32.964 | | | |

TABLE 26

Example 7, specifications (d-line)

|  | Wide angle end | Intermediate position | Telephoto end |
|---|---|---|---|
| Zoom magnification | 1.0 | 3.8 | 19.6 |
| f | 35.753 | 137.290 | 700.753 |
| FNo. | 2.93 | 2.93 | 4.80 |
| 2ω[°] | 44.0 | 11.6 | 2.4 |

TABLE 27

Example 7, zoom distance

|  | Wide angle end | Intermediate position | Telephoto end |
|---|---|---|---|
| DD [18] | 6.643 | 87.122 | 121.889 |
| DD [28] | 242.174 | 135.517 | 5.350 |

TABLE 27-continued

Example 7, zoom distance

| | Wide angle end | Intermediate position | Telephoto end |
|---|---|---|---|
| DD [33] | 24.794 | 8.161 | 2.147 |
| DD [38] | 2.646 | 45.457 | 146.871 |

TABLE 28

Example 7, aspherical coefficient

| Surface number | 38 |
|---|---|
| KA | 1.0000000E+00 |
| A3 | 0.0000000E+00 |
| A4 | −2.0798385E−08 |
| A5 | 1.4657683E−08 |
| A6 | −3.2730034E−09 |
| A7 | 3.7528927E−10 |
| A8 | −2.3490790E−11 |
| A9 | 7.3529647E−13 |
| A10 | −3.8695741E−15 |
| A11 | −4.2162522E−16 |
| A12 | 7.4099281E−18 |
| A13 | 2.5167013E−19 |
| A14 | −1.1222166E−20 |
| A15 | 1.6156810E−22 |
| A16 | −8.4641640E−25 |

A zoom lens according to Example 8 is described next. FIG. 8 provides cross-sectional views illustrating a lens configuration of the zoom lens according to Example 8. The zoom lens according to Example 8 has the same lens number configuration as that of the zoom lens according to Example 4. Table 29 shows basic lens data of the zoom lens according to Example 8, Table 30 shows data relating to specifications, Table 31 shows data relating to surface distances that change, and Table 32 shows data relating to aspherical coefficients. FIG. 18 shows aberrations.

TABLE 29

Example 8, lens data (nd, νd for d-line)

| Surface number | Curvature radius | Surface distance | nd | νd | θgF |
|---|---|---|---|---|---|
| 1 | 3419.25761 | 4.400 | 1.88300 | 40.76 | 0.56679 |
| 2 | 268.72262 | 22.500 | | | |
| 3 | −325.39718 | 4.400 | 1.65113 | 55.89 | 0.54672 |
| 4 | 849.27595 | 1.590 | | | |
| 5 | 554.83719 | 12.404 | 1.84139 | 24.56 | 0.61274 |
| 6 | −772.13620 | 2.583 | | | |
| 7 | 2822.49348 | 7.230 | 1.54072 | 47.23 | 0.56511 |
| 8 | 349.62856 | 25.000 | 1.43875 | 94.94 | 0.53433 |
| 9 | −324.61950 | 37.610 | | | |
| 10 | 342.27383 | 13.390 | 1.69400 | 56.29 | 0.54506 |
| 11 | ∞ | 1.200 | | | |
| 12 | 221.03333 | 18.892 | 1.43387 | 95.18 | 0.53733 |
| 13 | 3787.89946 | 0.150 | | | |
| 14 | 296.51832 | 7.228 | 1.69895 | 30.05 | 0.60290 |
| 15 | 125.50723 | 27.114 | 1.43875 | 94.94 | 0.53433 |
| 16 | 1067.28694 | 1.925 | | | |
| 17 | 160.13272 | 13.806 | 1.49700 | 81.54 | 0.53748 |
| 18 | 439.05795 | DD [18] | | | |
| 19 | 2935.50028 | 2.539 | 1.71299 | 53.87 | 0.54587 |
| 20 | 61.35000 | 10.412 | | | |
| 21 | −282.10249 | 1.820 | 1.83481 | 42.72 | 0.56486 |
| 22 | 216.47851 | 1.663 | 1.84139 | 24.56 | 0.61274 |
| 23 | 266.36370 | 5.213 | | | |
| 24 | −160.05160 | 2.032 | 1.49700 | 81.54 | 0.53748 |
| 25 | 96.07282 | 8.233 | 1.78472 | 25.68 | 0.61621 |
| 26 | −320.14787 | 5.500 | | | |
| 27 | −89.66922 | 2.000 | 1.43875 | 94.94 | 0.53433 |
| 28 | −1822.66535 | DD [28] | | | |

TABLE 29-continued

Example 8, lens data (nd, νd for d-line)

| Surface number | Curvature radius | Surface distance | nd | νd | θgF |
|---|---|---|---|---|---|
| 29 | 819.89128 | 7.442 | 1.43875 | 94.66 | 0.53402 |
| 30 | −159.42426 | 0.125 | | | |
| 31 | −1769.47221 | 9.550 | 1.43875 | 94.66 | 0.53402 |
| 32 | −99.13897 | 3.000 | 1.80000 | 29.84 | 0.60178 |
| 33 | −145.00629 | DD [33] | | | |
| 34 | 329.57600 | 4.000 | 1.80000 | 29.84 | 0.60178 |
| 35 | 207.75429 | 6.202 | 1.43875 | 94.66 | 0.53402 |
| 36 | −1286.25470 | 0.757 | | | |
| 37 | 193.19837 | 9.750 | 1.43875 | 94.66 | 0.53402 |
| *38 | −747.54203 | DD [38] | | | |
| 39 (diaphragm) | ∞ | 7.178 | | | |
| 40 | −150.83111 | 1.520 | 1.83481 | 42.72 | 0.56486 |
| 41 | 1285.21087 | 2.578 | 1.84139 | 24.56 | 0.61274 |
| 42 | −402.71362 | 0.200 | | | |
| 43 | 75.19456 | 4.658 | 1.56384 | 60.83 | 0.54082 |
| 44 | 233.70941 | 33.600 | | | |
| 45 | −3742.13758 | 2.416 | 1.80610 | 33.27 | 0.58845 |
| 46 | 103.10491 | 3.370 | | | |
| 47 | −184.64656 | 2.369 | 1.95906 | 17.47 | 0.65993 |
| 48 | −91.36101 | 15.145 | | | |
| 49 | 49.98841 | 4.815 | 1.77250 | 49.62 | 0.55186 |
| 50 | −111.26701 | 1.360 | 1.53172 | 48.84 | 0.56558 |
| 51 | 36.04071 | 4.796 | | | |
| 52 | −1102.24855 | 3.551 | 1.63854 | 55.38 | 0.54858 |
| 53 | −38.37127 | 1.000 | 1.95375 | 32.32 | 0.59015 |
| 54 | 91.96782 | 25.244 | | | |
| 55 | 84.97889 | 4.905 | 1.84139 | 24.56 | 0.61274 |
| 56 | −116.46246 | 1.178 | | | |
| 57 | −334.60113 | 4.613 | 1.51200 | 52.12 | 0.56018 |
| 58 | 23.51602 | 17.561 | 1.49700 | 81.54 | 0.53748 |
| 59 | 32.71339 | 2.339 | | | |
| 60 | 50.00026 | 10.184 | 1.49700 | 81.54 | 0.53748 |
| 61 | −35.25465 | 1.200 | 2.00100 | 29.13 | 0.59952 |
| 62 | −170.98964 | 1.561 | | | |
| 63 | 79.30993 | 6.391 | 1.51742 | 52.43 | 0.55649 |
| 64 | −57.85791 | 2.000 | | | |
| 65 | ∞ | 1.500 | 1.51633 | 64.14 | 0.53531 |
| 66 | ∞ | 0.000 | | | |
| 67 | ∞ | 3.690 | 1.51633 | 64.05 | 0.53463 |
| 68 | ∞ | 33.445 | | | |

TABLE 30

Example 8, specifications (d-line)

| | Wide angle end | Intermediate position | Telephoto end |
|---|---|---|---|
| Zoom magnification | 1.0 | 3.8 | 19.6 |
| f | 34.588 | 132.820 | 677.934 |
| FNo. | 2.90 | 2.90 | 4.87 |
| 2ω[°] | 44.0 | 11.6 | 2.4 |

TABLE 31

Example 8, zoom distance

| | Wide angle end | Intermediate position | Telephoto end |
|---|---|---|---|
| DD [18] | 5.628 | 82.422 | 114.895 |
| DD [28] | 240.928 | 131.248 | 4.160 |
| DD [33] | 34.219 | 23.606 | 2.072 |
| DD [38] | 2.586 | 46.085 | 162.234 |

TABLE 32

Example 8, aspherical coefficient

| Surface number | 38 |
|---|---|
| KA | 1.0000000E+00 |
| A3 | 0.0000000E+00 |
| A4 | 4.9456135E−09 |
| A5 | 2.3747287E−10 |
| A6 | −1.9805341E−11 |
| A7 | −3.1856119E−13 |
| A8 | 1.9296610E−13 |
| A9 | −1.6150477E−14 |
| A10 | 5.7506215E−16 |
| A11 | −7.9406340E−18 |
| A12 | 4.5796409E−20 |
| A13 | −4.6008535E−21 |
| A14 | 1.8723305E−22 |
| A15 | −2.6908389E−24 |
| A16 | 1.2982256E−26 |

A zoom lens according to Example 9 is described next. FIG. 9 provides cross-sectional views illustrating a lens configuration of the zoom lens according to Example 9. The zoom lens according to Example 9 has the same lens number configuration as that of the zoom lens according to Example 4. Table 33 shows basic lens data of the zoom lens according to Example 9, Table 34 shows data relating to specifications, Table 35 shows data relating to surface distances that change, and Table 36 shows data relating to aspherical coefficients. FIG. 19 shows aberrations.

TABLE 33

Example 9, lens data (nd, νd for d-line)

| Surface number | Curvature radius | Surface distance | nd | νd | θgF |
|---|---|---|---|---|---|
| 1 | 2717.73485 | 5.700 | 1.88300 | 40.76 | 0.56679 |
| 2 | 380.86224 | 17.798 | | | |
| 3 | −726.84477 | 7.258 | 1.77250 | 49.60 | 0.55212 |
| 4 | 292.30100 | 15.088 | 1.84139 | 24.56 | 0.61274 |
| 5 | 3628.20361 | 2.930 | | | |
| 6 | 2431.82575 | 7.530 | 1.54072 | 47.23 | 0.56511 |
| 7 | 371.94500 | 25.499 | 1.43875 | 94.94 | 0.53433 |
| 8 | −340.46372 | 40.037 | | | |
| 9 | 396.43767 | 12.437 | 1.77250 | 49.60 | 0.55212 |
| 10 | ∞ | 1.767 | | | |
| 11 | 219.67124 | 18.668 | 1.43387 | 95.18 | 0.53733 |
| 12 | 2215.77255 | 1.371 | | | |
| 13 | 369.04550 | 7.283 | 1.69895 | 30.13 | 0.60298 |
| 14 | 138.62300 | 27.558 | 1.43875 | 94.94 | 0.53433 |
| 15 | 3628.23215 | 1.114 | | | |
| 16 | 165.94924 | 15.000 | 1.49700 | 81.54 | 0.53748 |
| 17 | 529.27566 | DD [17] | | | |
| 18 | 1907.28239 | 3.250 | 1.69400 | 56.29 | 0.54506 |
| 19 | 65.14127 | 10.408 | | | |
| 20 | −551.87594 | 2.089 | 1.83481 | 42.72 | 0.56486 |
| 21 | 133.34200 | 3.000 | 1.84139 | 24.56 | 0.61274 |
| 22 | 225.37347 | 6.588 | | | |
| 23 | −142.82782 | 2.108 | 1.49700 | 81.54 | 0.53748 |
| 24 | 97.56200 | 8.061 | 1.75520 | 27.51 | 0.61033 |
| 25 | −346.22505 | 5.500 | | | |
| 26 | −88.09661 | 2.000 | 1.43875 | 94.94 | 0.53433 |
| 27 | 2023.15419 | DD [27] | | | |
| 28 | 764.60970 | 7.656 | 1.43875 | 94.66 | 0.53402 |
| 29 | −160.39950 | 0.125 | | | |
| 30 | −2955.12791 | 9.628 | 1.43875 | 94.66 | 0.53402 |
| 31 | −101.71700 | 3.000 | 1.80000 | 29.84 | 0.60178 |
| 32 | −149.23719 | DD [32] | | | |
| 33 | 343.80179 | 4.000 | 1.80000 | 29.84 | 0.60178 |
| 34 | 215.03300 | 6.274 | 1.43875 | 94.66 | 0.53402 |
| 35 | −950.99135 | 0.757 | | | |
| 36 | 207.51344 | 9.750 | 1.43875 | 94.66 | 0.53402 |
| *37 | −945.77432 | DD [37] | | | |
| 38 (diaphragm) | ∞ | 6.570 | | | |
| 39 | −121.16239 | 1.520 | 1.83481 | 42.72 | 0.56486 |
| 40 | 890.64800 | 1.744 | 1.84139 | 24.56 | 0.61274 |
| 41 | 2481.54127 | 0.201 | | | |
| 42 | 71.95464 | 6.910 | 1.56883 | 56.04 | 0.54853 |
| 43 | −783.03743 | 37.160 | | | |
| 44 | −3949.97334 | 2.001 | 1.91100 | 35.22 | 0.58360 |
| 45 | 79.02038 | 6.315 | | | |
| 46 | −136.72834 | 2.364 | 1.94595 | 17.98 | 0.65460 |
| 47 | −84.05991 | 0.300 | | | |
| 48 | 39.78194 | 5.517 | 1.74950 | 35.28 | 0.58704 |
| 49 | −605.08400 | 1.211 | 1.53172 | 48.84 | 0.56558 |
| 50 | 43.19462 | 7.880 | | | |
| 51 | 471.91802 | 4.027 | 1.67790 | 55.34 | 0.54726 |
| 52 | −43.48600 | 1.001 | 1.91100 | 35.22 | 0.58360 |
| 53 | 72.66977 | 12.993 | | | |
| 54 | 88.25253 | 5.643 | 1.84139 | 24.56 | 0.61274 |
| 55 | −114.64819 | 5.753 | | | |
| 56 | −169.31860 | 2.927 | 1.51200 | 52.12 | 0.56018 |
| 57 | 21.49700 | 17.948 | 1.49700 | 81.54 | 0.53748 |
| 58 | 39.43278 | 1.615 | | | |
| 59 | 46.61676 | 10.195 | 1.49700 | 81.54 | 0.53748 |
| 60 | −35.78600 | 2.572 | 2.00069 | 25.46 | 0.61364 |
| 61 | −180.29164 | 10.205 | | | |
| 62 | 48.67158 | 7.159 | 1.75550 | 45.59 | 0.55875 |
| 63 | 239.34644 | 2.000 | | | |
| 64 | ∞ | 1.500 | 1.51633 | 64.14 | 0.53531 |
| 65 | ∞ | 0.000 | | | |
| 66 | ∞ | 3.690 | 1.51633 | 64.14 | 0.53531 |
| 67 | ∞ | 32.404 | | | |

TABLE 34

Example 9, specifications (d-line)

| | Wide angle end | Intermediate position | Telephoto end |
|---|---|---|---|
| Zoom magnification | 1.0 | 3.8 | 19.6 |
| f | 35.351 | 135.746 | 692.872 |
| FNo. | 2.85 | 2.85 | 4.86 |
| 2ω[°] | 44.6 | 11.8 | 2.4 |

TABLE 35

Example 9, zoom distance

| | Wide angle end | Intermediate position | Telephoto end |
|---|---|---|---|
| DD [17] | 10.362 | 89.256 | 123.753 |
| DD [27] | 240.405 | 133.295 | 5.060 |
| DD [32] | 26.561 | 10.750 | 2.240 |
| DD [37] | 3.448 | 47.476 | 149.724 |

TABLE 36

Example 9, aspherical coefficient

| Surface number | 37 |
|---|---|
| KA | 1.0000000E+00 |
| A3 | 0.0000000E+00 |
| A4 | 4.6291418E−09 |
| A5 | −2.5245283E−11 |
| A6 | 1.8599768E−12 |
| A7 | −1.8274275E−13 |
| A8 | 1.2282884E−15 |
| A9 | 4.1929562E−16 |
| A10 | −9.0843634E−18 |
| A11 | −2.8977192E−19 |

TABLE 36-continued

Example 9, aspherical coefficient

| | |
|---|---|
| A12 | 2.0924759E-21 |
| A13 | 3.7948885E-22 |
| A14 | -4.1745995E-24 |
| A15 | -1.3050865E-25 |
| A16 | 1.9473717E-27 |

A zoom lens according to Example 10 is described next. FIG. 10 provides cross-sectional views illustrating a lens configuration of the zoom lens according to Example 10. The zoom lens according to Example 10 has the same lens number configuration as that of the zoom lens according to Example 4. Table 37 shows basic lens data of the zoom lens according to Example 10, Table 38 shows data relating to specifications, Table 39 shows data relating to surface distances that change, and Table 40 shows data relating to aspherical coefficients. FIG. 20 shows aberrations.

TABLE 37

Example 10, lens data (nd, νd for d-line)

| Surface number | Curvature radius | Surface distance | nd | νd | θgF |
|---|---|---|---|---|---|
| 1 | 2821.04454 | 5.700 | 1.88300 | 40.76 | 0.56679 |
| 2 | 381.28602 | 17.714 | | | |
| 3 | -749.98024 | 7.258 | 1.77250 | 49.60 | 0.55212 |
| 4 | 287.45401 | 15.400 | 1.84139 | 24.56 | 0.61274 |
| 5 | 3786.57187 | 3.037 | | | |
| 6 | 2684.13160 | 7.258 | 1.54072 | 47.23 | 0.56511 |
| 7 | 375.07381 | 25.623 | 1.43875 | 94.94 | 0.53433 |
| 8 | -336.45223 | 40.110 | | | |
| 9 | 387.29043 | 12.707 | 1.77250 | 49.60 | 0.55212 |
| 10 | ∞ | 1.200 | | | |
| 11 | 218.89802 | 18.721 | 1.43387 | 95.18 | 0.53733 |
| 12 | 2189.41419 | 1.633 | | | |
| 13 | 390.73134 | 7.280 | 1.69895 | 30.13 | 0.60298 |
| 14 | 138.96143 | 27.412 | 1.43875 | 94.94 | 0.53433 |
| 15 | 3635.93962 | 4.732 | | | |
| 16 | 163.67600 | 15.000 | 1.49700 | 81.54 | 0.53748 |
| 17 | 526.91202 | DD [17] | | | |
| 18 | 2249.39184 | 3.250 | 1.69400 | 56.29 | 0.54506 |
| 19 | 65.53556 | 10.119 | | | |
| 20 | -549.71572 | 1.820 | 1.83481 | 42.72 | 0.56486 |
| 21 | 133.34592 | 3.000 | 1.84139 | 24.56 | 0.61274 |
| 22 | 229.66815 | 6.263 | | | |
| 23 | -144.76978 | 2.032 | 1.49700 | 81.54 | 0.53748 |
| 24 | 96.97187 | 7.943 | 1.75520 | 27.51 | 0.61033 |
| 25 | -349.60908 | 5.500 | | | |
| 26 | -88.00025 | 2.000 | 1.43875 | 94.94 | 0.53433 |
| 27 | 1998.83442 | DD [27] | | | |
| 28 | 760.48326 | 7.677 | 1.43875 | 94.66 | 0.53402 |
| 29 | -159.54485 | 0.125 | | | |
| 30 | -2858.23392 | 9.662 | 1.43875 | 94.66 | 0.53402 |
| 31 | -101.02816 | 3.000 | 1.80000 | 29.84 | 0.60178 |
| 32 | -149.81389 | DD [32] | | | |
| 33 | 340.11532 | 4.000 | 1.80000 | 29.84 | 0.60178 |
| 34 | 219.50376 | 6.260 | 1.43875 | 94.66 | 0.53402 |
| 35 | -907.02141 | 0.810 | | | |
| 36 | 211.78810 | 9.785 | 1.43875 | 94.66 | 0.53402 |
| *37 | -1035.82026 | DD [37] | | | |
| 38 (diaphragm) | ∞ | 8.841 | | | |
| 39 | -154.31467 | 1.520 | 1.83481 | 42.72 | 0.56486 |
| 40 | 866.36903 | 1.894 | 1.84139 | 24.56 | 0.61274 |
| 41 | ∞ | 0.200 | | | |
| 42 | 70.46066 | 5.210 | 1.57250 | 57.74 | 0.54568 |
| 43 | 249.98594 | 37.750 | | | |
| 44 | -1045.94314 | 2.023 | 1.88100 | 40.14 | 0.57010 |
| 45 | 126.19585 | 3.026 | | | |
| 46 | -249.99766 | 2.482 | 1.95906 | 17.47 | 0.65993 |
| 47 | -106.36791 | 2.508 | | | |
| 48 | 46.20707 | 6.695 | 1.78800 | 47.37 | 0.55598 |
| 49 | -137.32023 | 1.265 | 1.51200 | 52.12 | 0.56018 |
| 50 | 40.99770 | 7.881 | | | |
| 51 | -3794.31214 | 3.748 | 1.66999 | 51.72 | 0.55362 |
| 52 | -44.84376 | 1.102 | 1.95375 | 32.32 | 0.59015 |
| 53 | 62.98844 | 12.025 | | | |
| 54 | 72.84718 | 9.864 | 1.84139 | 24.56 | 0.61274 |
| 55 | -141.37310 | 4.543 | | | |
| 56 | -127.87204 | 3.368 | 1.51200 | 52.12 | 0.56018 |
| 57 | 21.05592 | 17.703 | 1.49700 | 81.54 | 0.53748 |
| 58 | 34.99882 | 2.028 | | | |
| 59 | 50.00097 | 8.232 | 1.49700 | 81.54 | 0.53748 |
| 60 | -36.26075 | 1.300 | 2.00100 | 29.13 | 0.59952 |
| 61 | -139.97480 | 9.510 | | | |
| 62 | 59.29004 | 7.408 | 1.61405 | 54.99 | 0.55092 |
| 63 | -118.86952 | 2.000 | | | |
| 64 | ∞ | 1.500 | 1.51633 | 64.14 | 0.53531 |
| 65 | ∞ | 0.000 | | | |
| 66 | ∞ | 3.690 | 1.51633 | 64.05 | 0.53463 |
| 67 | ∞ | 33.351 | | | |

TABLE 38

Example 10, specifications (d-line)

| | Wide angle end | Intermediate position | Telephoto end |
|---|---|---|---|
| Zoom magnification | 1.0 | 3.8 | 19.6 |
| f | 35.348 | 135.736 | 692.819 |
| FNo. | 2.85 | 2.85 | 4.75 |
| 2ω[°] | 44.2 | 11.8 | 2.4 |

TABLE 39

Example 10, zoom distance

| | Wide angle end | Intermediate position | Telephoto end |
|---|---|---|---|
| DD [17] | 7.230 | 87.035 | 121.397 |
| DD [27] | 241.996 | 135.033 | 4.977 |
| DD [32] | 24.645 | 8.820 | 2.229 |
| DD [37] | 2.753 | 45.735 | 148.020 |

TABLE 40

Example 10, aspherical coefficient

| Surface number | 37 |
|---|---|
| KA | 1.0000000E+00 |
| A3 | 0.0000000E+00 |
| A4 | 5.4418965E-09 |
| A5 | -2.8145484E-09 |
| A6 | 4.9748646E-10 |
| A7 | -3.8597730E-11 |
| A8 | 1.4954479E-12 |
| A9 | -2.9419974E-14 |
| A10 | 3.5436025E-16 |
| A11 | -1.8610537E-18 |
| A12 | -3.0741467E-19 |
| A13 | 9.2999539E-21 |
| A14 | 1.1878876E-22 |
| A15 | -7.1645004E-24 |
| A16 | 6.8958760E-26 |

Table 41 shows values corresponding to the conditional expressions (1) to (5) of the zoom lenses according to Examples 1 to 10. In all examples, the d-line is used as the reference wavelength. The values shown in Table 41 provided below are for the reference wavelength.

TABLE 41

| Expression No. | Conditional expression | Example 1 | Example 2 | Example 3 | Example 4 | Example 5 |
|---|---|---|---|---|---|---|
| (1) | f1c_vd_ave | 90.6 | 86.1 | 95.0 | 82.0 | 82.0 |
| (2) | f1c_θ gF_ave | 0.536 | 0.537 | 0.537 | 0.539 | 0.539 |
| (3) | f1/f1c | 1.014 | 1.025 | 1.011 | 1.037 | 1.060 |
| (4) | (L1ar + L1bf)/(L1ar − L1bf) | −0.072 | −0.046 | −0.108 | −0.208 | −0.253 |
| (5) | d2/tt1 | 0.084 | 0.085 | 0.084 | 0.099 | 0.096 |

| Expression No. | Conditional expression | Example 6 | Example 7 | Example 8 | Example 9 | Example 10 |
|---|---|---|---|---|---|---|
| (1) | f1c_vd_ave | 82.0 | 82.0 | 82.0 | 80.3 | 80.3 |
| (2) | f1c_θ gF_ave | 0.539 | 0.539 | 0.539 | 0.540 | 0.540 |
| (3) | f1/f1c | 1.042 | 1.026 | 1.012 | 1.069 | 1.064 |
| (4) | (L1ar + L1bf)/(L1ar − L1bf) | −0.134 | −0.053 | −0.095 | −0.312 | −0.326 |
| (5) | d2/tt1 | 0.103 | 0.107 | 0.112 | 0.086 | 0.084 |

Referring to the above data, it is found that all the zoom lenses according to Examples 1 to 10 are high-performance zoom lenses which satisfy the conditional expressions (1) to (5), which have a F-number of 6 or less at the telephoto end, and whose aberrations have been properly corrected.

An imaging apparatus according to an embodiment of the invention is described next. FIG. 21 is a schematic configuration diagram of an imaging apparatus using a zoom lens according to an embodiment of the invention, as an example of an imaging apparatus according to an embodiment of the invention. FIG. 21 schematically illustrates respective lens groups. The imaging apparatus may be, for example, a video camera or an electronic still camera including a solid-state imaging element, such as a charge coupled device (CCD) or a complementary metal oxide semiconductor (CMOS).

An imaging apparatus 10 illustrated in FIG. 21 includes a zoom lens 1, a filter 6 that is arranged on the image side of the zoom lens 1 and that has a function of a low pass filter or the like, an imaging element 7 arranged on the image side of the filter 6, and a signal processing circuit 8. The imaging element 7 is for converting an optical image formed by the zoom lens 1 into an electric signal. For example, CCD or CMOS can be used for the imaging element 7. The imaging element 7 is arranged such that an imaging surface of the imaging element 7 is aligned with the image surface of the zoom lens 1.

An image captured by the zoom lens 1 forms an image on the imaging surface of the imaging element 7, an output signal from the imaging element 7 relating to the image is arithmetically processed by the signal processing circuit 8, and the image is displayed on a display device 9.

Since the imaging apparatus 10 according to this embodiment includes the zoom lens 1 according to the invention, an image with high image quality can be obtained.

While the invention has been described above by using the embodiments and examples; however, the invention is not limited to the embodiments and examples, and may be modified in various ways. For example, the values of curvature radius, surface distance, refractive index, and/or Abbe number of each lens are not limited to the values provided in each of the numerical examples, and may have other values.

REFERENCE SIGNS LIST 1 zoom lens
6 filter
7 imaging element
8 signal processing circuit
9 display device
10 imaging apparatus
G1 first lens group
G1a 1a lens group
G1b 1b lens group
G1c 1c lens group
G2 second lens group
G3 third lens group
G4 fourth lens group
G5 fifth lens group
PP1, PP2 optical member
L1a to L5o lens
Sim image surface
St aperture diaphragm
wa axial ray
wb ray at maximum angle of view
Z optical axis

What is claimed is:
1. A zoom lens, consisting of:
in order from an object side, a first lens group having a positive refractive power, a second lens group having a negative refractive power, a third lens group having a positive refractive power, a fourth lens group having a positive refractive power, and a fifth lens group having a positive refractive power,
wherein during zooming, the first lens group is fixed relative to an image surface,
wherein during zooming from a wide angle end to a telephoto end, a distance between the first lens group and the second lens group constantly increases, a distance between the second lens group and the third lens group constantly decreases, and a distance between the third lens group and the fourth lens group at the telephoto end is smaller than a distance between the third lens group and the fourth lens group at the wide angle end,
wherein the first lens group consists of, in order from the object side, a 1a lens group fixed relative to the image surface during focusing and having a negative refractive power, a 1b lens group being movable along an optical axis during focusing and having a positive refractive power, and a 1c lens group fixed relative to the image surface during focusing and having a positive refractive power, and
wherein the 1c lens group has on the most image side four lenses of, in order from the object side, a positive lens, a cemented lens in which a negative meniscus lens having a convex surface facing the object side and a positive lens are cemented in that order from the object side, and a positive meniscus lens having a convex surface facing the object side.

2. The zoom lens according to claim 1,
wherein during zooming, the fifth lens group is fixed relative to the image surface, and
wherein during zooming from the wide angle end to the telephoto end, a 3-4 composite lens group composed of the third lens group and the fourth lens group, and the second lens group simultaneously pass through respective points at which imaging magnifications of the 3-4 composite lens group and the second lens group are −1.

3. The zoom lens according to claim 1,
wherein during zooming from the wide angle end to the telephoto end, the distance between the third lens group and the fourth lens group decreases, increases, and then decreases.

4. The zoom lens according to claim 1,
wherein the following conditional expressions (1) and (2) are satisfied $$75 < f1c\_vd\_ave < 96 \qquad (1), \text{ and}$$

$$0.5 < f1c\_\theta gF\_ave < 0.6 \qquad (2),$$

where
$f1c\_vd\_ave$ is an average value of Abbe numbers for a d-line of the positive lenses included in the 1c lens group, and
$f1c\_\theta gF\_ave$ is an average value of partial dispersion ratios of the positive lenses included in the 1c lens group.

5. The zoom lens according to claim 1,
wherein the following conditional expression (3) is satisfied $$0.8 < f1/f1c < 1.2 \qquad (3),$$

where
$f1$ is a focal length for the d-line of the first lens group, and
$f1c$ is a focal length for the d-line of the 1c lens group.

6. The zoom lens according to claim 1,
wherein the number of positive lenses included in the 1b lens group and the 1c lens group is five in total.

7. The zoom lens according to claim 6,
wherein the 1b lens group consists of, in order from the object side, a cemented lens in which a negative meniscus lens and a biconvex lens are cemented in that order from the object side, and a biconvex lens, and
wherein the 1c lens group consists of, in order from the object side, a biconvex lens, a cemented lens in which a negative meniscus lens and a positive meniscus lens are cemented in that order from the object side, and a positive meniscus lens.

8. The zoom lens according to claim 6,
wherein the 1b lens group consists of a cemented lens in which a negative meniscus lens and a biconvex lens are cemented in that order from the object side, and
wherein the 1c lens group consists of, in order from the object side, a positive lens having a convex surface facing the object side, a positive meniscus lens, a cemented lens in which a negative meniscus lens and a positive meniscus lens are cemented in that order from the object side, and a positive meniscus lens.

9. The zoom lens according to claim 1,
wherein the 1a lens group consists of, in order from the object side, a first negative lens, a second negative lens, and a positive lens, and wherein the following conditional expression (4) is satisfied $$-0.8 < (L1ar + L1bf)/(L1ar - L1bf) < -0.04 \qquad (4),$$

where
$L1ar$ is a curvature radius of a surface on an image side of the first negative lens, and
$L1bf$ is a curvature radius of a surface on the object side of the second negative lens.

10. The zoom lens according to claim 9,
wherein the following conditional expression (5) is satisfied $$0.04 < d2/tt1 < 0.15 \qquad (5),$$

where
$d2$ is a distance between the first negative lens and the second negative lens, and
$tt1$ is a length on the optical axis of the first lens group.

11. The zoom lens according to claim 1,
wherein the 1a lens group consists of, in order from the object side, a negative meniscus lens, a biconcave lens, and a positive lens.

12. The zoom lens according to claim 1,
wherein the second lens group consists of, in order from the object side, a first lens component, a second lens component, a third lens component, and a fourth lens component,
wherein the first lens component is a negative lens having a concave surface that faces the image side and that has a smaller absolute value of a curvature radius than an absolute value of a curvature radius of a surface on the object side of the negative lens,
wherein the second lens component is a cemented lens in which a biconcave lens and a positive meniscus lens are cemented in that order from the object side and which entirely has a negative refractive power,
wherein the third lens component is a cemented lens in which a biconcave lens and a positive lens are cemented in that order from the object side, and
wherein the fourth lens component is a negative lens having a concave surface that faces the object side and that has a smaller absolute value of a curvature radius than an absolute value of a curvature radius of a surface on the image side of the negative lens.

13. The zoom lens according to claim 4,
wherein the following conditional expression (1-1) is satisfied $$80 < f1c\_vd\_ave < 96 \qquad (1-1).$$

14. The zoom lens according to claim 4,
wherein the following conditional expression (2-1) is satisfied $$0.52 < f1c\_\theta gF\_ave < 0.56 \qquad (2-1).$$

15. The zoom lens according to claim 5,
wherein the following conditional expression (3-1) is satisfied $$0.9 < f1/f1c < 1.1 \qquad (3-1).$$

16. The zoom lens according to claim 9,
wherein the following conditional expression (4-1) is satisfied $$-0.5 < (L1ar + L1bf)/(L1ar - L1bf) < -0.04 \qquad (4-1).$$

17. The zoom lens according to claim 10,
wherein the following conditional expression (5-1) is satisfied $$0.06 < d2/tt1 < 0.12 \qquad (5-1).$$

18. An imaging apparatus comprising the zoom lens according to claim 1.

* * * * *